(12) United States Patent
Kinrot et al.

(10) Patent No.: US 6,424,407 B1
(45) Date of Patent: Jul. 23, 2002

(54) OPTICAL TRANSLATION MEASUREMENT

(75) Inventors: Opher Kinrot, Raanana; Uri Kinrot, Hod-Hasharon; Gilad Lederer, Arsuf, all of (IL)

(73) Assignee: OTM Technologies Ltd., Herzelia (IL)

( * ) Notice: Subject to any disclaimer, the term of this patent is extended or adjusted under 35 U.S.C. 154(b) by 0 days.

(21) Appl. No.: 09/623,652

(22) PCT Filed: Mar. 9, 1998

(86) PCT No.: PCT/IL99/00137

§ 371 (c)(1),
(2), (4) Date: Sep. 7, 2000

(87) PCT Pub. No.: WO99/46603

PCT Pub. Date: Sep. 16, 1999

(30) Foreign Application Priority Data

| Mar. 9, 1998 | (WO) | PCT/IL98/00113 |
| May 3, 1998 | (IL) | 124300 |
| Jul. 20, 1998 | (IL) | 125431 |
| Oct. 19, 1998 | (IL) | 126656 |

(51) Int. Cl.[7] .......................... G01P 3/36; G01B 11/00; G09G 5/08
(52) U.S. Cl. ................ 356/28; 345/166; 356/400; 356/493; 356/505
(58) Field of Search .................. 356/399, 400, 356/28, 285, 505, 493; 345/166

(56) References Cited

U.S. PATENT DOCUMENTS

| 2,772,479 A | 12/1956 | Doyle |
| 3,419,330 A | 12/1968 | Schneider |
| 3,432,237 A | 3/1969 | Flower et al. |
| 3,511,150 A | 5/1970 | Whitney et al. |
| 3,737,233 A | 6/1973 | Blau et al. |

(List continued on next page.)

FOREIGN PATENT DOCUMENTS

| DE | 26 36 211 B | 6/1977 |
| DE | 42 19 887 C1 | 11/1993 |
| DE | 196 15 568 A1 | 11/1996 |
| EP | 0 479 759 A1 | 4/1992 |
| EP | 0 548 848 B1 | 6/1993 |
| EP | 0 614 086 A | 9/1994 |
| GB | 2 043 387 A | 10/1980 |
| JP | 59-83075 A | 5/1984 |
| JP | HEI 7-120554 | 5/1995 |
| WO | WO 86/06845 A1 | 11/1986 |
| WO | WO 88/07208 A | 9/1988 |
| WO | WO 97/43607 A1 | 11/1997 |

OTHER PUBLICATIONS

Izatt et al.; "In Vivo Bidirectional Color Doppler Flow Imaging of Picoliter Blood Volumes Using Optical Coherence Tomography"; Optics Letters; vol. 23, pp. 1439; 1997.

Naoki, K.; JP 08–285874; Nov. 1, 1996 & Patents Abstracts of Japan; vol. 097; No. 003; Mar. 31, 1997.

Li et al.; "Velocity Sensing by Illumination with a Laser–Beam Pattern"; Applied Optics; vol. 32; p 2320; 1993.

Lin J. et al.; "Development of a New Optical Scale System by the Diffractive Phase Interference Method"; Meas. Sci. Technol.; vol. 6; pp. 293–296; 1995.

(List continued on next page.)

Primary Examiner—Stephen C. Buczinski
(74) Attorney, Agent, or Firm—Fenster & Company Patent Attorneys Ltd.

(57) ABSTRACT

A method for determining the relative motion of a surface with respect to a measurement device comprising: illuminating the surface with incident illumination; detecting illumination reflected from the surface to form at least one detected signal; and determining the amount of relative motion parallel to the surface from said at least one detected signal, characterized in that said determining includes correcting for the effects of relative motion perpendicular to the surface.

66 Claims, 24 Drawing Sheets

U.S. PATENT DOCUMENTS

| | | | |
|---|---|---|---|
| 3,856,403 | A | 12/1974 | Maughmer et al. |
| 3,888,589 | A | 6/1975 | Swift |
| 4,040,741 | A | 8/1977 | Swift |
| 4,148,585 | A | 4/1979 | Bargeron et al. |
| 4,188,124 | A | 2/1980 | Jaerisch et al. |
| 4,719,455 | A | 1/1988 | Louis |
| 4,794,384 | A | 12/1988 | Jackson |
| 4,815,850 | A * | 3/1989 | Kanayama et al. |
| 4,968,877 | A | 11/1990 | McAvinney et al. |
| 4,990,791 | A | 2/1991 | Nishi |
| 5,011,287 | A | 4/1991 | Mino |
| 5,064,280 | A | 11/1991 | Ringens et al. |
| 5,080,465 | A | 1/1992 | Laude |
| 5,098,190 | A * | 3/1992 | Wijntjes et al. |
| 5,100,230 | A | 3/1992 | Brownrigg et al. |
| 5,100,234 | A * | 3/1992 | Ishibashi et al. |
| 5,118,932 | A | 6/1992 | Brownrigg et al. |
| 5,159,406 | A | 10/1992 | Adler et al. |
| 5,165,045 | A | 11/1992 | Eselun |
| 5,175,534 | A | 12/1992 | Thatcher |
| 5,184,009 | A | 2/1993 | Wright et al. |
| 5,216,478 | A | 6/1993 | Kadowaki et al. |
| 5,274,361 | A | 12/1993 | Snow |
| 5,285,157 | A | 2/1994 | Zur |
| 5,317,385 | A * | 5/1994 | Silva et al. |
| 5,355,148 | A | 10/1994 | Anderson |
| 5,459,570 | A | 10/1995 | Swanson et al. |
| 5,483,377 | A | 1/1996 | Kaneda et al. |
| 5,557,396 | A | 9/1996 | Ishizuka et al. |
| 5,559,600 | A * | 9/1996 | Mitchell |
| 5,587,785 | A | 12/1996 | Kato et al. |
| 5,588,437 | A | 12/1996 | Byrne et al. |
| 5,610,705 | A | 3/1997 | Brosman et al. |
| 5,801,889 | A | 9/1998 | Meyers et al. |

OTHER PUBLICATIONS

Matsubara et al.; "Simultaneous Measurement of the Velocity and the Displacement of the Moving Rough Surface by a Laser Doppler Velocimeter"; Applied Optics; vol. 36; p. 4516; 1997.

Popov et al.; "Tangential Velocity Measurements of Diffuse Objects by Using Modulated Dynamic Speckle"; SPIE 0-8194-2264-09/96.

Quercioli, F. et al.; "Correlation Optical Velocimetry with a Compact Disk Pickup"; Applied Optics; vol. 36; No. 25; Sep. 1, 1997; pp. 6372-6375.

Schmidt, J. et al.; "Diffractive Beam Splitter for Laser Doppler Velocimetry"; Optics Letters; vol. 17; No. 17; Sep. 1, 1992; pp. 1240-1242.

Suhara et al.; "Monolithic Integrated-Optic Position/Displacement Sensor Using Waveguide Gratings and QW-DFB Laser"; IEEE Photon. Technol. Letter; vol. 7; p. 1195; 1995.

Bashikansky, M. et al.; "Subsurface Defect Detection in Ceramics by High-Speed High-Resolution Optical coherent Tomography"; Optics Letters, vol. 22;p No. 17; Jan. 1, 1997.

Ennos, A.; "Laser Speckle and Related Phenomena—Speckle Interferometry"; edited by J.C. Dainty; Chapter 6; pp. 203-205; 1975.

* cited by examiner

OPTICAL TRANSLATION MEASUREMENT

FIELD OF THE INVENTION

The present invention is related to the field of velocity and translation measurement and more particularly to methods and apparatus for the non-contact optical measurement of velocity and translation.

BACKGROUND OF THE INVENTION

Various optical methods for the measurement of the relative velocity and/or motion of an object with respect to a measurement system exist. The kinds of objects and the kinds of motions on which it operates characterize each method and apparatus.

The kind of measurable objects may be broadly divided into several groups, including:

A specially patterned object, for example, a scale.

A reflecting surface, for example, a mirror.

A small particle (or few particles), for example precursor particles or bubbles suspended in fluid.

An optically contrasting surface, for example, a line or dot pattern.

An optically diffuse object, for example, blank paper.

The kind of measurable motions may be broadly divided into several groups, including:

Axial movement toward or away from the measuring device.

Transverse (or tangential) motion, where the spacing between the measuring device and the object is essentially constant.

Rotational motion, where the object orientation with respect to the measurement device is changing.

It is also useful to classify the measurement devices according to the number of simultaneously obtainable measurement directions (one, two or three dimensional) and the number of critical components (light sources, light detectors, lenses, etc.).

It should be noted that a specific method may be related to more than one group in the above classification schemes.

A number of systems capable of non-contact measurement of the transverse velocity and/or motion of objects using optical means have been reported. These methods can include Speckle Velocimetry methods and Laser Doppler Velocimetry methods. Other methods of interest for understanding the present invention are Image Velocimetry methods, homodyne/heterodyne Doppler Velocimetry or Interferometry methods and Optical Coherence Tomography (OCT).

Speckle Velocimetry methods are generally based on the following operational principles:

A coherent light source illuminates the object the motion of which needs to be measured.

The illuminated object (generally an opaque surface) consists of multiple scattering elements, each with its own reflection coefficient and phase shift relative to the other scattering elements.

The individual reflection coefficients and phase shifts are substantially random. At a particular point in space, the electric field amplitude of the reflection from the object is the vector sum of the reflections from the illuminated scattering elements, with an additional phase component that depends on the distance between the point and each element.

The light intensity at a point will be high when contributions generally add in phase and low when they generally add out of phase (i.e., subtract).

On a planar surface (as opposed to a point), an image of random bright and dark areas is formed since the relative phase retardation of the source points depends on the location in the, plane. This image is called a "speckle image," composed of bright and dark spots (distinct "speckles").

The typical "speckle" size (the typical average or mean distance for a significant change in intensity) depends primarily on the light wavelength, on the distance between the object and the speckle image plane and on the size of the illuminated area.

If the object moves relative to the plane in which the speckle image is observed, the speckle image will move as well, at essentially the same transverse velocity. (The speckle image will also change since some scatterers leave the illuminated area and some enter it).

The speckle image is passed through a structure comprising a series of alternating clear and opaque or reflecting lines such that the speckle image is modulated. This structure is generally a pure transmission grating, and, ideally is placed close to the detector for maximum contrast.

The detector translates the intensity of the light that passes through the structure to an electrical signal, which is a function of the intensity (commonly a linear function).

When the object moves with respect to the measuring device, the speckle image is modulated by the structure such that the intensity of light that reach the detector is periodic. The period is proportional to the line spacing of the structure and inversely proportional to the relative velocity.

By proper signal analysis, the oscillation frequency can be found, indicating the relative velocity between the object and the measurement device.

For these methods high accuracy frequency determination requires a large detector while high contrast in the signal requires a small detector. A paper by Popov &, Veselov, entitled "Tangential Velocity Measurements of Diffuse Objects by Using Modulated Dynamic Speckle" (SPIE 0-8194-2264-9/96), gives a mathematical analysis of the accuracy of speckle velocimetry.

U.S. Pat. No. 3,432,237 to Flower, el. al. describes a speckle velocimetry measuring system in which either a transmission pattern or a pinhole is used to modulate the speckle image. When the pinhole is used, the signal represents the passage of individual speckles across the pinhole.

U.S. Pat. No. 3,737,233 to Blau et. al. utilizes two detectors in an attempt to solve the problem of directional ambiguity, which exists in many speckle velocimetric measurements. It describes a system having two detectors each with an associated transmission grating. One of the gratings is stationary with respect to its detector and the other moves with respect to its detector. Based on a comparison of the signals generated by the two detectors, the sign and magnitude of the velocity may be determined.

U.S. Pat. No. 3,856,403 to Maughmer, et al. also attempts to avoid the directional ambiguity by providing a moving grating. It provides a bias for the velocity measurement by moving the grating at a velocity higher then the maximum expected relative velocity between the surface and the velocimeter. The frequency shift reduces the effect of changes in the total light intensity (DC and low-frequency component), thus increasing the measurement dynamic range and accuracy.

PCT publication WO 86/06845 to Gardner, et al. describes a system designed to reduce the amplitude of DC and low frequency signal components of the detector signal by subtracting a reference sample of the light from the source from the speckle detector signal. The reference signal is proportional to the total light intensity on the detector, reducing or eliminating the influence of the total intensity variations on the measurement.

This reference signal is described as being generated by using a beam-splitter between the measured surface and the primary detector by using the grating that is used for the speckle detection also as a beam-splitter (using the transmitted light for the primary detector and the reflected light for the reference detector) or by using a second set of detectors to provide the reference signal. In one embodiment described in the publication the two signals have the same DC component and opposite AC components such that the difference signal not only substantially removes the DC (and near DC) components but also substantially increases the AC component.

In U.S. Pat. No. 4,794,384, Jackson describes a system in which a speckle pattern reflected from the measured surface is formed on a 2D CCD array. The surface translation in 2 dimensions is found using electronic correlation between successive images. He also describes an application of his device for use as a "padless optical mouse."

Image velocimetry methods measure the velocity of an image across the image plane. The image must include contrasting elements. A line pattern (much like a grating) space-modulates the image, and a light-sensitive detector is measuring the intensity of light that passes through the pattern. Thus, a velocity-to-frequency relation is formed between the image velocity and the detector AC component. Usually, the line pattern moves with respect to the detector so that the frequency is biased. Thus, the direction ambiguity is solved and the dynamic range expanded.

A paper by Li and Aruga, entitled "Velocity Sensing by Illumination with a Laser-Beam Pattern" (Applied Optics, 32, p.2320, 1993) describes image velocimetry where the object itself is illuminated by a periodic line structure (instead of passing its image through such a pattern). The line pattern is obtained by passing an expanded laser beam through periodic transmission grating (or line structure). According to the suggested method the object still needs to have contrasting features.

There exist a number of differences between Image Velocimetry (TV) and Speckle Velocimetry (SV). In particular, in SV the random image is forced by the coherent light source, whereas in IV an image with proper contrasting elements is already assumed. Furthermore, in SV the tangential velocity of the object is measured, whereas in IV the angular velocity is measured (the image velocity in the image plane is proportional to the angular velocity of the line of sight).

In U.S. Pat. No. 3,511,150 to Whitney et. al., two-dimensional translating of line patterns creates a frequency shift. A single rotating circular line pattern creates all the necessary translating line patterns at specific elongated apertures in a circular mask. The frequency shift is measured on-line using an additional detector measuring a fixed image. The line pattern is divided to two regions, each one adapted for the measurement of different velocity range. The system is basically intended for image motion compensation in order to reduce image blur in aerial photography. Also, it is useful for missile homing heads.

U.S. Pat. No. 2,772,479 to Doyle describes an image velocimetry system with a frequency offset derived from a grating on a rotating belt.

Laser Doppler Velocimeters generally utilize two laser beams formed by splitting a single source which interfere at a known position. A light-scattering object that passes through the interfering space scatters light from both beams to a detector. The detector signal includes an oscillating element with frequency that depends on the object velocity. The phenomena can be explained in two ways. One explanation is based on an interference pattern that is formed between the two beams. Thus, in that space the intensity changes periodically between bright and dark planes. An object passing through the planes scatters the light in proportion to the light intensity. Therefore, the detected light is modulated with frequency proportional to the object velocity component perpendicular to the interference planes. A second explanation considers that an object passing through the space in which both light beams exist, scatters light from both. Each reflection is shifted in frequency due to the Doppler effect. However, the Doppler shift of the two beams is different because of the different angles of the incident beams. The two reflections interfere on the detector, such that a beat signal is established, with frequency equal to the difference in the Doppler shift. This difference is thus proportional to the object velocity component perpendicular to the interference planes.

It is common to add a frequency offset to one of the beams so that zero object velocity will result in a non-zero frequency measurement. This solves the motion direction ambiguity (caused by the inability to differentiate between positive and negative frequencies) and it greatly increases the dynamic range (sensitivity to low velocities) by producing signals far from the DC components. The frequency offset also has other advantages related to signal identification and lock-on.

U.S. Pat. No. 5,587,785 to Kato, et. al. describes such a system. The frequency offset is implemented by providing a fast linear frequency sweep to the source beam before it is split. The method of splitting is such that a delay exists between the resulting beams. Since the frequency is swept, the delay results in a fixed frequency difference between the beams.

Multiple beams with different frequency offsets can be extracted by further splitting the source with additional delays. Each of these delays is then used for measuring a different velocity dynamic range.

A paper by Matsubara, et al., entitled "Simultaneous Measurement of the Velocity and the Displacement of the Moving Rough Surface by a Laser Doppler Velocimeter" (Applied Optics, 36, p. 4516, 1997) presents a mathematical analysis and simulation results of the measurement of the transverse velocity of a rough surface using an LDV. It is suggested that the displacement along the axial axis can be calculated from measurements performed simultaneously by two detectors at different distances from the surface.

In Homodyne/Heterodyne Doppler Measurements, a coherent light source is split into two beams. One beam (a "primary" beam) illuminates an object whose velocity is to be measured. The other beam (a "reference" beam) is reflected from a reference element, usually a mirror, which is part of the measurement system. The light reflected from the object and from the reference element are recombined (usually by the same beam splitter) and directed to a light-sensitive detector.

The frequency of the light reflected from the object is shifted due to the Doppler effect, in proportion to the object velocity component along the bisector between the primary beam and the reflected beam. Thus, if the reflected beam coincides with the primary beam, axial motion is detected.

The detector is sensitive to the light intensity, i.e.- to the square of the electric field. If the electric field received from the reference path on the detector is $E_0(t)=E_0 \cos(\omega_0 t+\phi_0)$ and the electric field received from the object on the detector is $E_1(t)=E_1 \cos(\omega_1 t+\phi_1)$, then the detector output signal is proportional to $(E_0+E_1)^2=E_0^2+E_0E_1+E_1^2$.

The first term on the right side of the equation is averaged by the detector time-constant and results in a DC component. The intensity of the reference beam is generally much stronger than that of the light reaching the detector from the object, so the last term can usually be neglected. Developing the middle term:

$$E_0E_1=E_0E_1 \cos(\omega_0 t+\phi_0)\cos(\omega_1 t+\phi_1)=\tfrac{1}{2}E_0E_1[\cos((\omega_0+\omega_1)t+\phi_0+\phi_1)+\cos((\omega_0-\omega_1)t+\phi_0-\phi_1)]$$

From this equation it is evident that $E_0E_1$ includes two oscillating terms. One of these terms oscillates at about twice the optical frequency, and is averaged to zero by the detector time-constant. The second term oscillates with frequency $\omega_0-\omega_1$, i.e.—with the same frequency as the frequency shift due to the Doppler effect. Thus, the detector output signal contains an oscillating component with frequency indicative of the measured velocity.

It is common to add a frequency offset to the reference beam. When such a frequency bias is added, it is termed Heterodyne Detection.

U.S. Pat. No. 5,588,437 to Byrne, et al. describes a system in which a laser light source illuminates a biological tissue. Light reflected from the skin surface serves as a reference beam for homodyne detection of light that is reflected from blood flowing beneath the skin. Thus, the skin acts as a diffused beam splitter close to the measured object. An advantage of using the skin as a beam splitter is that the overall movement of the body does not effect the measurement. Only the relative velocity between the blood and the skin is measured. The arrangement uses two pairs of detectors. Each pair of detectors is coupled to produce a difference signal. This serves to reduce the DC and low-frequency components interfering with the measurement. A beam scanning system enables mapping of the two-dimensional blood flow.

In Optical Coherence Tomography (OCT), a low-coherence light source ("white light") is directed and focused to a volume to be sampled. A portion of the light from the source is diverted to a reference path using a beam-splitter. The reference path optical length is controllable. Light reflected from the source and light from the reference path are recombined using a beam-splitter (conveniently the same one as used to split the source light). A light-sensitive detector measures the intensity of the recombined light. The source coherence length is very short, so only the light reflected from a small volume centered at the same optical distance from the source as that of the reference light coherently interferes with the reference light. Other reflections from the sample volume are not coherent with the reference light. The reference path length is changed in a linear manner (generally periodically, as in sawtooth waveform). This allows for a sampling of the material with depth. In addition, a Doppler frequency shift is introduced to the measurement, allowing for a clear detection of the coherently-interfering volume return with a high dynamic range.

In conventional OCT, a depth profile of the reflection magnitude is acquired, giving a contrast image of the sampled volume. In more advanced OCT, frequency shifts, from the nominal Doppler frequency, are detected and are related to the magnitude and direction of relative velocity between the sampled volume (at the coherence range) and the measurement system.

U.S. Pat. No. 5,459,570 to Swanson, et al. describes a basic OCT system and numerous applications of the system.

A paper by Izatt et al., entitled "In Vivo Bidirectional Color Doppler Flow Imaging of Picoliter Blood Volumes Using Optical Coherence Tomography" (Optics Letters 22, p.1439, 1997) describes an optical-fiber-based OCT with a velocity mapping capability. An optical-fiber beam-splitter is used to separate the light paths before the reflection from the sample in the primary path and from the mirror in the reference path and combine the reflections in the opposite direction.

A paper by Suhara et al., entitled "Monolithic Integrated-Optic Position/Displacement Sensor Using Waveguide Gratings and QW-DFB Laser" (IEEE Photon. Technol. Lett. 7 p.1195, 1995) describes a monolithic, fully integrated interferometer, capable of measuring variations in the distance of a reflecting mirror from the measuring device. The device uses a reflecting diffraction element (focusing distributed Bragg reflector) in the light path from the source as a combined beam-splitter and local oscillator reflector. Direction detection is achieved by an arrangement that introduces a static phase shift between signals of the detectors.

Each of the above referenced patents, patent publications and references is incorporated herein by reference.

SUMMARY OF THE INVENTION

The present invention, in its broadest form, provides an Optical Translation Measurement (OTM) method and device, capable of providing information indicative of the amount and optionally the direction of relative translation between the device and an adjacent object. Preferably, the object is at least partly rough and is closely spaced from the device. As used herein, the terms "rough" or "diffuse" mean optically irregular or non-uniform. In particular, the object may have a diffuse opaque or semi-transparent surface such as a paper. This specification deals mainly with determining the translation or velocity of such diffuse surfaces. However, it should be understood that many of the methods of the invention may also be applicable to determination of translation of other types of objects such as small scattering particles, possibly suspended in fluid. Translation of the object means that its rotation in space may be neglected, as explained below.

In a first aspect of some preferred embodiments thereof, the invention provides heterodyne or homodyne detection of non-Doppler, non-speckle-image signals derived from changes in the phase and/or the amplitude of reflection from an optically irregular surface.

In a second aspect of some preferred embodiments thereof, applicable to various methods of motion or velocity detection, the invention provides a system in which a reflector, which reflects part of the incident light, is placed next to the surface whose motion is to be measured. The reflector provides a local oscillator signal that is inherently coherent with the light that is reflected from the surface. This aspect of the invention is applicable to both Doppler and non-Doppler methods of motion detection.

In a preferred embodiment of the invention, the partial reflector is a grating and the illumination of the surface whose motion is measured pass through the grating. In a preferred embodiment of the invention, the grating covers a portion of the measured surface and has a substantial amount of transmission. In this preferred embodiment of the invention, the reflections from the surface pass through the grating. A combination of reflection and partial transmission is often useful, especially in preferred embodiments of the invention which utilize the third aspect of the invention.

In a third aspect of some preferred embodiments of the invention, a non-symmetrical transmission pattern is provided to aid in determining the direction of motion of the surface.

In a fourth aspect of some preferred embodiments of the invention, a phase shift is introduced between at least part of the reflection from the partial reflector and at least part of the reflection from the surface. This phase shift enables the determination of the direction of motion, increases the dynamic range and improves the signal-to-noise ratio.

This phase shift may, in some preferred embodiments of the invention, be dynamic, i.e., time varying. Such phase variations are conveniently performed by moving the reflector either perpendicularly to the surface or parallel to the surface or a combination of both. Also, the movement may be of a pattern on the reflector, e.g.—the movement of a standing wave acting as a grating in a Surface Acoustic Wave (SAW) component. In this respect it is the pattern on the reflector that moves, and not the whole reflector. Alternatively, the phase shift is introduced by periodically varying the optical path length between the reflector and the surface, e.g. by inserting a piezo-electric material in the optical path.

The phase shift may also be a static phase shift. Conveniently, this static phase shift is introduced between polarization components of one of the beams (or a part of the energy in the beam). The direction of motion is determined by a measurement of a corresponding phase change between detected signals, and more particularly by measurement of the sign of the phase change, between the signals.

In some preferred embodiments of the invention, which incorporate this aspect of the invention, a polarizer is utilized to polarize the illumination reflected from the surface. This is especially important when the surface is not polarization preserving.

A fifth aspect of some preferred embodiments of the invention provides for Doppler based detection of motion of a surface in a direction parallel to the surface. In this aspect of the invention, a single beam may be incident at an angle to the surface or may even be incident perpendicular to the surface.

A sixth aspect of some preferred embodiments of the invention provides for simultaneous two or three dimensional translation detection using a single illuminating beam and a single reflector to provide local oscillator reference beams. In a preferred embodiment of the invention, the signal generated by a single detector is used to determine the translation in two dimensions.

In a seventh aspect of some preferred embodiment of the invention, a spatial filter is provided such that substantially only a single spatial frequency of the illumination reflected from the surface is detected by the detector.

In some preferred embodiments of the invention, which incorporate this aspect of the invention, the spatial filter comprises a lens having a focal point and a pinhole that is placed at the focal point of the lens.

Preferably, the illumination of the surface is collimated and the spatial filter filters the reflected illumination such that only radiation reflected from the surface substantially in a single direction is incident on the detector.

In an eighth aspect of some preferred embodiments of the invention the spatial filter is realized by an "effective pinhole." This effective pinhole is achieved by focusing a local oscillator field, as for example light reflected or diffracted from a grating, on the detector. In this way, amplification of the field reflected from the surface is achieved only at the focus of the local oscillator field.

Preferred embodiments of the invention, which utilize an effective pinhole, are easier to align and have looser tolerance requirements. This is especially true when the local oscillator is derived from light diffracted from a grating at non-zero order since for this case the placement of the pinhole depends on wavelength. Thus, the wavelength stability requirement of the source of illumination is much relaxed when an effective, rather than a physical pinhole is utilized.

A device, according to a preferred embodiment of the invention, includes a light source, a grating, a spatial filter, a photo-detector, and signal processing electronics. The light source provides at least partially coherent radiation, which is directed toward the surface, such that part of the illumination is reflected or back diffracted from the grating towards the detector. An optical grating is placed between the surface and the light source, preferably close to the surface. The light reflected from the surface interferes with the light that is reflected or back diffracted from the grating. The detector signal includes an oscillating component, that is representative of the surface translation relative to the optical device. The interference may take place with the normal reflection from the grating or with light diffracted at any of the grating orders. Most preferably, the light is spatially filtered prior to detection by the detector. Two dimensional translation measurement may be achieved by using two or more detectors illuminated by orthogonal reflection orders from a two-dimensional grating or by utilizing two separate gratings for the two directions. A third dimension may be deduced by vector calculation of the translations measured in different orders at the same axis using different signal analysis techniques on the same signal.

Optional detection of the direction of translation (as opposed to its absolute magnitude) is preferably achieved by modulating the grating position to provide a frequency offset. Alternatively, a varying optical path length between the grating and the surface introduces the frequency offset. Alternatively, phase shift is introduced between different polarization components to provide for direction-dependent phase difference between corresponding detected signals. Alternatively, the direction may be determined by other means.

A ninth aspect of some preferred embodiments of the invention relates to alternative methods of determining the direction of motion. In preferred embodiments of the invention which provide this aspect of the invention, mechanical motion of an optical part is utilized to determine the direction of motion. In some preferred embodiments of the invention, two detectors are provided. Motion in one direction causes illumination of one of the detectors by light reflected or refracted from the grating. Motion in the other direction causes illumination of the other detector.

A tenth aspect of some preferred embodiments of the invention relates to a method utilizing Doppler shifting of the light reflected from the surface. A local oscillator field is provided by light reflected from a reflecting surface situated at an angle from the moving surface. The light reflected from the reflecting surface and the light reflected from the moving surface interfere on a detector to produce a signal with a frequency proportional to the relative velocity of the two surfaces. This method has the advantage that no grating is required and the alignment and frequency stability of the illumination is substantially uncritical.

The methods and devices of the invention are applicable to a wide range of applications that require measurement of translation. One such application is a "padless optical mouse", that can effectively control a cursor movement by moving the mouse across an optically diffuse surface such as a paper or a desktop. Another exemplary application for the invention is for a "touch-point", that translates finger movement over a device aperture to control a cursor or any other translation or velocity controlled entity.

In accordance with a preferred embodiment of the invention, the measurement apparatus comprises a light source for providing at least partially coherent radiation. The source radiation is directed toward an optical one-dimensional or two-dimensional grating, which is preferably close to the surface. The light reflections from the grating and from the surface interfere, and the light is collected through a spatial filter (for example, a lens and a pinhole at its focal point) onto a light-detector. The resulting interference signal contains beats related to the relative translation of the optical apparatus and the surface. In preferred embodiments of the invention, the translation is measured directly by counting zero crossings of the oscillating detector signal and is thus not subject to errors caused by velocity changes. For preferred embodiments of the invention, substantially instantaneous position determination is established.

In many applications the translation direction as well as its magnitude is required. In a preferred embodiment of the invention, this is accomplished by incorporating a dynamic phase shifting device (such as a piezoelectric transducer) which creates an asynmmetric phase shift pattern (typically a saw-tooth waveform) between the light reflected from the grating and from the surface, enabling simple extraction of the direction information.

In another preferred embodiment of the invention, a static phase shift is introduced between different polarization components of a beam and direction is determined utilizing a resultant phase difference between corresponding detected signals.

Alternatively, direction detection is accomplished by using a, preferably specially designed, asymmetric transmission pattern for the grating/matrix (such as a saw-tooth transmission or other form as described herein) with appropriate signal processing/manipulation on the detector output signal. An asymmetric transmission pattern provides means for motion direction detection in other velocimetry methods as well, such as speckle velocimetry. Alternatively, direction detection is provided by utilizing a mechanically movable element that switches the reflected illumination between detectors, dependent on the direction of motion.

A speckle-free, coherent detection of translation may be determined by collecting the scattered light (the light which passes through the grating and is reflected from the moving surface) with a spatial filter, such as a combination of a focusing lens and a pinhole aperture (or single mode optical fiber) at the focal position of the lens. The light reflected from the surface is combined with a local oscillator light field (which is preferably the light reflected or diffracted by the grating itself), which field is preferably a part of the light beam that also passes through the spatial filter. The interference with the strong local oscillator light source provides amplification of the detected signal by an intensity-sensitive photodetector. This coherent detection method is termed homodyne detection.

The spatial filter is operative to spatially integrate light reflected from the surface to a detector, such that the relative phases of the reflections from different locations on the surface are essentially unchanged when the surface moves with respect to the detector. Furthermore, the phase of a scatterer on the surface (as measured at the detector) depends linearly on the surface translation. Also, the spatial filter is ideally used to filter the local oscillator such that the detector will integrate over no more than a single interference fringe resulting from the interference between the local oscillator and the light reflected from the surface.

In one extreme case, the light incident on the surface is perfectly collimated (i.e.—it is a plane wave). Thus, the spatial filter may simply be a lens with a pinhole positioned at its focal point. Any translation of the surface does not change the relative phases of the light integrated by the spatial filter. The local oscillator beam formed by the reflection or the diffraction from the reflector or grating is also perfectly collimated, so that it can also be passed through the spatial filter (the spatial filter is positioned such that the image of the source falls on or within the pinhole). This forces a single interference fringe on the detector. No limitations are imposed (with regard to spatial filtering) on the spacing between the reflector and the surface.

In another extreme case, the spacing between the surface and the reflector is negligible. This allows for the use of a substantially non-collimated incident beam while still maintaining the relative phases of the reflections from the surface irrespective of it's translation and also maintaining the same focusing point for the local oscillator and the reflection from the surface. Optionally, the spatial filter may be implemented with a lens and a pinhole positioned at the image plane of the reflection of the source as a local oscillator.

In order to have (at most) a single speckle integrated by the detector, the pinhole size should not exceed the size of about a single speckle formed by the reflection from the surface (for this reason, the measurement may be termed "speckle-free"). Thus, if the detector itself is small enough, it may serve as an integral part of the spatial filter and a pinhole is not required.

The preferred conditions of unchanged relative phases and single interference fringe with the local oscillator at the detector can be fulfilled in a multitude of optically substantially equivalent ways. In particular, the requirement may be established using a single converging lens positioned before or after the reflection of the light from the local oscillator reflector. Alternatively, the lens and the reflector can be combined in a single optical device. Also, a collimating lens may be positioned between the beam-splitter and the surface (i.e.—only light to and from the surface pass through this lens).

Non-ideal spatial filtering (as when the pinhole is too large, or when it is out of focus for either the reflection from the surface or the local oscillator or both), results in deterioration of the signal and possibly the addition of noise to the measurement. The level of deterioration depends on the amount and kind of deviation from the ideal.

In a preferred method according to the present invention, both the surface illumination and the reference light are provided using a single optical element, preferably a grating. The surface and reference light share a single optical path through most or all of the optical elements in the device. Moreover, spatial amplitude and/or phase modulation, may be imposed on the light reaching the surface by the grating to provide additional means for measuring the surface's translation. In particular, tangential translation can be measured even for specular reflection from the grating, where no Doppler shift exists, and identification of the direction of motion can also be achieved.

In an eleventh aspect of some preferred embodiments of the invention, an integrated motion detection system provides signals that are indicative of the amplitude and, optionally, the direction of the motion. In a preferred embodiment of the invention at least some of the components of the motion detection system are mounted on an optical substrate. These components preferably include at least a source of radiation and an optical element, such as a grating, a reflector or a partial reflector, which generates a local oscillator field from the radiation. Also mounted on the optical substrate is a detector that is illuminated by the local oscillator field and radiation reflected from the surface whose relative motion is measured. In this embodiment of the invention, the path lengths of the local oscillator field and the field reflected from the surface whose motion is measured is such that the two fields are coherent at the detector.

In a twelfth aspect of some preferred embodiments of the invention, accurate measurement of motion parallel to the surface is obtained by compensation of the influence of motion perpendicular to the surface and compensation of the influence of tilting of the measurement device. This aspect of the invention is especially useful for use in a computer control device such as a computer mouse.

There is thus provided, in accordance with a preferred embodiment of the invention, a method for determining the relative motion of a surface with respect to a measurement device comprising:

illuminating the surface with incident illumination;

detecting illumination reflected from the surface to form at least one detected signal; and determining the amount of relative motion parallel to the surface from said at least one detected signal, characterized in that said determining includes correcting for the effects of relative motion perpendicular to the surface.

Preferably, said at least one signal comprises at least two signals, at least one first signal which is affected by relative motion parallel to the surface and relative motion perpendicular to the surface and at least one second signal which is affected at least by motion perpendicular to the surface, and determining comprises determining the amount of relative motion parallel to the surface from the two signals.

Preferably, determining comprises:

determining a first amount of relative motion from at least one of said two signals, said first amount of relative motion including a component parallel to the surface and a component perpendicular to the surface;

determining a second amount of relative motion from at least one of said two signals, said second amount of relative motion including a component perpendicular to the surface; and determining the amount of relative motion parallel to the surface responsive to the first and second determined amounts of relative motion.

Preferably, the second amount of relative motion does not include a component parallel to the surface.

Preferably, the second amount of relative motion includes a component parallel to the surface.

In a preferred embodiment of the invention, relative motion perpendicular to the surface is determined based on a Doppler shift of the reflected illumination.

In a preferred embodiment of the invention, determining comprises determining the amount of relative motion parallel to the surface directly from the two signals without determining the amount of relative motion perpendicular to the surface. Preferably, the at least one second signal is substantially determined by relative motion perpendicular to the surface.

In a preferred embodiment of the invention, the at least one second signal is a signal based on a Doppler shift.

Preferably, the at least one second signal is responsive to relative motion parallel to the surface.

In a preferred embodiment of the invention, the method includes determining the amount of relative motion perpendicular to the surface.

In a preferred embodiment of the invention, determining the amount of relative motion parallel to the surface includes determining the amount of relative motion along two non-colinear directions.

In a preferred embodiment of the invention, the illumination is perpendicularly incident on the surface.

In a preferred embodiment of the invention, detecting comprises coherently detecting. Preferably, the method includes reflecting or diffracting a portion of the illumination from an object, which is part of the measurement device, to act as a local oscillator. Preferably, the object is a partially reflecting object through which either the incident or reflected illumination passes. Preferably, both the incident and reflected illumination pass through the object.

In a preferred embodiment of the invention the object is adjacent to the surface.

In a preferred embodiment of the invention, the surface is in the near field of the object. Alternatively, the surface is outside the near field of the grating.

In a preferred embodiment of the invention, the object is a grating. Preferably, the grating produces essentially only a single order of transmitted illumination that illuminates the surface.

Preferably, the illumination is at least partially coherent and the object is placed within the coherence length of the illumination from the surface.

In a preferred embodiment of the invention, the local oscillator illumination and the reflected illumination are incident on at least one detector to produce said signals and the local oscillator illumination and the reflected illumination are at least partly coherent at the detector.

There is further provided, in accordance with a preferred embodiment of the invention, apparatus for measuring relative motion between the apparatus and a surface comprising:

an illumination source, which transmits illumination to illuminate the surface;

a first detector which receives illumination from the source, reflected from the surface;

an object which reflects a portion of the illumination to said first detector, such that the detector generates a first signal based on coherent detection of the illumination reflected from the surface with the illumination reflected by the object as a local oscillator;

a second detector which receives illumination from the source without receiving illumination reflected from the surface and generates a second signal responsive thereto;

a signal corrector that adjusts the first signal for changes in the intensity of the illumination, based on the second signal; and a motion calculator that calculates the relative motion responsive to the signal from the signal corrector.

Preferably, the illumination from the source received by the second detector is illumination reflected from or diffracted by the object.

Preferably, the signal corrector corrects the first signal for a constant term based on the second signal. Preferably, the signal corrector includes a difference amplifier that receives the first signal and subtracts the second signal from it to produce an adjusted first signal. Preferably, the signal corrector includes a normalizer that receives the adjusted first signal and normalizes it with respect to the second signal.

In a preferred embodiment of the invention, the apparatus includes:

a third detector that receives illumination reflected from the surface without receiving substantial illumination from the object or from the source and produces a third signal in response thereto, and the signal corrector corrects the adjusted signal based on the third signal.

There is further provided, in accordance with a preferred embodiment of the invention, apparatus for measuring relative motion between the apparatus and a surface comprising:

an illumination source, which transmits illumination to illuminate the surface;

a first detector which receives illumination from the source, reflected from the surface;

an object which reflects a portion of the illumination to the first detector, such that the detector generates a first signal based on coherent detection of the illumination reflected from the surface with the illumination reflected by the object as a local oscillator;

a second detector which receives illumination from the source without receiving illumination reflected from the surface and generates a second signal responsive thereto;

a signal corrector that reduces the first signal by an amount proportional to the second signal; and a motion calculator that calculates the relative motion responsive to the signal from the signal corrector.

Preferably, the illumination from the source received by the second detector is illumination reflected from or diffracted by the object.

In a preferred embodiment of the invention, the signal corrector includes a normalizer that adjusts the first signal for changes in the intensity of the illumination, based on the second signal.

In a preferred embodiment of the invention the apparatus includes:

a third detector that receives illumination reflected from the surface without receiving substantial illumination from the object or from the source and produces a third signal in response thereto, and the signal corrector corrects the adjusted signal based on the third signal.

There is further provided, in accordance with a preferred embodiment of the invention, apparatus for measuring relative motion between the apparatus and a surface comprising:

an illumination source, which transmits illumination to illuminate the surface;

a first detector which receives illumination from the source, reflected from the surface;

an object which reflects a portion of the illumination to said first detector, such that the detector generates a first signal based on coherent detection of the illumination reflected from the surface with the illumination reflected by the object as a local oscillator;

a second detector that receives illumination reflected from the surface without receiving substantial illumination from the object or from the source and produces a second signal in response thereto, a signal corrector that reduces the first signal by an amount proportional to the second signal; and a motion calculator that calculates the relative motion responsive to the signal from the signal corrector.

In a preferred embodiment of the invention, the object is partially transmitting and the object is placed between the illumination source and the surface such that illumination of the surface passes through the object.

In a preferred embodiment of the invention, the illumination has a coherence length and the object and the surface as situated within said coherence length.

In a preferred embodiment of the invention, the object is a grating. Preferably, the grating produces essentially only a single order of transmitted illumination that illuminates the surface. Preferably, the surface is within the near field of the grating. Alternatively, the surface is outside the near field of the grating.

In a preferred embodiment of the invention, the illumination reflected from the surface and the illumination reflected by the object are at least partly coherent at the first detector.

There is further provided, in accordance with a preferred embodiment of the invention, a method for determining the relative motion of a surface with respect to a measurement device, comprising:

illuminating the surface with incident illumination such that the illumination is reflected from portions of the surface;

coherently detecting the illumination reflected from the surface utilizing illumination derived from said incident illumination that was not reflected by the surface as a local oscillator, to form at least two signals;

determining the magnitude of relative motion of the surface from at least one of the two signals;

varying the phase of at least part of the local oscillator illumination with respect to at least part of the illumination reflected by the surface; and determining the direction of relative motion parallel to the surface based on a characteristic of the signals caused by said varied relative phase.

Preferably, the local oscillator illumination is generated by reflection or refraction of incident illumination from an object that is a part of the measurement device. Preferably, the object is adjacent to the surface. Preferably, the illumination has a coherence length and the object and the surface are situated within said coherence length. Preferably, the object is a grating. Preferably, the grating produces essentially only a single order of transmitted illumination that illuminates the surface. Preferably, the surface is placed within the near field of the grating. Alternatively, the surface is placed outside the near field of the grating.

In a preferred embodiment of the invention, varying the phase comprises introducing a static phase change and determining the direction of relative motion comprises determining the direction of relative motion based on a characteristic of the signal caused by said static phase change.

In a preferred embodiment of the invention, the method includes:

dividing the illumination that is reflected from the surface into a first illumination having a first phase and a second illumination having a second phase.

Preferably, the first illumination and the second illumination have different polarizations.

Preferably, dividing comprises passing the illumination incident on the surface through a birefringent material.

Alternatively or additionally, dividing comprises passing the illumination reflected from the surface through a birefringent material. Preferably, the method includes placing a birefringent material between the object and the surface.

In a preferred embodiment of the invention, placing the birefringent material between the object and the surface is operative to cause detected illumination to pass through the birefringent material twice.

In a preferred embodiment of the invention, the method includes determining the magnitude and direction of the translation utilizing two detectors which produce different detected signals depending on the direction of the translation. Preferably, determining the direction of translation comprises determining the direction from the sign of the phase difference between the different detected signals.

Preferably, the method includes linearly polarizing illumination reflected from the surface.

There is further provided, in accordance with a preferred embodiment of the invention, apparatus for determining translation of a surface relative to the apparatus, comprising:
 an optical block;
 a detector, which produces a signal responsive to light impinging thereon, attached to the optical block; and
 a source of illumination that produces illumination, a portion of which passes through the block is reflected by the surface and impinges on the detector after passing through the optical block; and
 circuitry that computes the magnitude of the translation parallel to the surface, responsive to the signal.

Preferably, the apparatus includes an object within or on the surface of the block which reflects or diffracts a part of the illumination to the detector without said part impinging the surface, said part acting as a local oscillator for synchronous detection of the reflected illumination by the detector.

There is further provided, in accordance with a preferred embodiment of the invention, a method for determining the relative motion of a surface with respect to a measurement device, comprising:
 illuminating the surface with incident radiation such that the illumination is reflected from a portion of the surface;
 detecting at least a first part of the illumination reflected from the surface to form a first detected signal;
 detecting at least a second part of the illumination reflected from the surface to form a second detected signal; and
 determining the amount of relative motion based on a Doppler shift of the reflected radiation, wherein the first and second signals are in phase quadrature and the detection comprises quadrature detection.

Preferably, the method includes detecting the direction of relative motion responsive to said first and second signals.

Preferably, the method includes determining the relative motion in two non-colinear directions parallel to the surface.

Preferably, the method includes determining the relative motion in a direction perpendicular to the surface.

Preferably, the method includes determining the relative motion comprises counting zero crossings of at least one of said first and second signals.

Preferably, detecting comprises coherent detection.

There is further provided, in accordance with a preferred embodiment of the invention, a method for determining the relative motion of a surface with respect to a measurement device, comprising:
 illuminating the surface with incident illumination such that the illumination is reflected from portions of the surface;
 coherently detecting the illumination reflected from the surface using a detector, to form a signal;
 utilizing illumination derived from said incident illumination that was not reflected by the surface as a local oscillator, for said coherent detection; and
 determining the magnitude of relative motion of the surface from the signal; characterized in that the local oscillator is focused onto a small area of the detector, such that essentially only a single spatial frequency of the reflected illumination forms an interference field with said local oscillator on the detector.

There is further provided, in accordance with a preferred embodiment of the invention, apparatus for determining the relative motion of a surface with respect to the apparatus, comprising:
 a housing having an aperture formed therein;
 a detector within the housing that produces a signal utilized to determine the relative motion;
 a source of laser illumination of a given wavelength, within the housing, that illuminates the surface through the aperture, such that illumination is reflected from the surface via the aperture to the detector; and
 a filter covering the aperture that passes the given wavelength while blocking light at other wavelengths to which the detector is sensitive.

There is further provided, in accordance with a preferred embodiment of the invention, apparatus for determining the relative motion of a surface with respect to the apparatus, comprising:
 a housing having an aperture formed therein;
 a detector within the housing that produces a signal utilized to determine the relative motion;
 a source of laser illumination of a given wavelength, within the housing, that illuminates the surface through the aperture, such that illumination is reflected from the surface via the aperture to the detector;
 a second detector within the housing that receives illumination reflected from the surface; and
 circuitry that turns off the illumination source when illumination received by the second detector falls below a threshold.

Preferably, the circuitry is operative to periodically turn on the source and to turn it off if illumination received by the second detector is below the threshold.

Preferably, the aperture is covered by a filter that passes the given wavelength while blocking light at other wavelengths to which the first and second detectors is sensitive.

In a preferred embodiment of the invention, a part of the illumination to the detector illuminates the detector, without said part first impinging the surface, said part acting as a local oscillator for coherent detection of the reflected illumination by the detector.

In a preferred embodiment of the invention, the reflected illumination is Doppler shifted, by said translation, with respect to the illumination produced by the source and said Doppler shift is utilized in determining the motion.

There is further provided, in accordance with a preferred embodiment of the invention, apparatus for measuring relative motion between the apparatus and a surface comprising:
 an illumination source, which is used to illuminate the surface;
 a detector which receives illumination from the source, reflected from the surface and which receives a portion of the illumination without said portion being reflected by the surface, such that the detector generates a signal based on coherent detection of the illumination reflected from the surface with the portion of the illumination as a local oscillator, wherein said signal has a frequency related to a rate of relative movement; and a motion calculator that calculates the amount of relative motion responsive to a count of zero crossings of the signal.

Preferably, the detector includes and including a high pass filter that filters the detector output to form said signal. Preferably, the high pass filter has a slope of less than about 20 dB/octave. Preferably, the high pass filter has a break point at a frequency corresponding to a rate of movement of less than about 0.5 mm/sec.

Preferably, the apparatus includes:

a second detector that detects at least a second part of the illumination reflected from the surface to form a second detected signal utilizing coherent detection, and the motion detector determines the amount of relative motion based on a Doppler shift of the reflected radiation, wherein the signal and second detected signal are in phase quadrature and the detection comprises quadrature detection.

There is further provided, in accordance with a preferred embodiment of the invention, apparatus for determining the relative motion of a surface with respect to the apparatus, comprising:

a housing having an aperture formed therein;

a detector within the housing that produces a signal utilized in determining the relative motion is determined;

a source of laser illumination of a given wavelength, within the housing, that illuminates the surface through the aperture, such that illumination is reflected from the surface via the aperture to the detector; and circuitry that turns off the illumination source when illumination received by the detector from the surface is below a threshold.

Preferably, the circuitry is operative to periodically turn on the source and to turn it off if illumination received by the detector from the surface.

There is further provided, in accordance with a preferred embodiment of the invention, a method for determining the relative motion of a surface with respect to a measurement device, comprising:

placing a partially transmitting object as part of the measuring device, adjacent to the surface;

illuminating the surface with incident illumination such that the illumination is reflected from portions of the surface, wherein at least part of at least one of the incident and reflected illumination passes through the object;

detecting the illumination reflected from the surface, to generate a detected signal, wherein the object and the surface are situated within a distance that is less than the coherence length of the detected illumination; and determining the relative motion of the surface parallel to the surface, from the detected signal.

Preferably, the transmission of the object is spatially varying.

In a preferred embodiment of the invention, the object is partially reflecting and part of the incident illumination is reflected or diffracted by the object, as a reference illumination and detection of the illumination is coherent, utilizing said reference illumination.

There is further provided, in accordance with a preferred embodiment of the invention, a method for determining the relative motion of a surface with respect to a measurement device comprising:

placing a partially reflecting object, which is part of the measuring device, adjacent to the surface;

illuminating the object with incident illumination such that part of the incident illumination is reflected or diffracted by the object, as a reference illumination and part is reflected from the surface;

coherently detecting the illumination reflected from the surface utilizing the reference illumination, to generate a detected signal; and determining the relative motion of the surface parallel to the surface, from the detected signal.

In a preferred embodiment of the invention, the object is a partially transmitting object and at least part of at least one of the incident and reflected illumination passes through the object.

Preferably, the reflection of the object is spatially varying. Preferably, spatially varying comprises periodic spatial variation.

In a preferred embodiment of the invention, placing an object adjacent to the surface comprises placing a grating adjacent to the surface. Preferably, placing a grating adjacent to the surface comprises placing the grating sufficiently close to the surface such that the surface is in the near field of the grating. Alternatively, placing a grating adjacent to the surface comprises placing the grating sufficiently far from the surface such that the surface is outside the near field of the grating.

In a preferred embodiment of the invention, the detected illumination is at least partly coherent.

There is further provided, in accordance with a preferred embodiment of the invention, a method for determining the relative motion of a surface with respect to a measurement device comprising:

placing a grating, which is part of the measuring device, adjacent to the surface;

illuminating the grating with incident illumination such that at least part of the illumination is incident on and reflected from the surface, wherein at least one of the incident and reflected illumination passes through the grating;

detecting the illumination reflected from the surface utilizing the reference illumination;

generating a signal in response to the reflected illumination; and determining the relative motion of the surface parallel to the surface, from the detected signal, wherein the surface is in the near field of the grating.

Preferably, the illumination reflected from the surface is frequency shifted from that of the illumination reflected from or diffracted by the object and determining the motion comprises determining the motion based on the frequency shift.

Preferably, determining the motion comprises determining variations in the amplitude of the signal with position. Preferably, the motion is determined from zero crossings of the detected signal.

In a preferred embodiment of the invention, the object has a transmission characteristic that is spatially non-symmetric. Preferably, the method includes determining the direction of the relative motion based on a characteristic of the signal caused by said non-symmetry.

There is further provided, in accordance with a preferred embodiment of the invention, a method for determining the relative motion of a surface with respect to a measurement device comprising:

placing a partially transmitting object, which is part of the measuring device, adjacent to the surface;

illuminating the surface with incident illumination, which does not constitute an interference pattern, such that the illumination is reflected from portions of the surface, wherein at least part of at least one of the incident and reflected illumination passes through the object;

detecting the illumination reflected from the surface, and generating a detected signal; and determining the relative motion of the surface parallel to the surface, from the detected signal.

Preferably, the method includes varying the phase between illumination reflected from or diffracted by the object and at least a portion of the illumination reflected from the surface.

There is further provided, in accordance with a preferred embodiment of the invention, a method for determining the relative motion of a surface with respect to a measurement device comprising:

illuminating the surface with incident illumination such that illumination is reflected from portions of the surface;

placing a partially reflecting object, which is part of the measuring device, adjacent to the surface, wherein part of the incident illumination is reflected or diffracted by the object, as a reference illumination;

coherently detecting the illumination reflected from the surface, utilizing the illumination reflected from or diffracted by the object as a local oscillator, to form a signal;

determining the relative motion of the surface from the signal;

varying the phase of at least a part of the illumination reflected from or diffracted by the object with respect to at least a part of that reflected from the surface; and determining the direction of relative motion parallel to the surface based on a characteristic of the signal caused by said varied relative phase.

Preferably, placing a reflector adjacent to the surface comprises placing a grating adjacent to the surface.

In a preferred embodiment of the invention, varying the phase comprises periodically varying the phase.

Preferably, determining the direction of relative motion comprises determining the direction of relative motion based on a characteristic of the signal caused by said periodically varying relative phase.

In a preferred embodiment of the invention, varying the phase comprises causing the object to move periodically substantially in the direction of the motion being measured.

In a preferred embodiment of the invention, varying the phase comprises causing the object to move periodically substantially perpendicularly to the direction of the motion being measured.

In a preferred embodiment of the invention, varying the phase comprises:

providing a transparent material between the object and the surface; and electrifying the material such that its optical length in the direction of the illumination vanes.

Preferably, the transparent material is a piezoelectric material.

Preferably, the method includes determining both the magnitude and direction of the translation utilizing a single detector.

In a preferred embodiment of the invention, varying the phase comprises, introducing a static phase change and determining the direction of relative motion comprises determining the direction of relative motion based on a characteristic of the signal caused by said phase change.

Preferably, the method includes dividing at least part of the illumination that is reflected from the surface into at least a first illumination having a first phase and a second illumination having a second phase. Preferably, the first and second illuminations have different polarizations. Preferably, dividing comprises passing the illumination incident on the surface through a birefringent material. Preferably, the method includes passing the illumination reflected from the surface through a birefringent material. Preferably, the method includes placing the birefringent material between the object and the surface.

In a preferred embodiment of the invention, the method includes determining the magnitude and direction of the translation utilizing two detectors which produce different detected signals depending on the direction of the translation.

Preferably, the method includes determining the direction of translation from the sign of a phase difference between the different detected signals.

There is further provided, in accordance with a preferred embodiment of the invention, a method for determining the relative motion of a surface with respect to a measurement device comprising:

placing an apertured reflector, which is part of the measurement device, adjacent to the surface;

illuminating the surface with incident illumination such that illumination is reflected from portions of the surface and such that illumination is reflected from or diffracted by the apertured reflector;

coherently detecting the illumination reflected from the surface utilizing the illumination reflected from or diffracted by the apertured reflector as a local oscillator to form a signal;

determining the relative motion of the surface perpendicular to and parallel to the apertured reflector from the signal.

Preferably, coherently detecting comprises:

detecting amplitude or phase variations of the reflected illumination; and detecting a frequency shift of the reflected illumination; and determining the relative motion comprises:

measuring relative motion of the surface in a direction parallel to the apertured reflector responsive to at least one of the detected amplitude or phase variations; and measuring relative motion of the surface in a direction perpendicular to the surface of the apertured reflector responsive to the detected frequency shift.

Preferably, the method includes:

periodically moving the apertured reflector surface in a direction perpendicular to its surface to add a periodic phase shift to the illumination reflected therefrom; and utilizing said phase shift to measure the motion of the surface.

There is further provided, in accordance with a preferred embodiment of the invention, a method for determining the relative motion of a surface with respect to a measurement device comprising:

illuminating the surface, from a source, with incident illumination such that illumination is reflected from portions of the surface toward a detector;

spatially filtering the reflected illumination such that the phase of the detected optical illumination from a given scatterer on the surface is substantially constant or linearly related to the translation of the surface;

generating a signal by the detector responsive to the illumination incident on the detector; and determining the relative motion of the surface from the signal.

Preferably, illuminating comprises illuminating the surface with spatially varying illumination.

Preferably, illuminating the surface comprises illuminating the surface through an apertured reflector placed adjacent to the surface which reflects or diffracts illumination to the detector. Preferably, generating a signal comprises coherent detection of the illumination reflected from the surface utilizing the illumination reflected or diffracted from the apertured reflector.

Preferably, determining the relative motion comprises utilizing a Doppler shift of the reflected illumination.

Preferably, the illumination of the surface is substantially collimated; and the spatial filter filters the reflected illumination such that substantially only a single spatial frequency of the reflected illumination is detected by the detector.

Preferably, illumination of the surface is substantially collimated; and spatial filtering filters the reflected illumination such that only illumination reflected from the surface substantially in a single direction is detected by the detector.

In a preferred embodiment of the invention, spatial filtering comprises focusing the reflected illumination with a lens having a focal point; and placing a pinhole at the focal point of the lens.

In a preferred embodiment of the invention, spatial filtering comprises focusing the reflected illumination with a lens having a focal point; and placing a single mode optical fiber at the focal point of the lens to transfer illumination to the detector.

In a preferred embodiment of the invention, spatial filtering comprises focusing the reflected illumination with a lens; and placing a pinhole at an image of the source.

In a preferred embodiment of the invention, spatial filtering comprises focusing the reflected illumination with a lens; and placing a single mode optical fiber at an image of the source to transfer illumination to the detector.

There is further provided, in accordance with a preferred embodiment of the invention, a method for determining the relative motion of a surface with respect to a measurement device comprising:

placing an object, having at least a quasi-continuous transmission function, adjacent to the surface;

illuminating the surface with incident illumination such that illumination is reflected from portions of the surface toward a detector;

detecting the illumination reflected from the surface utilizing the detector to generate a signal; and determining the relative motion of the surface from the signal.

Preferably, the object has an asymmetric transmission function; and determining the relative motion comprises determining the direction of motion based on the detected signal.

Preferably, illumination is reflected from or diffracted by the object toward the detector; and the detection is coherent detection utilizing the illumination reflected from or diffracted by the object as a local oscillator to form a signal.

There is further provided, in accordance with a preferred embodiment of the invention, a method for determining the relative motion of a surface with respect to a measurement device comprising:

illuminating the surface with illumination, through an apertured reflector, such that illumination is reflected from the surface to illuminate a detector with illumination which is not an image of a point on or a portion of the surface;

simultaneously illuminating the detector with reference illumination derived from said incident illumination; and coherently detecting the reflected illumination of the detector utilizing said reference illumination such that the detector generates a signal;

determining the relative motion of the surface parallel to the surface, based on variations of the signal caused by the relative motion.

Preferably, the incident illumination is at a given wavelength and the reference illumination is at the same wavelength such that the coherent detection is homodyne detection.

Preferably, the method includes spatially varying the illumination of the surface. Preferably, spatially varying the illumination of the surface comprises illuminating the surface through a transmission grating having spatially varying periodic transmission.

Preferably, spatially varying the illumination of the surface comprises illuminating the surface through a grating which specularly reflects a portion of the illumination incident upon it toward the detector to form said reference illumination.

There is further provided, in accordance with a preferred embodiment of the invention, a method for determining the relative motion of a surface with respect to a measurement device comprising:

illuminating the surface with illumination such that illumination is reflected from portions of the surface;

placing an apertured reflector adjacent to the surface;

coherently detecting the illumination reflected from the surface, utilizing illumination reflected from or diffracted by the apertured reflector as a local oscillator; and determining the relative motion of the surface, in a direction parallel to the surface, from a characteristic of the signal.

Preferably, the relative motion is detected utilizing a Doppler shift of the illumination reflected from the surface.

Preferably, the apertured reflector is a grating and illumination diffracted by the grating is used in determining the motion.

In a preferred embodiment of the invention, the illumination is perpendicularly incident on the surface.

In a preferred embodiment of the invention, the surface is optically diffusely reflecting surface.

In a preferred embodiment of the invention, the surface has no markings indicating position.

Preferably, the illumination comprises visible illumination. Alternatively, or additionally, the illumination comprises infra-red illumination.

There is further provided, in accordance with a preferred embodiment of the invention, apparatus for determining the relative motion of a surface and the apparatus, comprising:

a partially transmitting object situated adjacent to the surface;

a detector that detects illumination incident on it and generates a detected signal;

a source of illumination which illuminates the object with incident illumination such that illumination is reflected or diffracted towards the detector from the object and such that part of the incident illumination is reflected from of the surface towards the detector, such that the detector coherently detects the illumination reflected from the surface utilizing the illumination reflected or diffracted towards the detector from the object; and circuitry which determines relative motion of the surface parallel to the surface with respect to the apparatus from the detected signal.

There is further provided, in accordance with a preferred embodiment of the invention, an optical mouse comprising:

a housing having an aperture facing a surface; and an optical motion detector which views the surface through the aperture, wherein the optical motion detector utilizes the method of the invention to determine the translation of the housing with respect to the surface.

There is further provided, in accordance with a preferred embodiment of the invention, a touch point for use as a control device, comprising:

a housing having an aperture; and an optical detector which determines the motion of a finger which is translated across the aperture.

Preferably, the optical detector utilizes the method of the invention to determine the translation.

There is further provided, in accordance with a preferred embodiment of the invention, a pointer device comprising:

a first touch point according to the invention and circuitry which moves a pointer responsive thereto; and a second touch point according to the invention and including circuitry which causes scrolling responsive thereto.

There is further provided, in accordance with a preferred embodiment of the invention, a combination mouse/touch point for use as a pointer for a computer comprising:

a housing having an aperture;

an optical detector which determines the motion of an object which is translated across the aperture; and means for determining whether the aperture is upward or downward facing.

Preferably the optical detector utilizes the method of the invention to determine the translation.

There is further provided, in accordance with a preferred embodiment of the invention, a scanner for reading a document by movement of the scanner over the document comprising:

an optical reading head which detects patterns on the surface of the document; and an optical detector which determines the motion of the scanner as it is translated across the surface of the document, wherein the optical detector utilizes the method of the invention to determine the translation.

Preferably, the patterns comprise printed patterns. Alternatively or additionally, the patterns comprise handwritten patterns. Alternatively or additionally, the patterns comprise a signature.

There is further provided, in accordance with a preferred embodiment of the invention, an encoder comprising:

an optically diffusely reflecting surface; and an optical detector having relative motion with respect to the surface, wherein the optical detector measures relative motion with respect to the surface without utilizing markings on the surface.

There is further provided, in accordance with a preferred embodiment of the invention, an encoder comprising:

an optically diffusely reflecting surface having no markings other than reference markings; and an optical detector having relative motion with respect to the surface, wherein the optical detector measures relative motion with respect to the surface relative to the reference markings.

Preferably, the surface is the surface of a disk which rotates about an axis and wherein the detector measures the rotation of the disk.

Preferably, the encoder utilizes the method of the invention.

There is further provided, in accordance with a preferred embodiment of the invention, a virtual pen comprising:

an encoder according to the invention; and circuitry which translates said measured relative motion into written or graphical data.

There is further provided, in accordance with a preferred embodiment of the invention, a device for moving a sheet of paper comprising:

means for moving the paper; and an optical detector which measures the movement of the paper without utilizing any markings on the paper.

Preferably, the optical detector utilizes the method of the invention.

There is further provided, in accordance with a preferred embodiment of the invention, a a device for moving a sheet according to the invention;

a reading head which reads information from the paper; and a memory which stores the information in memory locations responsive to the measurement of movement of the paper.

There is further provided, in accordance with a preferred embodiment of the invention, a printing machine comprising:

a device for moving a sheet according to the invention;

memory which contains information to be printed on the sheet of paper; and a printing head which prints the information responsive to the measurement of movement of the paper.

There is further provided, in accordance with a preferred embodiment of the invention, a facsimile machine comprising a scanner according to the invention.

There is further provided, in accordance with a preferred embodiment of the invention, a facsimile machine comprising a printer according to the invention.

There is further provided, in accordance with a preferred embodiment of the invention, a method for determining the direction of relative motion of a surface with respect to a measurement device comprising:

illuminating the surface with incident illumination such that illumination is reflected from portions of the surface toward a detector;

placing an object, having an asymmetric transmission function, adjacent to the detector;

detecting the illumination reflected from the surface utilizing the detector to generate a signal; and determining the direction of relative motion of the surface from the signal.

BRIEF DESCRIPTION OF THE DRAWINGS

The present invention will be more clearly understood from the following description of preferred embodiments of the invention read in conjunction with the attached drawings in which.

DETAILED DESCRIPTION OF PREFERRED EMBODIMENTS OF THE INVENTION

Figure 1:
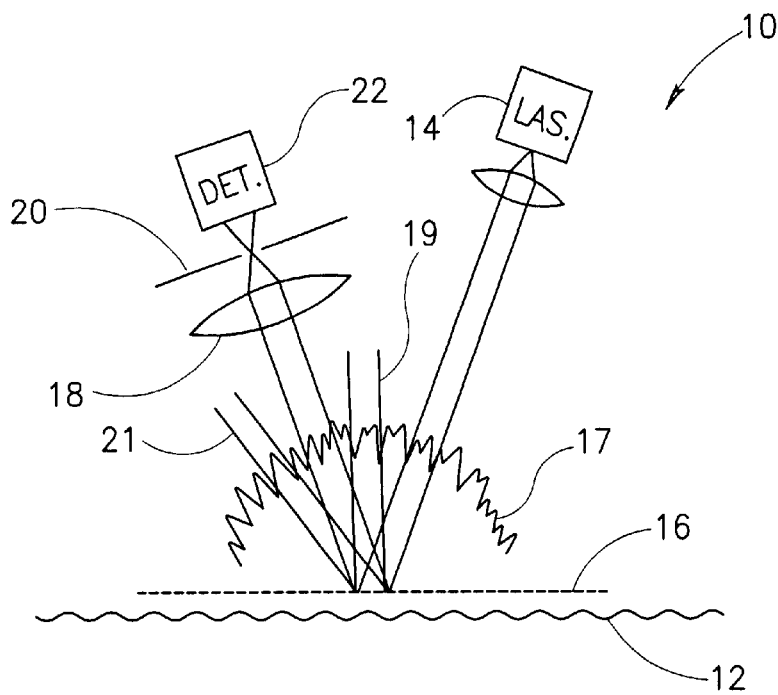
FIG. 1 is a schematic representation of a preferred embodiment of a motion transducer, in accordance with a preferred embodiment of the invention.

FIG. 1 shows apparatus 10 for the measurement of the translation of a surface 12, in accordance with a preferred embodiment of the invention. Apparatus 10 comprises a source of at least partially coherent, preferably collimated optical radiation 14, such as a laser. Preferably, the laser is a diode laser, for example a low power infra-red laser. While other wavelengths can be used, an infra-red laser is preferred since it results in eye-safe operation at higher power. The source is preferably collimated. While it is desirable to use a collimated beam from depth of field considerations, the collimation need not be particularly good. However, a non-collimated source may be used if compensation as described below is used.

Apparatus 10 also includes a one-dimensional or two dimensional reflective grating 16, which is closely spaced from surface 12, The limitations as to spacing of grating 16 from surface 12 are described below. Typically the spacing between grating 16 and surface 12 is a few millimeters or less. Light which is reflected from (or diffracted by) grating 16 and light reflected by surface 12 are both preferably incident on a spatial filter (composed of a lens 18 and a pinhole 20 ) before being detected by an optical detector 22. The resulting interference gives rise to a beat signal that depends on the motion of the surface. As indicated from FIG. 1, radiation is reflected from the surface in substantially all directions. This radiation is omitted from some of the drawings for clarity of presentation.

In FIG. 1 the light is seen as being incident on the surface from an angle; however, it is possible for the light to be incident at the normal to grating 16. Moreover, while FIG. 1 shows the incident light angle equal to the detection angle, such that light reflected from the grating (or zeroth order diffraction) is used for the local oscillator, first or higher order diffraction by the grating can be effectively used. Zero order has the advantages that it is wavelength independent (stability of the wavelength is not important). The incident light can be pulsed or continuous. In FIG. 1, light diffracted at the −1 and +1 orders are indicated by reference numbers 19 and 21 respectively. Light that is scattered by the surface is indicated by reference number 17.

In the preferred embodiment of the invention shown in FIG. 1, speckle-free, coherent detection (homodyne or heterodyne, homodyne shown in FIG. 1) is used to determine tangential motion. Such detection results in an intrinsic amplification of the signal used for measurement resulting in a high dynamic range.

The reference local oscillator field for the coherent detection is provided by reflections from grating 16, placed close to the moving surface. The interference of the reflections from the grating and the moving surface on the detector give rise to a translation dependent oscillating signal. The incorporation of a near-surface reflection from a grating as the origin of the local oscillator field may give multiple advantages, including at least some of the following:

1. The grating is a single element that combines the roles of a beam splitter and a mirror in a coherent homodyne/heterodyne detection optical setup, thus making the optical system simple, robust and with few alignment requirements.
2. The grating causes spatially periodic intensity and/or phase modulation of the illumination reflected from the surface, if the surface is placed within the near field of the grating. This enables detection of translation using the specular (zeroth order) reflection as the reference wave.
3. High order diffractions ($+1^{st}+2^{nd}$, etc.) from the grating serve as local oscillator fields for detection of the surface's translation utilizing the Doppler shift of the surface reflection. A translation dependent phase shift between the reference and surface waves at non-specular reflection orders produce oscillations representative of the translation. The resolution increases for higher diffraction orders.
4. Translation detection can be frequency biased by periodic shifting of the grating position (e.g. sawtooth modulation), enabling determination of direction as well as magnitude of the translation.
5. A two-dimensional grating provides reference (local oscillator) waves and modulation of the illumination of the surface and reflections from it for two orthogonal translation directions in a single element, for two-dimensional transverse motion measurement.
6. Measurement at different grating orders provides different components of the translation or velocity vector of the surface. For specular reflection, for example, translation along the axis perpendicular to the grating can be measured independently of translation in the other directions. This allows for three dimensional translation measurement.
7. Asymmetric grating transmission functions (amplitude and/or phase) enable direction detection in all reflected orders, using appropriate signal manipulation/analysis.
8. Frequency biasing using local oscillator phase shifting, in combination with the amplitude modulation resulting from the grating at near field provide for simultaneous measurement of 2-D translation (in a transverse and axial translation plane) using a single detector.

In addition to spatial filtering related restrictions, the allowed distance between the grating and the surface generally depends on the grating period $\Lambda$, the light wavelength $\lambda$, the spectral coherence width $\Delta\lambda$, the illuminated area and the incident and reflected beam angles.

For those preferred embodiments of the invention, which utilize the light reflected or diffracted from the grating as a local oscillator, it is most preferable for the spacing between the surface 12 and the grating 16 to be smaller than the coherence length of the light, given by $\approx\lambda^2/\Delta\lambda$, where $\Delta\lambda$ is the spectral width of radiation reaching the detector (and not necessarily the spectral width of the light source). Furthermore, the coherence length of the source should preferably be larger than $n\lambda L/\Lambda$, to maintain the coherence across the diffracted beam width, where L is the width of the illuminating beam. By proper spectral filtering along the optical path, the spectral content reaching the detector can be limited and its coherence length increased, if this is necessary.

For those preferred embodiments of the invention, in which the modulated transmission pattern plays a major role in the detection scheme, the spacing between the grating and surface 12 should also be within the near-field distance from the grating, $\approx\Lambda^2/4\lambda$. For the following embodiments the spacing is assumed to be near field. This requirement is relaxed for the cases where it is not essential.

Relative motion of the surface can be measured in a number of ways. Consider the incident field and the grating field transmission function, respectively:

$$E(t) = E_0 \cos(\omega_0 t) \quad (1)$$

$$A(x) = \sum_m c_m \cos(2\pi m x/\Lambda + \psi_m) \quad (2)$$

The grating is assumed to be a pure amplitude grating with period $\Lambda$, so that its transmission is the sum over non-negative spatial frequencies with real coefficients. A similar formalism applies also to binary phase grating, or some general phase gratings, which can also be used in the practice of the present invention. For the general case of both amplitude and phase gratings a phase retardation term is added. For simplicity of the description the following description is based on a pure amplitude grating. However, it should be understood that other gratings can be utilized and are preferable for some embodiments of the invention. Unimportant constant factors are also omitted in various parts of the following mathematical treatment.

Plane-wave illumination by the light source over the grating area is assumed (i.e.—a collimated beam), but is not strictly necessary provided, for example, the non-collimation is compensated in another part of the system (e.g.—the spatial filter). It is assumed for simplicity that the incident light is perpendicular to the grating (and not as shown in FIG. 1). Oblique incident light (in the direction of the grating lines and/or perpendicular to it) gives substantially the same results, with shifted reflection angles. Thus, the grating field contains a series of reflected diffraction orders, arranged symmetrically about the specular reflection component (zeroth order) and obeying the angular condition (for the n-th order):

$$\sin(\alpha) = n\lambda/\Lambda. \quad (3)$$

As shown in FIG. 1, a spatial filter in front of the detector is preferably comprised of focusing lens 18 and narrow pinhole 20 at the focal point of the lens. Such a spatial filter is preferably adjusted to select only a single spatial frequency component to reach the detector. The pinhole can be replaced by a single-mode optical fiber, having a similar core diameter and leading the light to a remote detector. The spatial filter is aligned such that one of the diffraction orders reaches the detector, and serves as the local oscillator for homodyne detection of the reflected radiation, or for heterodyne detection as described below. The local oscillator field is given by:

$$E_{LO}(t) = E_n \cos(\omega_0 t + \phi_n) \quad (4)$$

The reflected field from the moving surface in the same direction as the n-th diffraction order is represented by an integral over the illuminated surface area of independent reflections from the surface. Integrating over the direction parallel to the grating lines (y) and over the direction normal to the surface (corresponding to light penetration into the surface), results in a reflected field equal to:

$$E_r(t) = E_0 \int_{x_1}^{x_2} dx A(x) r(x - p(t)) \cos(\omega_0 t + 2\pi n x/\Lambda + \phi(x - p(t))) \quad (5)$$

where r(x) and φ(x) are location dependent amplitude and phase reflectance of the surface, respectively. The reflectance is assumed to be time-independent during the measurement, with both r and φ being random variables of the position x. The translation of the surface from its initial position is given by p(t), with p(0)=0. The periodic phase term 2πnx/Λ arises from the reflection at an angle sin(α)= nλ/Λ. The integration limits are from $x_1$ to $x_2$, both determined by the illuminated area.

Changing the integration variable from x to x−p(t), corresponding to the symmetric situation of a static surface and moving grating with respect to the reference coordinate system:

$$E_r(t) = \quad (6)$$
$$E_0 \int_{x_1-p(t)}^{x_2-p(t)} dx A(x + p(t)) r(x) \cos(w_0 t + 2\pi n p(t)/L + 2\pi n x/L + f(x))$$

with integration limits now extending from $x_1-p(t)$ to $x_2-p$(t) and thus being time-dependent. Replacing A(x) with its Fourier series and writing $\phi_n(x)=\phi(x)+2\pi nx/\Lambda$ gives:

$$E_r(t) = E_0 \int_{x_1-p(t)}^{x_2-p(t)} dx \sum_m c_m \cos(2\pi mx/\Lambda + 2\pi mp(t)/\Lambda + \psi_m) \quad (7)$$
$$r(x)\cos(\omega_0 t + 2\pi np(t)/\Lambda + \phi_n(x))$$

The (optical) phase of a scatterer on the surface linearly depends on the translation p(t), with $\phi=\phi_n(x)+2\pi np(t)/\Lambda$. For specular reflection (n=0), the phase is a constant. Both the reflected field and the local oscillator field reach the detector. Since the detector measures intensity, which is proportional to the square of the field, the intensity is given by:

$$I(t)=(E_{LO}(t)+E_r(t))^2=E_{LO}(t)^2+2E_{LO}(t)E_r(t)+E_r(t)^2 \quad (8)$$

Assume that the local oscillator field is much larger than the reflected field, $E_{LO}>>E_r$ and that the detector integration time is much longer than an optical period time but much shorter than $\Lambda/nV_{max}$ (where $V_{max}$ is the maximum measured velocity). Integration over optical frequencies gives just a DC component while other variations are detected instantaneously. Under these assumptions, the first intensity term is replaced by a constant $I_{LO}=0.5E_{LO}^2$ and the third intensity term is neglected, i.e., $I_r=0.5E_r^2=0$. In this preferred embodiment of the invention, the ratio of the strength of the local oscillator field and of the reflected field is intrinsically large, since the reflection from the grating is directed only to specific narrow orders and the reflection from the diffuse surface is scattered over a broad angle.

While the following discussion assumes that the third term is zero, translation measurement utilizing the spatial transmission modulation is possible even if the third term alone is present, i.e., when the light reflected from the surface is not combined with a reference reflected or diffracted from the grating. This may be achieved (if desired) by selecting an angle that lies between grating orders. It does have the advantage of significantly relaxed alignment constrains (it only requires that the light be in the focal plane of the spatial filter), but will generally be less accurate and with a low signal-to-noise ratio.

The local oscillator field serves as a very strong amplifier in the first stage of signal detection. In this respect it is strongly preferred to keep the local oscillator field as noise-free as possible, since its noise transfers to the detected signal directly. The measured cross term is equal to:

$$I_s(t)=E_n \cos(\omega_0 t+\phi_n)E_r(t) \quad (9)$$

Inserting the oscillating field term cos(ω₀t) into the integral for $E_r(t)$ and using the cosine sum relationship cosαcosβ=0.5(cos(α−β)) for the right-most cosine in (7), results in one intensity component at twice the optical frequency (2ω₀) and another with slowly varying phase. The fast oscillating component averages to zero because of the detector's time response. The remaining signal is:

$$I_s(t) = I_n \int_{x_1-p(t)}^{x_2-p(t)} dx \sum_m c_m \cos(2\pi mx/\Lambda + 2\pi mp(t)/\Lambda + \psi_m) \quad (10)$$
$$r(x)\cos(2\pi np(t)/\Lambda + \phi_n(x) - \varphi_n)$$

Exchanging summation with integration, the contribution of each term to the sum is:

$$I_{s,m}(t) = I_n c_m \int_{x_1-p(t)}^{x_2-p(t)} dx \cos(2\pi mx/\Lambda + 2\pi mp(t)/\Lambda + \psi_m) \quad (11)$$
$$r(x)\cos(2\pi np(t)/\Lambda + \phi_n(x) - \varphi_n)$$

Assume that $c_0$, $c_1>>\{c_m, m>1\}$. This last requirement enables us to concentrate on just two terms in the sum over grating harmonics, the m=0 and m=1 terms. For these two terms we can write:

$$I_{s,0}(t) = I_n c_0 \int_{x_1-p(t)}^{x_2-p(t)} dx r(x) \cos(2\pi np(t)/\Lambda + \phi_n(x) - \varphi_n) \quad (12)$$

$$I_{s,1}(t) = I_n c_1 \int_{x_1-p(t)}^{x_2-p(t)} dx \cos n(2\pi x/\Lambda + 2\pi p(t)/\Lambda + \psi_1) \quad (13)$$
$$r(x)\cos(2\pi np(t)/\Lambda + \phi_n(x) - \varphi_n)$$

Attention is now focused on specific diffraction orders in the reflected and diffracted waves from the grating, the n=0 (specular reflection) and n=±1 directions.

For the specular reflection term, the m=0 contribution is:

$$I_{s,0}(t) = I_0 c_0 \int_{x_1-p(t)}^{x_2-p(t)} dx r(x) \cos(\phi(x)) \quad (14)$$

For a diffuse surface with constant brightness this term will be nearly constant, and will change slowly as and when the average reflection from the surface changes. The m=1 term is:

$$I_{s,1}(t) = I_0 c_1 \int_{x_1-p(t)}^{x_2-p(t)} dx \cos(2\pi x/\Lambda + 2\pi p(t)/\Lambda + \psi_1) r(x) \cos(\phi(x)) \quad (15)$$
$$= \cos(2\pi p(t)/\Lambda) I_0 c_1$$
$$\int_{x_1-p(t)}^{x_2-p(t)} dx \cos(2\pi x/\Lambda + \psi_1) r(x) \cos(\phi(x)) -$$

-continued $$\sin(2\pi p(t)/\Lambda)I_0 c_1 \int_{x_1-p(t)}^{x_2-p(t)} dx \sin(2\pi x/\Lambda + \psi_1) r(x)\cos(\phi(x))$$

$$\equiv \cos(2\pi p(t)/\Lambda)I_c(t) + \sin(2\pi p(t)/\Lambda)I_s(t)$$

$$\equiv I(t)\cos(2\pi p(t)/\Lambda + \vartheta(t))$$

where the intensity $I(t)$ and phase $\theta(t)$ result from integrals over random variables corresponding to the amplitude and phase reflection of the diffuse surface at a spatial frequency $1/\Lambda$. For diffuse surfaces with single reflectors larger than the spatial wavelength $\Lambda$ the contribution will come from grain boundaries, while for diffuse surfaces having small particle sizes there will be strong contributions for all spatial frequencies up to $1/d$, where d is the average particle size.

The rate of change of these "random walk" variables depends on the average time it takes a given set of reflection centers $\{x_i\}$ to be replaced by a new set, which in turn is related to the change of the integration region above, $\tau = (x_1-x_2)/v = L/v$, where v is the instantaneous velocity and L is the illuminated size of the grating. If a large number of grating periods are illuminated such that $L \gg \Lambda$, the result is fast oscillations with a slowly varying statistical amplitude and phase. The error of the translation measurement is proportional to $\Lambda/L$ and is independent of the velocity.

In summary, for specular reflection translation measurement:
1. The measured signal at the detector output oscillates at a frequency of $v/\Lambda$. Detection and counting of the zero crossing points of this signal gives a direct translation measurement, each zero crossing corresponding to a $\Delta p = \Lambda/2$ translation, provided that the translation direction does not change during the measurement.
2. The measured signal's amplitude and phase are slowly varying statistical ensemble sums. The relative accuracy of the measurement is proportional to $\Lambda/L$, L being the illuminated grating size.
3. The spacing between the surface and the grating should preferably be smaller than both the near field distance, $\approx \Lambda^2/4\lambda$, and the coherence length of the light reaching the detector, $\approx \lambda^2/\Delta\lambda$.

The first order reflection, unlike the specular reflection, carries also a Doppler phase shift. Looking again at the contribution of the $m=0,1$ spatial frequency components gives:

$$I_{s,0}(t) = I_1 c_0 \int_{x_1-p(t)}^{x_2-p(t)} dx\, r(x)\cos(2\pi p(t)/\Lambda - \phi_1(x) - \varphi_1) \quad (16)$$

$$I_{s,1}(t) = I_1 c_1 \int_{x_1-p(t)}^{x_2-p(t)} dx \quad (17)$$
$$\cos(2\pi x/\Lambda + 2\pi p(t)/\Lambda + \psi_1) r(x)\cos(2\pi p(t)/\Lambda - \phi_1(x) - \varphi_1)$$

Using a decomposition of the cosine term in (16) as in (15) results in:

$$I_{s,0}(t) = I_0(t)\cos(2\pi p(t)/\Lambda + \Theta_0(t)) \quad (18)$$

In a similar manner the expression for the $m=1$ term, (17) is:

$$I_{s,1}(t) = I_1(t)\cos(4\pi p)(t)/\Lambda + \Theta_1(t)) \quad (19)$$

Equation (19) neglects a slowly varying term that adds to the average detector signal (the "DC" component). An analysis of equations (16)–(19) shows that if $c_0 \gg c_1$, the zero crossings of the signal correspond to $\Delta p = \Lambda/2$, while if $c_0 \ll c_1$, zero crossings correspond to $\Delta p = \Lambda/4$. This result can be expanded to other reflection orders $n>1$, where, if $c_0 \gg c_1$ the measured signal will oscillate according to $np(t)/\Lambda$. For $|n|>1$, the $c_1$ term amount to oscillations in two side bands around the co oscillations as in amplitude modulation of a higher frequency signal. Notice that the $m=0$ term does not require near field conditions, so by fixing the distance to the moving surface so it is larger than the near field limit $\approx \Lambda^2/4\lambda$ (but preferably smaller than the coherence length $\approx \lambda^2/\Delta\lambda$), the $m=0$ contribution is dominant. Alternatively, a transmission function for the grating such that $c_0 \gg c_1$ even in the near field is preferably used.

In a preferred Doppler mode of operation, a grating is utilized for the generation of a local oscillator field by diffracting incident illumination towards the detectors. However, diffraction orders may exist in transmission as well (e.g., when a pure amplitude grating is used). These orders may result in multiple-beam illumination of the surface even outside of the near field of the grating and in diffraction of the illumination reflected from the surface toward the detector into multiple beams. Thus, each detector will detect a multitude of Doppler components, each corresponding to the Doppler shift of a combination of transmitted and reflected orders interfering with the local oscillator field illuminating the detector, constituting 'optical crosstalk'.

In a preferred embodiment of the invention, illumination of the surface is by a single beam, eliminating the above mentioned 'optical cross talk'. Similarly, it is desirable that the reflected illumination from the surface should not be diffracted by the grating. Thus, the non-zero transmission orders of the grating should be minimized and preferably eliminated. A diffraction grating is preferably used for the generation of the local oscillator fields using orders in reflection, and designed to have virtually only a single transmission order (i.e., a single beam illuminating the surface and the illumination of the surface does not constitute an interference pattern on the surface). Also, the illumination reflected from the surface is not forward diffracted when passing through the grating toward the detectors, as desired.

Figure 24:
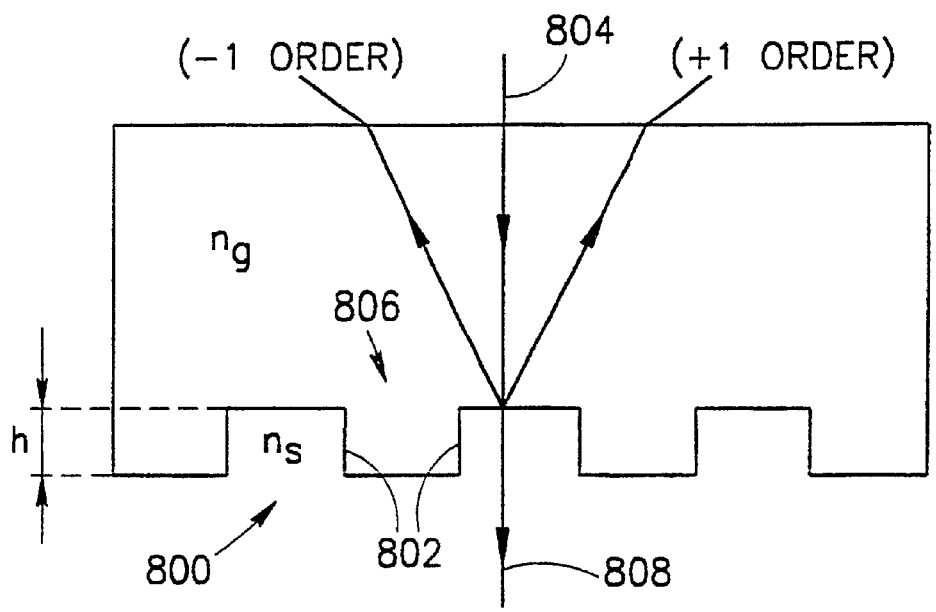
FIG. 24 illustrates a diffraction grating useful in preferred embodiments of the invention.

Reference is made to FIG. 24 which illustrates an exemplary diffraction grating 800 which embodies this principle. Assume the grating is a binary phase grating with refractive index of $n_g$, suspended in a medium of another refractive index $n_s$. The grating preferably embodies square grooves 802 of depth h. For incident normal illumination 804, the relative phase difference in reflection from the inner side 806 of the grating is $P_r = 2n_g \cdot h/\lambda$, whereas for a transmitted beam 808 the relative phase difference is $P_t = (n_g - n_s) \cdot h/\lambda$. Negligible high-orders in transmission will be obtained when $P_t$ is a natural number, so that the minimum groove depth is $h = \lambda/(n_g - n_s)$. At the same time, the reflection efficiency depends on the optical phase difference in reflection, which after substitution of the groove depth is:

$$P_r = \frac{2n_g}{n_g - n_s}.$$

If air is assumed on the transmitting side of one grating ($n_s = 1$) and minimizing the zero-order reflection ($P_r = M + \frac{1}{2}$, M natural), then:

$$n_g = \frac{M + \frac{1}{2}}{M - 1\frac{1}{2}}.$$

For example, with M=5, wavelength of 850 mn and a refractive index $n_g \approx 1.57$, groove depth of approximately 1.5 micrometer will result in optimal back diffraction efficiency with ideally only zero order transmission.

Figure 25:
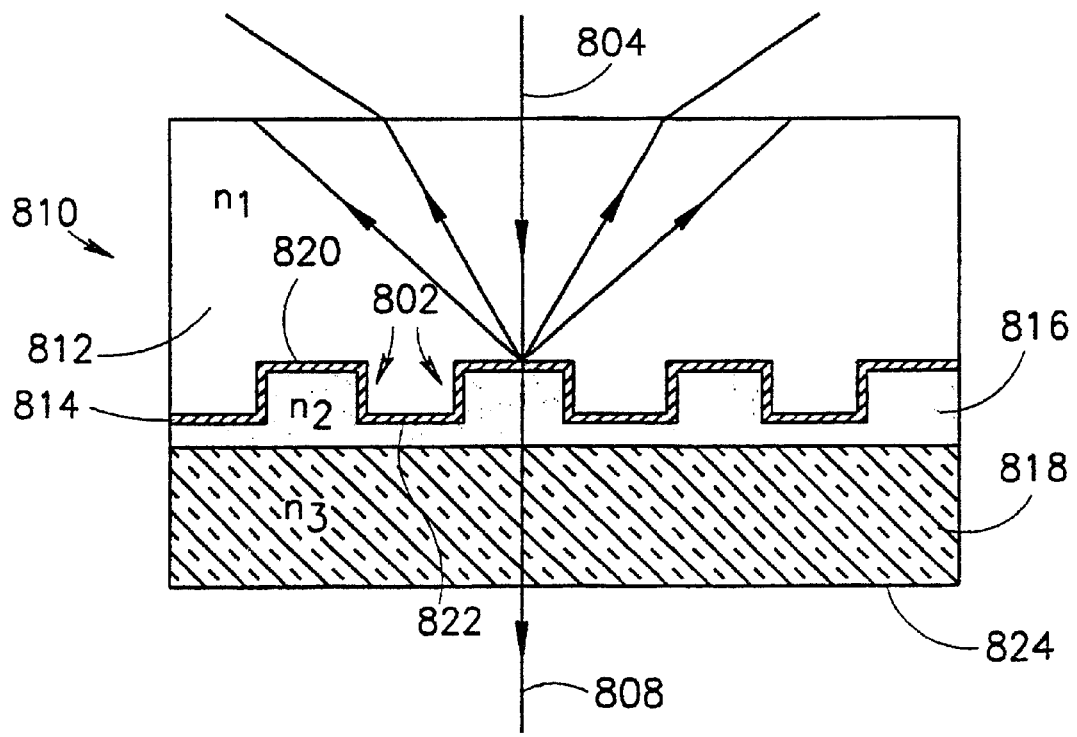
FIG. 25 illustrates a second diffraction grating produced in accordance with a preferred embodiment of the invention.

FIG. 25 illustrates another method of producing a grating 810 having substantially only zero order transmission and having at least first order back diffraction. According to a preferred embodiment of the invention, a diffractive phase grating 812 is coated by a metallic (or dielectric) layer 814 functioning as a partial reflector with controlled reflection coefficient. This coating can be made e.g., by sputtering or evaporation of the coating material on the grating surface. The other side of layer 814 is filled by an optical medium 816 with an index of refraction essentially equal to that of the grating material. Conveniently, this material may be an optical glue attaching the grating to a polarizer, a waveplate or a protective glass, indicated by reference 818, or an epoxy mold combining elements 816 and 818.

In this construction, any optical path difference generated by the grating on the transmitted radiation is compensated by a corresponding optical path difference in the optical glue, such that the phase front at the exit of the compound arrangement is unaltered. Thus, there are substantially no transmission orders other than the zero order. Back diffraction, on the other hand is achieved by the difference in phase of the reflections from layer 814 at different locations, e.g., the inner edge 820 of grooves 802 and the outer edge 822 of the grooves.

An advantage of the method illustrated in FIG. 25 is convenient control of the reflected (and back diffracted) and transmitted power of the grating illumination, by altering the reflection and transmission of layer 814. This effect may be utilized, for example, to maximize the signal to noise and to limit the emission to an eye-safe level.

The method of eliminating the diffraction of a grating in transmission as illustrated in FIG. 25, is appropriate for complex phase patterns, and not only binary phase gratings. It is also applicable to diffractive lenses and other diffractive optical elements for which independent control of the transmission and the reflection is desired. The transmission may also be modified by a second diffractive or refractive feature on the other outer surface 824 of the optical element.

The frequency associated with the $c_0$ oscillations depends on the transverse as well as axial (perpendicular) translation component (described below). Conversely, the amplitude modulation (through the $c_1$ component) depends solely on the transverse component. When the frequency of the $c_0$ oscillations is sufficiently high, this frequency can be measured by the frequency-related technique described above, simultaneously with the detection of the amplitude modulation frequency to measure the transverse translation component. In this way, 2-D translation measurement (including motion perpendicular to the plane of the surface—i.e., axial translation) may be achieved using a single detector.

By frequency biasing the reference signal, the ratio between the carrier frequency and the amplitude modulation frequency can be made large, improving the measurement accuracy as well as allowing for detection of the direction of translation. Also, using specular reflection from the grating as a local oscillator enables a clear distinction to be made between the transverse translation component (indicated by the amplitude modulation) and the axial translation component (indicated by the phase or frequency shift of the carrier frequency).

Furthermore, the phase shifting may be combined with an asymmetric transmission pattern of the grating (e.g.—sawtooth pattern) for the purpose of transverse translation direction detection. Alternatively, the grating may be displaced for direction detection in the two dimensions, or a static phase change is used as explained in greater detail below.

In essence, for the non-specular diffraction embodiments of the invention, two quasi-plane waves are selected for detection by the detector. One of these waves is the result of the nth order diffraction from the grating. The second plane wave is generated by the selection of one plane wave (by the spatial filter) from the reflections from the surface.

In summary for translation measurement using non-specular diffraction (and assuming constant velocity for clarity of the discussion):

1. The measured signal at the detector output oscillates at a frequency of $nv/\Lambda$, where n is the order number. Detection and counting of the zero crossing points of this signal gives a direct translation measurement, each zero crossing corresponding to $\Lambda/2n$ translation provided that the translation direction is not switched during the measurement.

2. The measured signal's amplitude and phase are slowly varying statistical ensemble sums. The relative accuracy of the measurement is proportional to $\Lambda/nL$, L being the illuminated grating size, which in turn is preferably larger than $n\lambda L/\Lambda$.

3. The distance between the surface and the grating should preferably be smaller than the coherence length of the light reaching the detector, $\lambda^2/\Delta\lambda$.

Even though the absolute time-varying translation $|p(t)|$ can be measured very accurately its direction is preferably determined using one of the methods described below.

In one preferred embodiment of the invention, direction may be determined by applying an additional phase shift between the reference (local oscillator) field and the reflected field. This additional phase shift can be manifested, for example, by moving the grating towards or away from the surface. This movement does not change the phase of the field incident upon the surface, so that the field reflected from the surface is identical to that given above. The local oscillator field, however, acquires an additional phase shift due to this translation that depends on the grating displacement d(t).

Keeping the distance between the grating and the surface almost constant and introducing a fixed frequency shift between the reflected and local oscillator fields can be achieved by making d(t) a periodic saw-tooth function:

$$d_n(t) = D_n \int_0^t \left[ \tau^{-1} - \sum_{k=0}^{\infty} \delta(t' - k\tau) \right] dt' \qquad (20)$$

$$D_n = \frac{\lambda}{1 + \sqrt{1 - \left(\frac{n\lambda}{\Lambda}\right)^2}}$$

with $\tau$ as the cycle time for the saw-tooth, fixing the amplitude of the saw-tooth to give $2\pi$ phase shift (or multiples of $2\pi$) for reflection at the nth diffraction order. The frequency shift due to this motion is $\tau^{-1}$, and if $\tau^{-1} > nv/\Lambda$ is maintained, the direction of the motion is determined without ambiguity according to the frequency of oscillation of the detector signal, namely $\tau^{-1} + nv/\Lambda$. Alternatively, the translation (both positive and negative) is determined directly by counting the zero crossing in the detected signal and subtracting it from the result of a simultaneous count of the oscillator frequency $\tau^{-1}$.

If the saw tooth amplitude is not ideal, (i.e., it does not correspond to integer multiples of the wavelength) the direction can still be determined, however, the formulation is more complicated. As used herein, the term "saw-tooth" includes such non-ideal variations.

An alternative way of introducing a periodic phase shift between the local oscillator field and the field reflected from the surface is to modulate the optical path length between the grating and the surface. This is preferably achieved by a transparent piezo-electric element mounted between the grating and the surface.

An alternative methodology to break the symmetry between positive and negative relative translation, so that the translation direction can be detected, is to use an asymmetric function for the transmission (amplitude and/or phase) function of the grating. For simplicity, the formalism is developed for an amplitude grating. For simplicity, assume that the grating is large compared to the line spacing along the translation axis and that k point scatterers are illuminated through the grating. Scatterers entering or leaving the illuminated area are neglected (this will appear as a noise factor in a comprehensive treatment). After the interference with the local oscillator (which is not shifted here) and filtering the optical frequencies, the resulting signal can be written as:

$$I_s(t) = I_n \sum_{i=1}^{k} r_i A(x_i + p(t)) \cos(2\pi np(t)/\Lambda + \phi_i) \quad (21)$$

where $r_i$, $x_i$ and $\phi_i$ are the reflectance, the position (at time t=0) and the relative phase (with respect to the local oscillator), respectively, of a scatterer i. For a diffuse body these are all random variables. This presentation of the detector signal is used for the following direction-detection mechanisms.

For specular reflection:

$$I_s(t) = I_0 \sum_{i=1}^{k} r_i A(x_i + p(t)) \cos(\phi_i) \quad (22)$$

Assuming that p(t)=vt. i.e.—changes in the surface velocity are relatively small during the integration time used for determination of the translation direction. Thus, the first and second derivatives of the received signal are:

$$I'_s(t) = I_0 v \sum_{i=1}^{k} r_i \cos(\phi_i) \frac{d}{dx}(A(x_i + vt)) \quad (23)$$

$$I''_s(t) = I_0 v^2 \sum_{i=1}^{k} r_i \cos(\phi_i) \frac{d^2}{dx^2}(A(x_i + vt)) \quad (24)$$

Assume that A(x) is constructed such that $$\frac{d^2 A(x)}{dx^2} = \eta \frac{dA(x)}{dx}.$$

In this special case it is evident that: $I''_s(t) = \eta v \cdot I'_s(t)$. Thus, the magnitude, and more importantly, the sign of the translation velocity (i.e.—the translation direction) can be derived from the ratio between the first and second time-derivatives of the detector signal.

If the velocity cannot be assumed to be constant during the direction-decision integration time, then the derivatives may be performed with respect to the measured translation (which is known from the zero-crossing or from another detector with higher accuracy operated in parallel). If only the direction is required (and not the velocity magnitude), it is sufficient to check if the first and second derivatives carry the same sign (one direction) or not (opposite direction). A simple XOR (exclusive OR) operation after sign-detection of the derivatives will be "1" if the sign of $\eta$ is opposite to the sign of v and "0" if they are the same.

An example of A(x) that satisfies the constant derivative ratio is a combination of exponents like:

$$A(x) = \begin{cases} A(1 - e^{-\gamma(x - j\Lambda)/\Lambda}); & \text{if } j\Lambda \leq x < \Lambda(j + 1/2) \\ A(e^{-\gamma(x - (j+1/2)\Lambda)/\Lambda} - e^{-\gamma/2}); & \text{if } \Lambda(j + 1/2) \leq x < \Lambda(j + 1) \end{cases} \quad (25)$$

where the pattern is repetitive with a cycle $\Lambda$. It is evident that for this pattern the first and second (and in fact all) derivatives have a constant ratio as required, of $\eta = -\gamma/\Lambda$. But, the singularity points in multiples of $\Lambda/2$ introduce "noise" to the measurement. These singularities increase the error probability as the number of scatterers grow, since each one will appear in the received signal when a scatterer passes across it. The relative noise contribution is reduced as the direction detection integration time increases.

Figure 2:
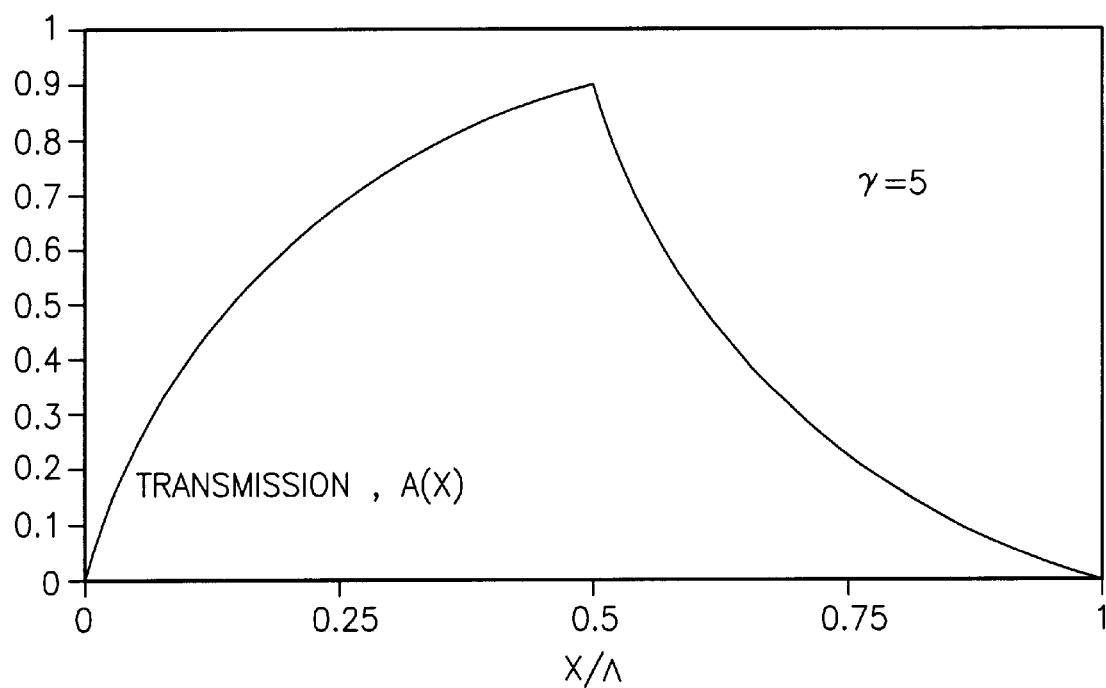
FIG. 2 is a graph of a grating transmission function, in accordance with a preferred embodiment of the invention.

The pattern is assumed to be the intensity of illumination on the surface. Thus, the requirement for the near field is more stringent than the similar requirement for measuring translation magnitude alone in n=0 specular reflection. An assumed transmission pattern is shown in FIG. 2, for $\gamma=5$. This can be achieved by having a partially reflecting/transmitting property for the grating, having an amplitude transmission function such as that shown in FIG. 2.

A relaxed requirement from the transmission pattern is that the derivatives will have a constant sign relationship (i.e.—they are not exactly proportional, but their ratio's sign is constant along the pattern). Here, direction-detection is still assured for a single scatterer, but the error probability is higher than in the former case as the number of scatterers gets larger (even without the effect of the singularities).

A similar analysis is possible for high-order diffraction ($|n| \gg 1$). Again, for simplicity the surface is assumed to move with a constant velocity, v. Equation (21) can be looked at as a sum of amplitude-modulated signals of a carrier with frequency $nv/\Lambda$.

A(x) is now assumed to be asymmetric (e.g.—sawtooth waveform). For $|n| \gg 1$, the detector's signal envelope matches the transmission function for translation in the "positive" direction and is the inverse image the other way. Thus, if the number of scatterers is small (the limit being dependent on the grating order n), the translation direction is represented by the sign of the first derivative of the detected signal's envelope. In addition, the magnitude of the envelope derivative is proportional to the magnitude of the translation velocity.

An asymmetric transmission pattern enables direction detection for speckle velocimetry. The detector signal resulting from a random speckle pattern, filtered by a grating with intensity transmission pattern A(x) adjacent to the detector, can be represented as:

$$I_s(t) = I_0 \sum_{i=1}^{k} r_i A(x_i + p(t)) \quad (26)$$

where $r_i$ and $x_i$ are the intensity and position of the i-th "speckle", respectively, and p(t) the surface translation. Assuming constant velocity, p(t)=vt, the detector signal time derivative is:

$$I'_s(t) = I_0 v \sum_{i=1}^{k} r_i \frac{d}{dx}(A(x_i + vt)) \quad (27)$$

The intensities $r_i$ are positive values. Thus, if dA/dx is constant, then the derivative of the detector signal is indicative of the translation direction. Such a pattern is accomplished using sawtooth transmission pattern. The discontinuities in the pattern add noise to the measurement, requiring the use of an appropriate integration interval in order to limit the error probability. The motion velocity is determined from the frequency of oscillations of the detector signal.

Of course, it is possible to utilize mechanical or other means (e.g.—an accelerometer) to determine the direction of motion as a complementary component in an OTM device.

As was noted above, fluctuations in the source amplitude are directly transferred to the received signal via the local oscillator field. In order to minimize such noise, in accordance with a preferred embodiment of the invention, a signal proportional to the source amplitude is detected and the resulting signal (termed the "compensation" detector and signal) is subtracted from the detector signal. This detection can be performed, for example, by:

Splitting the source beam with a beamsplitter (which need not be accurately aligned) and directing the diverted beam to the compensation detector, or Directing any of the light beams diffracted from the grating to a compensation detector without spatial-filtering it (but potentially with considerable attenuation). Conveniently this may be one of the grating orders not used for the spatial filter measurement. e.g.—use order 1 for spatial filter and order 0 for source-noise compensation.

Figure 19A:
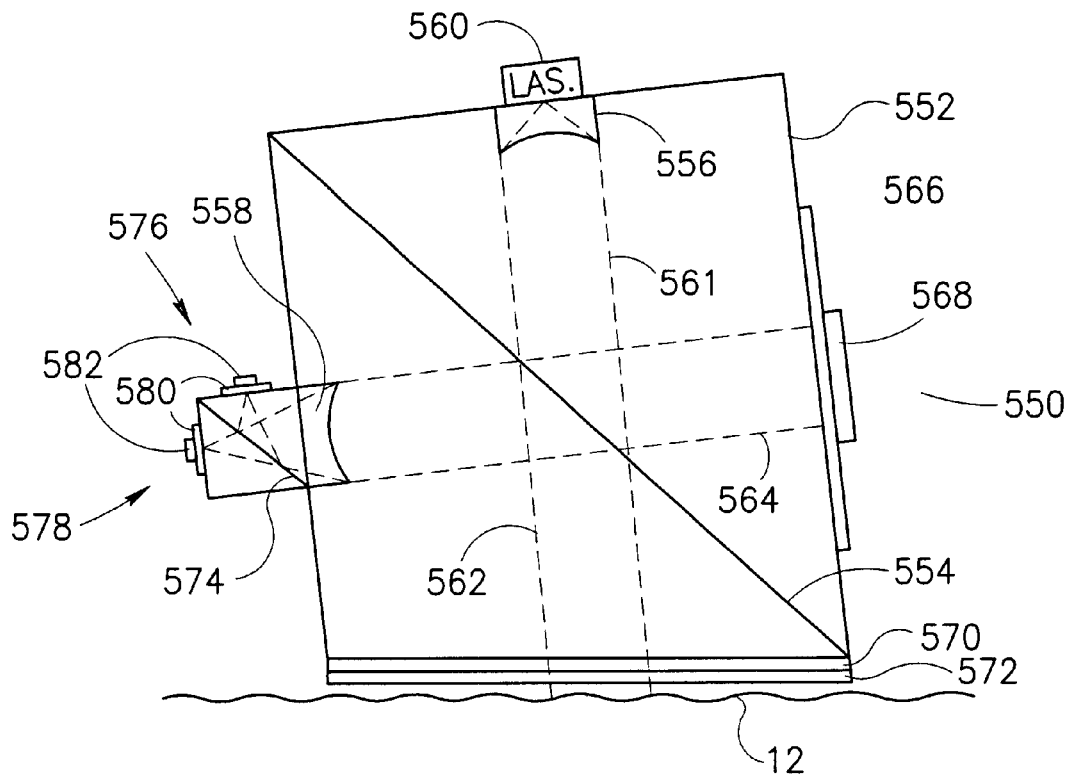
FIGS. 19A and 19B schematically show integrated structures that operate according to the same principles as the apparatus of FIGS. 15 and 16, combined with direction detection as in FIGS. 3C, 17 and 18.
Figure 19B:
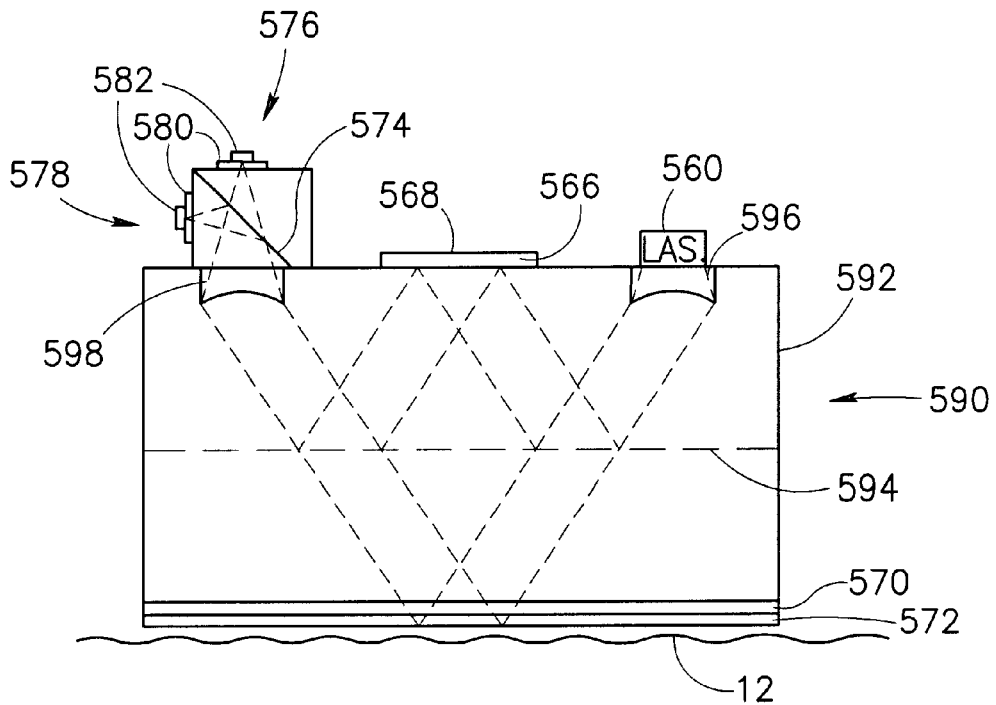
Figure 19C:
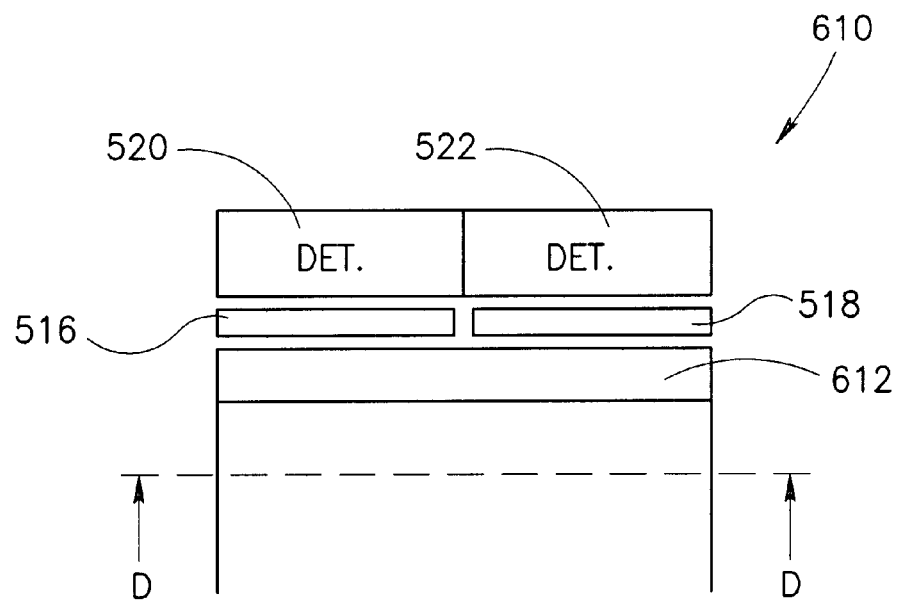
FIGS. 19C and 19D schematically show details of a detector module utilized in some preferred embodiments of the invention.
Figure 19D:
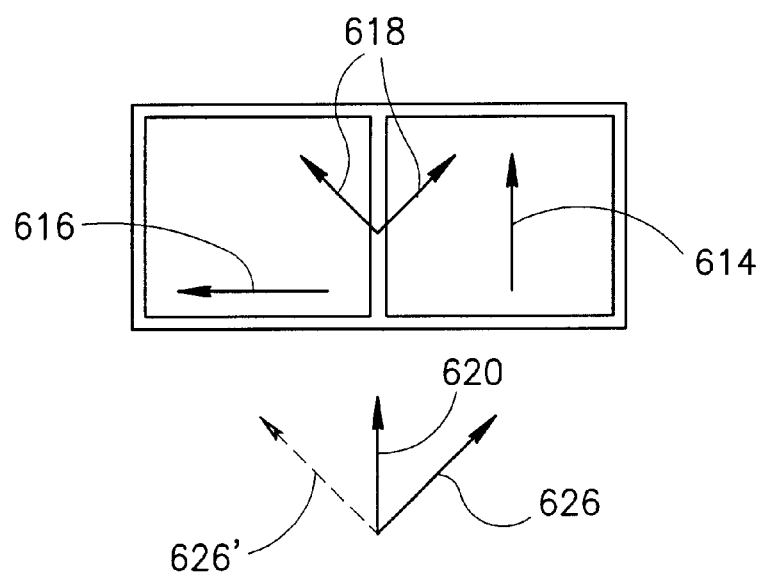

Directing one or more of the grating orders to one or more compensation detectors, such that the reflection from the surface is blocked by a polarizer, as explained in detail with respect to FIG. 19D.

The output of the compensation detector is amplified (or attenuated) so that the resulting difference signal is as close to zero as possible when the surface is not moving relative to the device (or when the "window" is closed with an opaque cover), thus compensating for local oscillator power fluctuations.

The detected intensity (and the resulting detected signal) as described in Eq. (8) includes a local oscillator component $E_{LO}^2$ (=$E_0^2$), a cross term, $E_0 E_r$, and a second order surface reflection term $E_r^2$.

In order to compensate for variations in the $E_0$ multiplier of the $E_r$ component, the signal from the compensation detector may be the control voltage of a gain-controlled amplifier in one of the stages of the signal amplification (after the first compensation by subtracting the $E_0^2$ component). The gain should be approximately proportional to the inverse of the square-root of the compensation signal.

Preferably, for highest signal quality, the $E_r^2$ component is also compensated. This may be especially useful for those embodiments of the invention utilizing an "effective pinhole" (described below) to spatially filter the reflected surface illumination. In this embodiment the exposed detector area over which the $E_r^2$ component is integrated may be much larger than the "effective pinhole" area. The $E_r^2$ component can be compensated utilizing a detector that does not detect a local oscillator field. The compensation detector may be positioned such that essentially no grating order falls on it. Alternatively, it may detect only polarized light such that any local oscillator field is effectively blocked. This may be implemented, for example, by placing a polarizer before the detector.

Figure 26C:
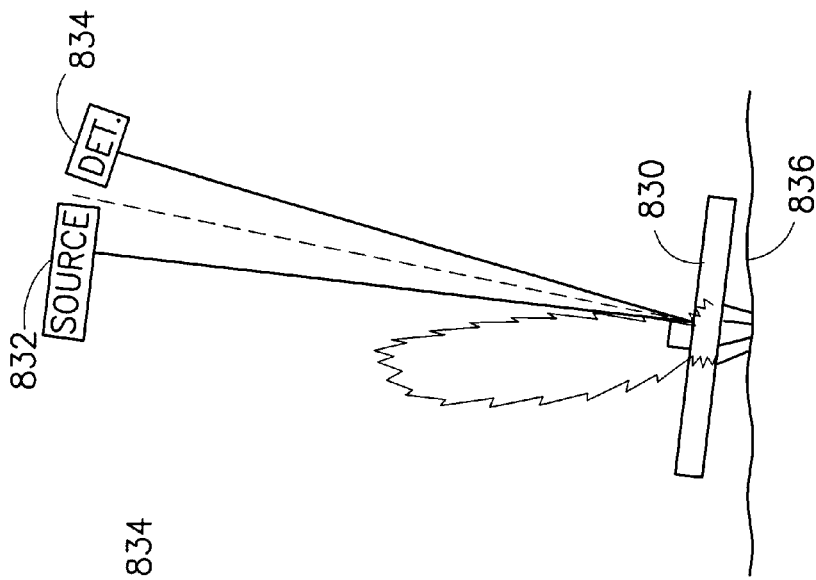
FIGS. 26A–26C illustrate positioning of source, detector and grating in which the detectors are positioned far from the specular reflection from the surface, in accordance with a preferred embodiment of the invention.
Figure 26B:
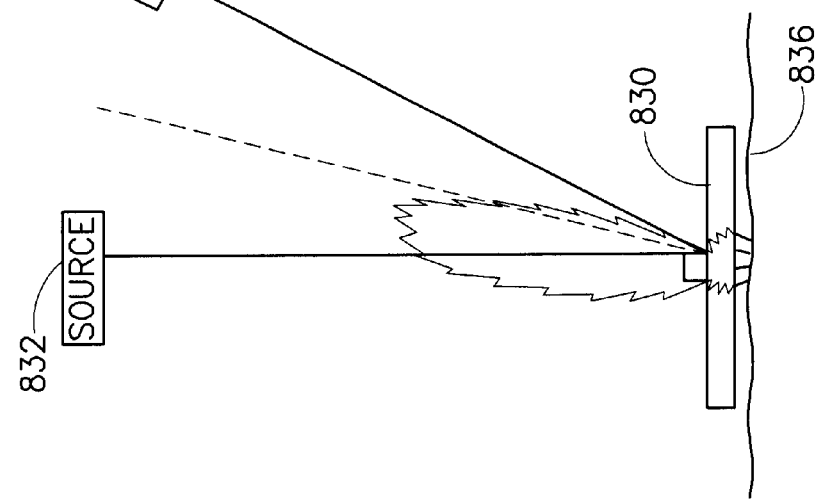
Figure 26A:
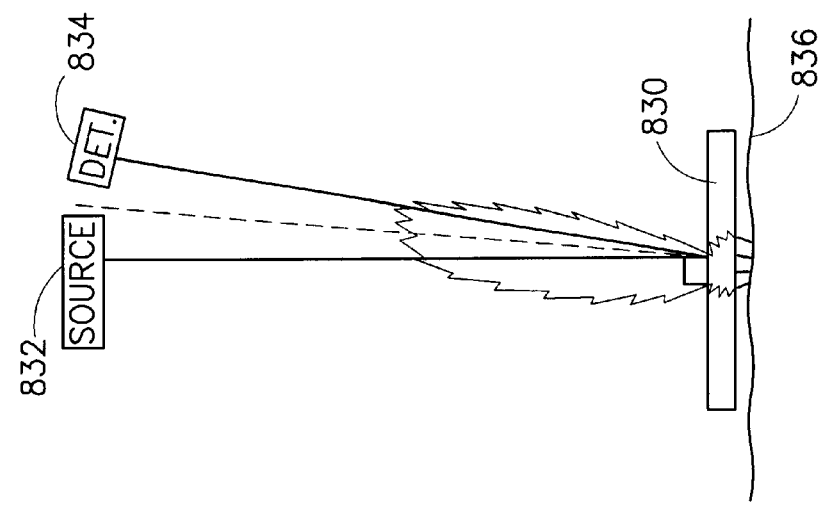

Changes in the $E_r^2$ component are generally caused by changes of contrast in the surface, due for example to differences in the reflection coefficient of different colors. However, the reflection of a highly reflecting surface (e.g., laminated paper) is also sensitive to small changes in the reflection angle near the angle of specular reflection, as presented in FIG. 26A. For simplicity of presentation, FIGS. 26A–26C show perpendicular illumination of a grating 830 from a source 832 and only one detector 834, in addition to a surface 836. In order to reduce the changes in the $E_r^2$ component, it is preferable to arrange the source and the detectors so that the detectors are positioned far from the specular reflection of the surface, as in FIG. 26B. Alternatively, specular reflection from the surface toward the detectors can be avoided by tilting the whole component by a few degrees with espect to the surface plane, opposite to the detector directions, as in FIG. 26C. However, the effect of the tilt angle on the Doppler frequency should be taken into account. Preferably, Z-compensation (such as described with respect to FIG. 21) is used to significantly reduce the sensitivity of the measurement to the accuracy of the tilt angle.

Figure 3A:
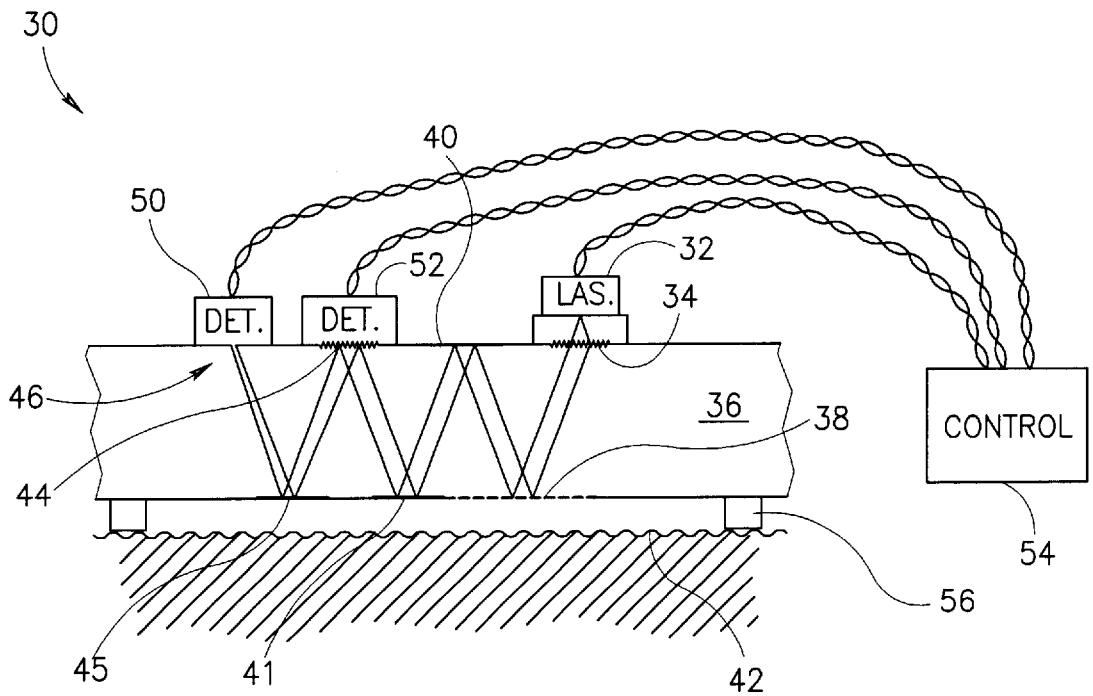
FIGS. 3A, 3B and 3C are schematic representations of preferred embodiments of integrated motion transducers, in accordance with preferred embodiments of the invention.

FIG. 3A shows a preferred implementation of a translation detector, in accordance with a preferred embodiment of the invention, in which zeroth order detection is used and which does not incorporate direction detection, or in which the detection of the direction is based on an asymmetric grating transmission pattern and appropriate signal analysis. FIG. 3A shows an integrated optical chip translation device 30 that is suitable for mass production. It utilizes only a few components that can be manufactured in large quantities for a low price. Device 30 comprises a laser diode 32, preferably a single transverse mode laser. Laser light from laser diode 32 is preferably collimated by a lens 34, which is preferably a diffractive collimating lens, etched into or deposited onto the surface of an optical chip substrate 36 of glass, quartz or the like, preferably coated with non-reflective layers on both sides other than in designated areas. A grating 38 which may be an amplitude and/or a phase type grating, is mounted on optical chip substrate 36. Grating 38 is preferably etched or deposited onto the lower surface of substrate 36. Light reflected by the grating and light reflected from a surface 42 are reflected by two reflective surfaces 40 and 41 and focused by a lens 44, preferably a reflective diffractive focusing lens, etched into the surface of optical chip substrate 36. The light is further reflected by a reflective surface 45. A pinhole 46, formed in a reflective/opaque layer formed at the focus of lens 44, passes only a plane wave from surface 42 and the reflected light from grating 38 to a detector 50, for example a PIN photo diode or similar device. A compensation detector 52 is preferably placed behind lens 44 and detects a portion of the light reflected by grating 38. A controller 54, comprising a laser diode driver/modulator for activating laser diode 32, detection amplifiers and zero crossing counting circuits or frequency detection means is used for determining the translation or the velocity of the surface. Compensation detector 52 supplies a compensation signal proportional to the amplitude of the local oscillator for reducing any residual effects of variations in the laser output. For reduction of noise, twisted wire pairs, shielded wires or coaxial cable are preferably used to carry signals to and from controller 54. Preferably, the apparatus is provided with legs or a ring support 56 or other such means on which the device rides on surface 42 to avoid damage to grating 38 and to keep the distance between the grating and the surface fairly constant.

Figure 3B:
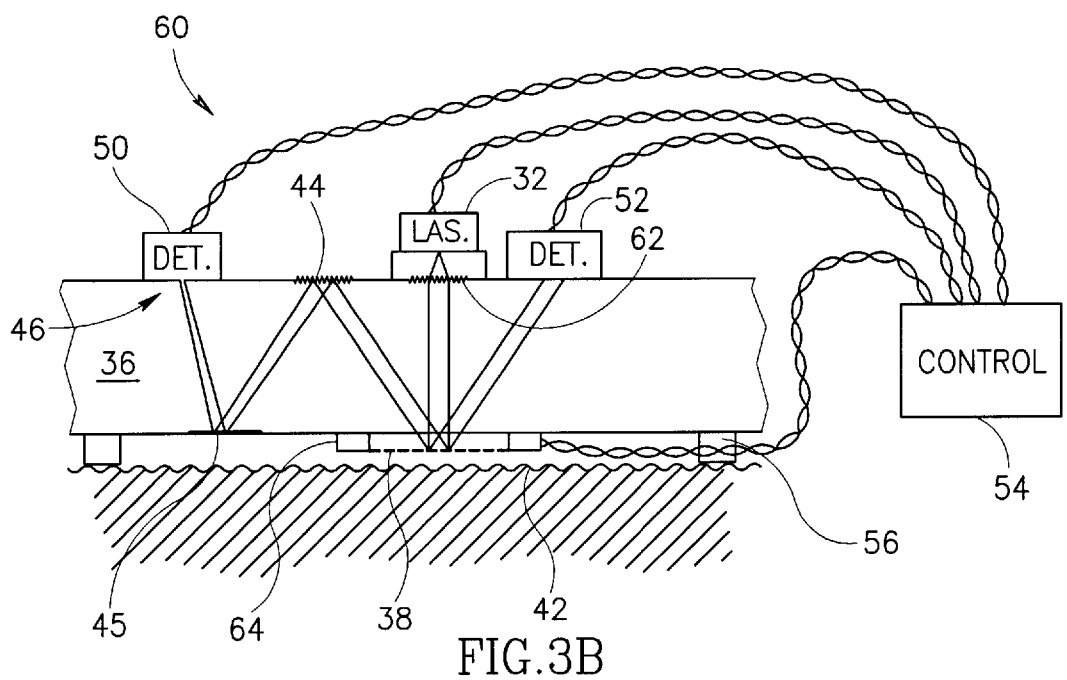

FIG. 3B shows an alternative preferred embodiment of the invention including direction detection by phase shifting of the local oscillator and utilizing first order diffraction from the grating. Elements, which are functionally the same are given the same reference numerals in both FIGS. 3A and 3B. FIG. 3B shows a device 60 in which light from laser diode 32 is collimated by a lens 62, to strike a grating 38. Grating 38 is preferably mounted on a piezoelectric ring 64 (which is in turn mounted on optical substrate 36). Excitation of ring 64 adds a variable phase to the local oscillator (the light diffracted from grating 38) in order to allow for direction detection, as described above. In the embodiment shown in FIG. 3B, both the detection of the signals used for translation and direction detection on the one hand and for compensation detection on the other hand, are based on first order diffraction by grating 38, but with opposite sign. Preferably, anti-reflection coatings are used, where appropriate, to reduce unwanted reflections.

An integrated optical chip is the preferred implementation scheme since it can be manufactured in large volumes for a low cost. The figure shows only one detector for a single direction, with preferably a second detector measuring the orthogonal direction. All of the optical elements—lenses, grating, mirrors and pinholes—are etched into or deposited onto the optical substrate and are either reflective or transmissive according to functionality. The discrete components in the system—laser diode, detector and piezoelectric transducer—are mounted on top of the chip. The electronic elements of controller 54 may also be manufactured or placed on top of the chip.

It should be understood that the features of FIGS. 3A and 3B can be mixed and combined. For example if, in FIG. 3A, grating 38 is mounted on a transducer such as ring 64, then the result would be a device operating in the specular reflection (zeroth order) mode with increased dynamic range and possibly additional axial translation detection. Furthermore, it is possible to use an asymmetric grating in place of grating 38 and ring 64 of FIG. 3B for the purpose of direction detection. For these and other preferred embodiments of the invention, combining various aspects of the invention will occur to persons skilled in the art.

Figure 3C:
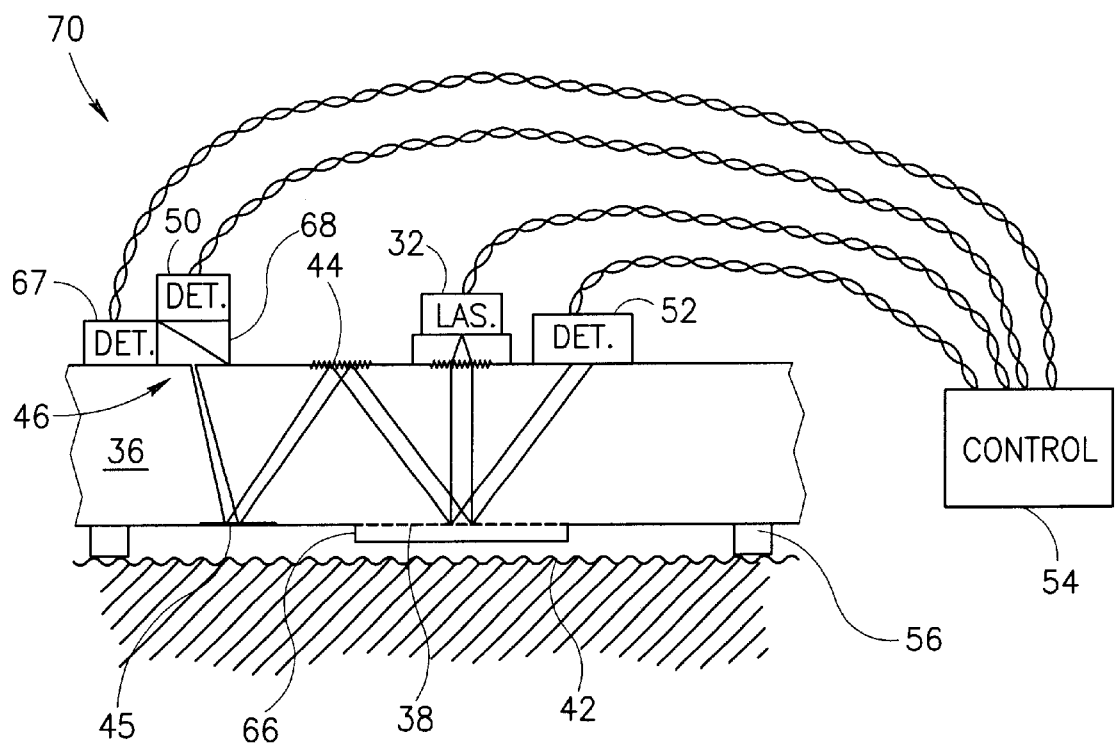

FIG. 3C shows yet another method of determining direction, in accordance with a preferred embodiment of the invention. Device 70 of FIG. 3C is similar to device 60 of FIG. 3B except that grating 38 is placed at the lower surface of chip 36 and a birefringent plate 66 replaces piezoelectric ring 64. Source 32 produces linearly polarized light having a polarization that is at an angle of 45 degrees with the birefringent axis of plate 66. Radiation that is reflected from the surface passes through plate 66 twice and consists of two waves, each having a polarization direction at a 45 degree angle with that of the radiation reflected from or diffracted from grating 38. These waves are also ideally at a 90 degree phase difference with each other.

In addition, a polarizing beam splitter 68 is preferably placed before detector 50. Its axis is such that one polarization is transmitted toward detector 50 and the orthogonal polarization is reflected to a detector 67. In addition, beam splitter 68 directs half the radiation reflected or diffracted from grating 38 to each of detectors 50 and 67. The resulting signals detected by detectors 67 and 50 will have a phase difference of 90 degrees. The sign of the phase difference can be used to determine the direction of motion.

Alternatively, a partially reflecting mirror is used to separate the radiation into two parts, and orthogonal polarizers are placed in front of the two detectors to separate the polarizations.

Preferably, the illumination of the grating is collimated. However, non collimated illumination may also be used, in which case the diffraction from the grating will be astigmatic (i.e., will no longer have a single focal plane). It is preferable to compensate for this effect so that the spatial filtering is optimal. Conveniently, one or more lenses may be designed to correct for the grating astigmatism. Alternatively or additionally, the grating itself may be designed to include astigmatic correction. Similar astigmatic effects and corrections are expected to exist in other diffractive elements illuminated by non-collimated light.

Figure 4:
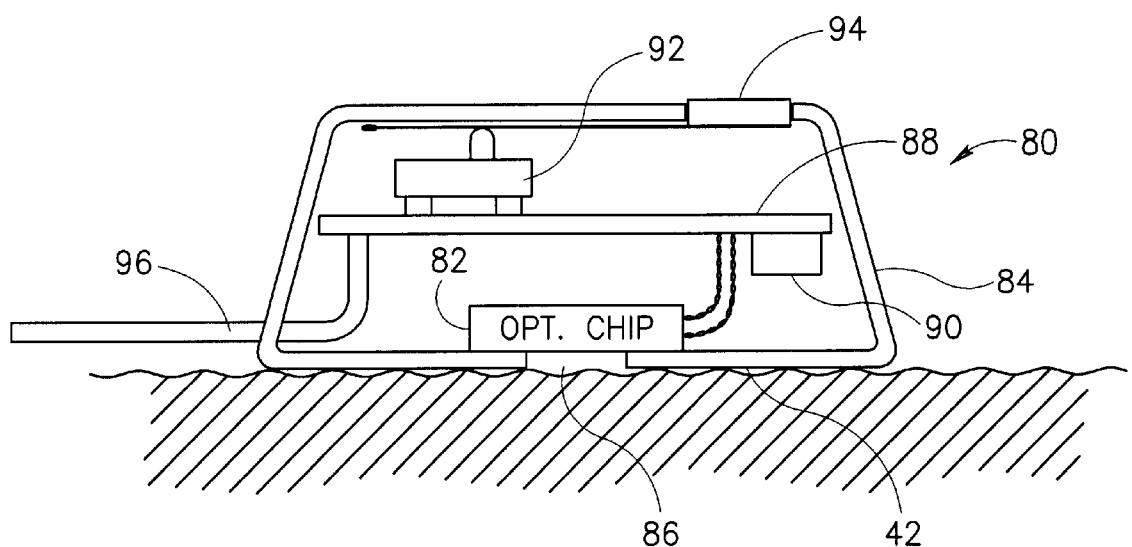
FIG. 4 is a schematic diagram of an optical mouse in accordance with a preferred embodiment of the invention.

While the present invention is described above in various embodiments for solving the general problem of translation measurement, the methodology is applicable to a large number of products. One particular application of the optical translation measurement method of the invention is a novel optical cursor control device (mouse) which derives its translatatory information from movement on substantially any diffuse surface, such as paper or a desktop. One design for such a device, in accordance with a preferred embodiment of the invention, is shown in FIG. 4. An optical mouse 80 comprises an "optical chip" 82 which is preferably a device such as device 30, device 60, device 70 or a variation of these devices. Chip 82 is mounted in a housing 84 and views paper 42 through an optical aperture 86 in housing 84. Input and output leads from chip 82 are preferably connected to a printed circuit board 88 or the like on which are mounted electronic circuitry 90 corresponding to the controller of devices 30, 60 or 70. Also mounted on PC board 88 are one or more switches 92 that are activated by one or more push-buttons 94 as in conventional mice. The mouse is conventionally connected to a computer via a cable 96 or with a wireless connection.

The method of measurement in accordance with preferred embodiments of the invention described above allows for a wide dynamic range of translation velocities, covering all the required range for normal operation of a mouse. Such a device can be characterized as a 'padless optical mouse' to provide orthogonal signals to move a cursor from position to position on a display screen in response to movement of the mouse over any sufficiently diffusely reflective surface, such as paper or a desk top. Thus, special contrasting markings or special patterns are not necessary.

Mouse systems usually use mechanical transducers for the measurement of hand translation over a surface (commonly a "mouse pad"). A need for moving-parts-free, reliable and accurate translation measurement technology for use in mouse systems is well acknowledged today. A few optical devices were developed, but still suffer from various deficiencies, such as a need for a dedicated patterned pad, low transducing performance or high cost.

An optical padless mouse according to one preferred embodiment of the invention can be used in two ways, according to the user's convenience. It can be used as a "regular" mouse, whereby the mouse is moved on top of a surface, and its motion relative to that surface is measured.

It can also be flipped over, if so desired, and instead used by moving the finger along the device aperture. The motion of the finger relative to the mouse body, which is now stationary, will be measured.

Figure 5A:
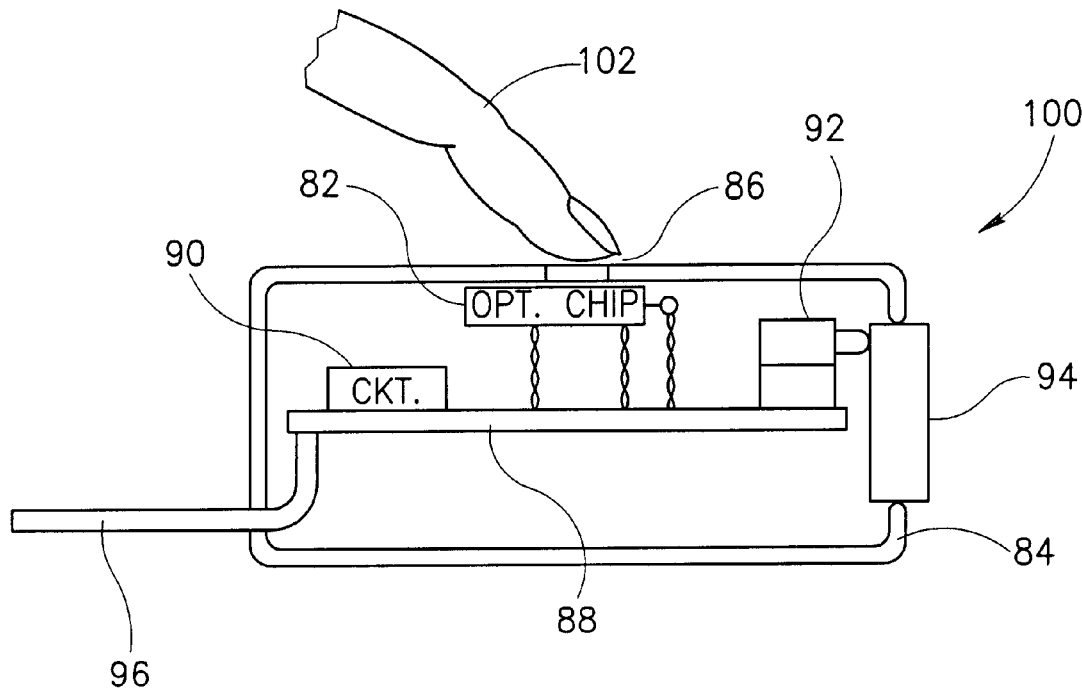
FIGS. 5A and 5B are schematic diagrams of a mouse/finger translation measurement device, in accordance with a preferred embodiment of the invention.
Figure 5B:
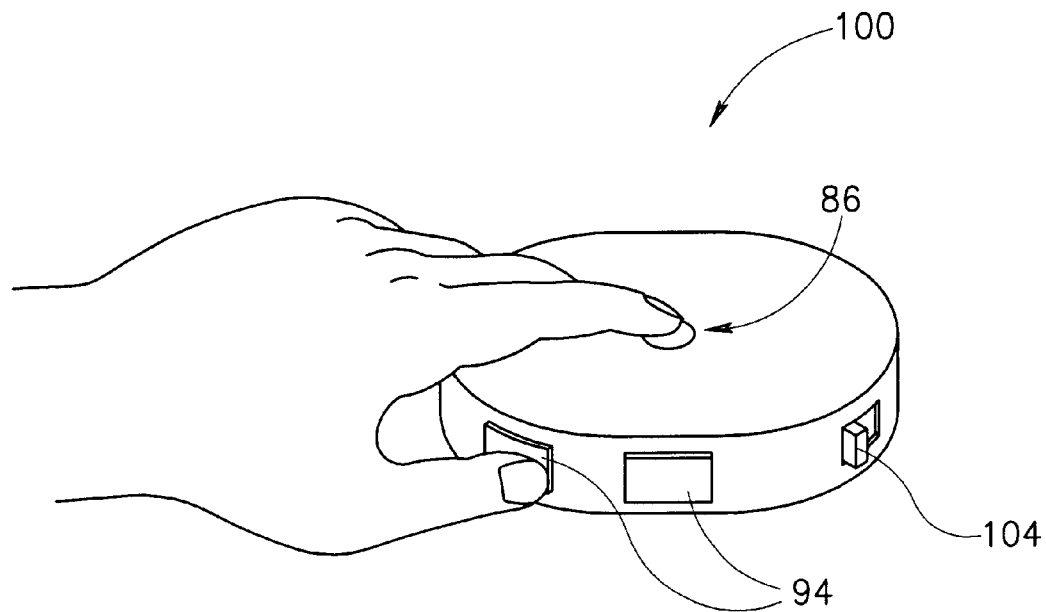

One such device 100 is shown in FIGS. 5A and 5B. FIG. 5A shows that structurally the device is similar to that of FIG. 4 (and the same reference numbers are used in the two Figs. for ease of comparison), except that buttons 94 are on the side of housing 84 in device 100. In the mode shown in FIG. 5A, device 100 is stationary and is used to track the movement of finger 102 of an operator. It should be clear that device 100 can be turned over and used as a mouse, in much the same way as the mouse of FIG. 4. FIG. 5B shows a perspective view of the device, showing an optional switch 104 which is used to indicate if device 100 is used as an ordinary mouse or in the mode shown in FIGS. 5A and 5B. Alternatively, such a switch may be a gravity switch mounted in the device to automatically switch modes. It is generally desirable to know in which mode the device is operating since the direction of motion of the cursor is opposite for the two modes and usually, the sensitivity desired is different for the two modes.

Furthermore, using a translation measurement device with a small aperture, as in the present invention, and moving a finger along its aperture, enables moving a cursor through measurement of the translation of the finger, much like a touch pad. This function may be termed "touch-point" and may be used in dedicated minute locations on keyboards as well. This device would be identical to the device of FIG. 5 except that the optical chip would be mounted in the keyboard as would the switches. Also, an OTM "touch-point" may be used on the top of the mouse as an alternative to a scrolling wheel. "Clicks" may be detected, for example, by bringing the finger into and out of range of the touch point.

This device can be used to replace pointing devices other than a mouse, for example, pointing devices used in laptop or palmtop computers. Virtually any one or two dimensional motion can be controlled using such a device.

Currently, laptop computers pointing devices employ either a track ball, a touch pad, a trackpoint (nipple) or an attached mouse. These devices carry diverse drawbacks. In particular, the track ball collects dust much like a regular mouse, the touch pad is sensitive to dampness and was hailed unfriendly by many users, the trackpoint drifts when it should be idle and the attached mice are delicate and require a desktop to work on.

The touch-point device is small in size, its working aperture can be less than 1 mm² and it provides high resolution and dynamic range. This makes it an ideal solution as a pointing device to be embedded in a laptop computer. The device is operated by moving a finger across the face of the aperture, in a somewhat similar manner to the use of a touch pad. The difference being, that the aperture is very small in size compared to the touch pad, it is free of problems like humidity and dampness and its reliability is expected to be high. In fact, several touch point devices can be easily embedded in a single laptop or a palm top, including on keys, between keys, or next to the screen. Additionally, a pressure sensitive device may be included under the touch point device and the sensitivity of the touch point made responsive to the pressure of the finger on the touch point.

In a preferred embodiment of the invention, two touch points are provided, a first touch point and circuitry which moves a pointer responsive thereto and a second touch point and circuitry which causes scrolling responsive thereto.

Figure 6:
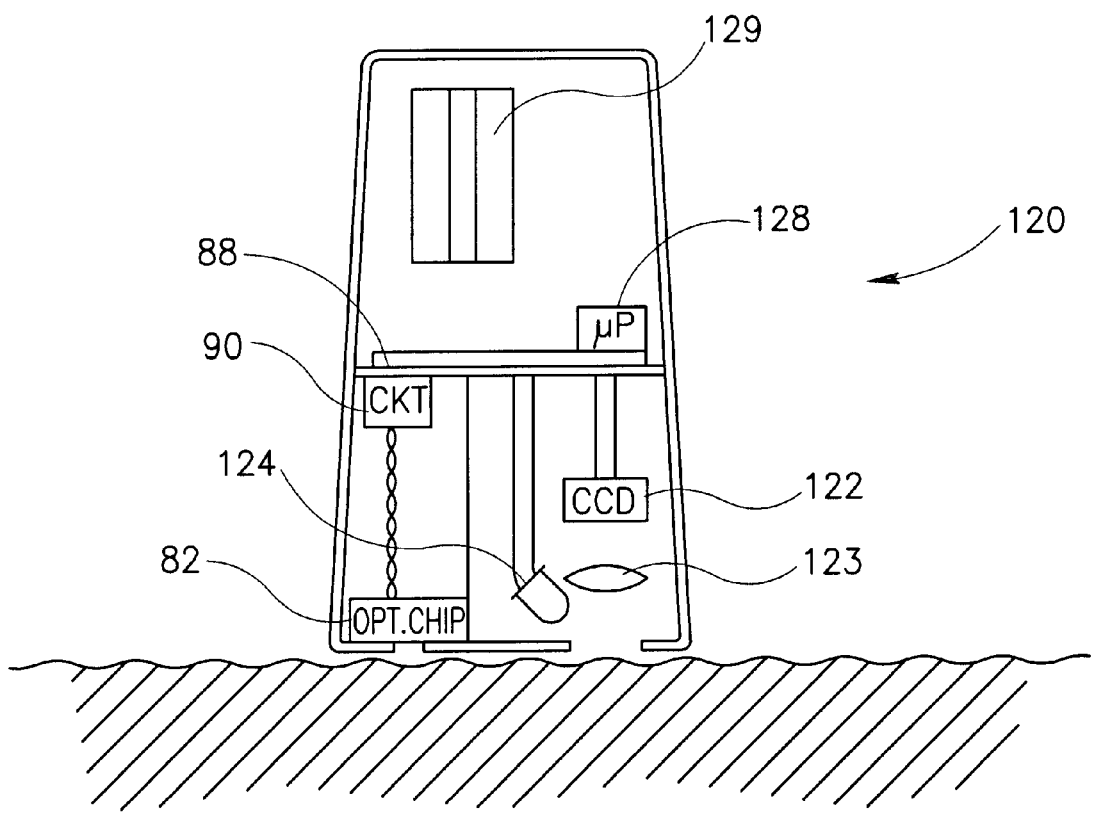
FIG. 6 is a schematic diagram of a scanning pen in accordance with a preferred embodiment of the invention.

In a further preferred embodiment of the invention, the present invention can be used as an improved translation and/or velocity measurement system for a scanning-pen, capable of scanning lines of text (or any other pattern) and storing them, for downloading later to a PC, and/or for conversion to ASCII code using OCR software. An example of such a device is shown in FIG. 6. A scanning pen 120 comprises a 'reading' head with a one dimensional or two dimensional array of photo detectors (such as a CCD array) 122 and a lens 123, wide enough to scan a typical line height, and a lighting source 124 as in conventional light pens. The pen head also contains an optical translation measurement system 82 in accordance with the invention, for one or two axis measurement of the translation of the pen head across the scanned paper and possibly another one to extract rotation information. The pen can then either store the scanned line as a bitmap file (suited for hand-writing, drawings etc.) or translate it immediately through using internal OCR algorithm to binary text. The stored information may be downloaded later to a computer, palmtop or phone, etc. For this purpose and for the powering and control of the various devices in pen 120, it is provided with a controller or microprocessor 128 and batteries 129.

Optical translation methods of the present invention allow for devices to be small in size, convenient to use, and accurate. The high accuracy results from the inherent high accuracy of the method of the invention as compared to current mechanically-based mice and from the ease of measurement in two or three dimensions. Similar commercial devices today use a patterned wheel that is pushed against the scanned surface while scanning and rolled in order to measure the translation by detecting the rolled angle of the wheel. This technique only detects the location along the line and not along its vertical axis and its relatively low accuracy limits the range of applications it can be used for.

A further preferred application of the optical translation method and device of the present invention is a portable or a fixed device, for scanning signatures and relaying them to an authentication system. Similar in principal to the scanning pen, the signature reader contains a 'reading' head, with a one dimensional or two dimensional array of photo detectors (such as a CCD array). It has an aperture wider than that of the scanning pen, to be able to read wider or higher signatures and contains an optical translation measurement device, for detection of the two axes translations of the hand or instrument which is moving the device across the scanned signature. The signature reader does not contain any OCR, as no text files are to be created. Instead, it is connected (through direct, hardwire line or wireless link, or through an off-line system), to an "authentication center", where the scanned signature is compared to a "standard signature" for validation. This device can be accurate, while cheap, small and easy to use.

Figure 7:
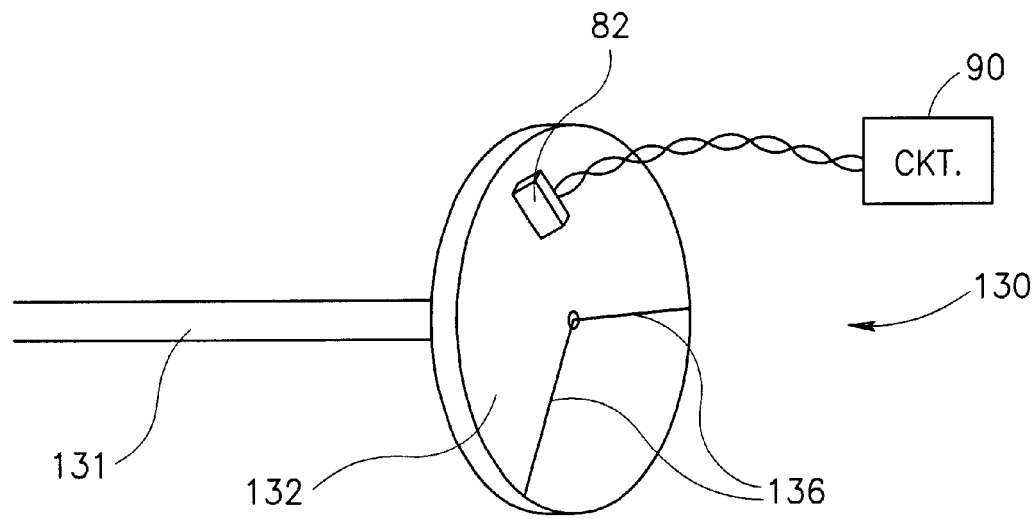
FIG. 7 is a diagram of a rotation encoder, in accordance with a preferred embodiment of the invention.

A still further application of the devices and methods described above is in the field of encoders. The present invention can replace linear encoders and angular encoders, which generally require highly accurate markings on either an encoder wheel or on a surface, by a substantially markless encoder. An angular encoder 130 in accordance with this aspect of the invention is shown in FIG. 7. Encoder 130 comprises a disk having a diffusely reflecting surface 132 mounted on a shaft 131. It also includes an optical chip 82 and controller 90, preferably essentially as described above. Preferably, surface 132 is marked with one or two radial marks 136 to act as reference marks for the encoder and for correction of errors, which may occur in reading the angle during a rotation. This mark may be read by optical chip 82 or by using a separate detector.

The motion of the surface illuminated by chip 82 may be described as a combination of a common translation of all scatterers according to the tangential motion at the illuminated portion and a rotational motion according to the angular velocity of surface 132. Preferably, the illuminated area is small compared to the distance from the center of rotation such that the curvature induced component may be neglected. Alternatively, in a non-Doppler mode of operation, a grating with equal angular spacing between grating lines is preferably used, enabling direct measurement of the angular displacement instead of measurement of the equivalent surface translation.

A further embodiment of the invention is a virtual pen, namely a pen that translates movement across a featureless page into position readings. These position readings can be translated by a computer into virtual writing, which can be displayed or translated into letters and words. The computer can then store this virtual writing as ASCII code. Transfer to the computer may be either on line (using a wired or preferably a wireless connection to the computer) or off-line wherein the code or positions are stored in the "pen" and transferred after writing is completed. This embodiment of the invention provides a compact, paper-less and voice-less memo device.

In a typical fax/printer, the paper is moved in a constant speed relative to the writing head with an accurate motor. The head releases the printed data line by line, in a correlated fashion with the speed of advancing paper. This method is both expensive, as it requires an accurate motor and mechanical set up, and inaccurate, as the paper sometimes slips in the device, thus the paper translation is not well correlated to the printing device, resulting in missed or crooked lines.

With an optical translation measuring device, it is possible to detect paper slippage by measuring the paper advancement on-line. The printing device is then coordinated with the actual translation of the paper, thus creating a highly accurate and economic system. Similarly, these principles can be applied to a desktop scanner, where a reading head replaces the printing head. Furthermore, the type of paper or other surface (for example, type of cloth) may be identified from characteristics of the detector signals. Features, which may be used to identify the type of paper, include the ratio between reflected AC and DC power, absolute AC and DC power, harmonics ratio, etc., or a combination of these characteristics. In addition, the sensor may detect a discontinuity in paper height, amounting to multiple feed situation. This discontinuity may be determined by an axial translation measurement, an apparent discontinuity in the measured transverse direction, or loss of signal caused by temporary loss of coherence between the reflection and the local oscillator.

Figure 8:
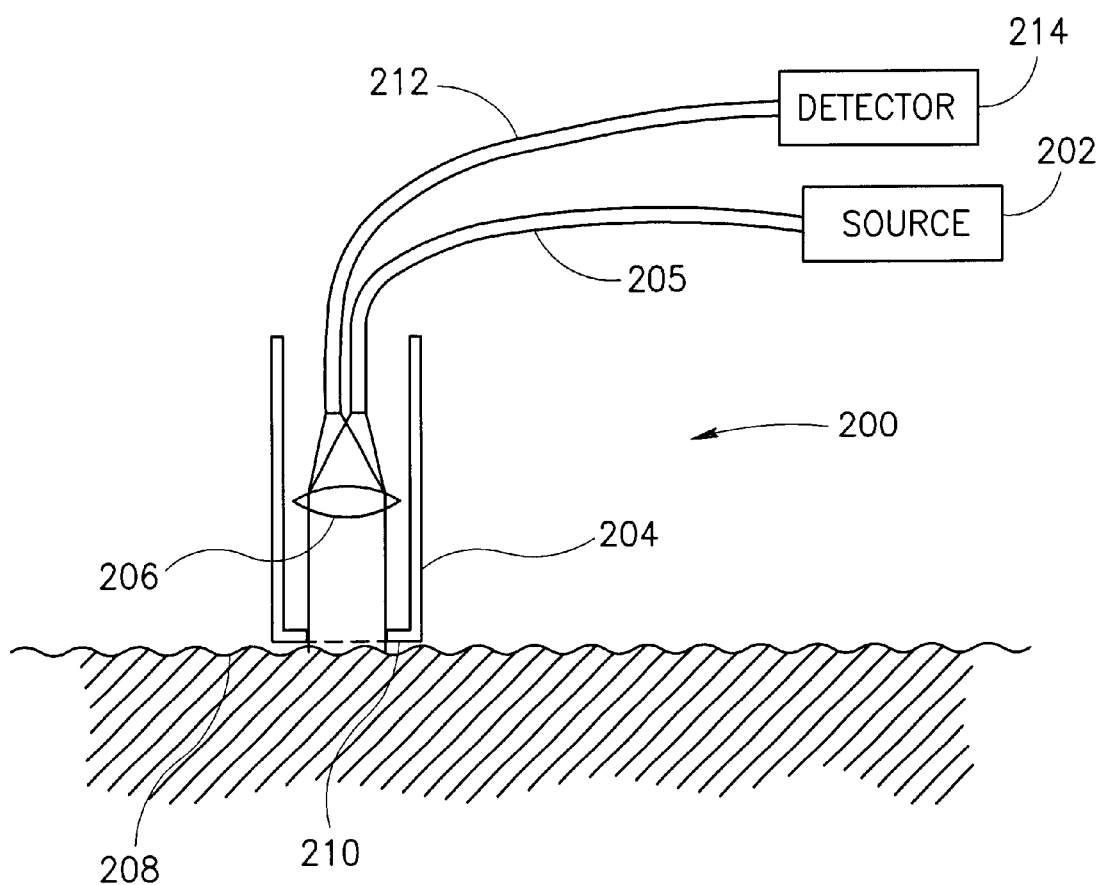
FIG. 8 is a schematic diagram of a fiber-optic-based translation measurement device, in accordance with a preferred embodiment of the invention.

FIG. 8 is a schematic of a motion sensor useful in a scanner, fax machine or printer in which motion is only in one direction. Motion detector 200 includes a source 202 that is fed to a housing 204 by a fiber optic cable 205. The output of cable 205 is collimated by lens 206 and illuminates a moving surface 208, through a grating 210. Light reflected from grating 210 and surface 208 is collected by a fiber optic cable 212 which is placed at the focal point of lens 206. The output of cable 212 is fed to a detector 214, for further processing as described above.

In a preferred document scanner embodiment of the invention, the motion detector measures the relative movement of a document, preferably, without utilizing any printing on the document, while a reading head reads printed information from the document. A memory receives information from the printing head and stores it in memory locations, responsive to the measurement of movement of the document.

In a preferred printer embodiment of the invention the motion detector measures the movement of a sheet on which markings are to be made and a memory transmits commands to mark the paper, in accordance with information in the memory, responsive to the measurement of motion of the paper.

Either or both preferred scanner and printer embodiments of the invention may be utilized in a facsimile machine in accordance with preferred embodiments of the invention.

Motion detectors of the invention may also be used to measure the various motions in CD and magnetic memories.

Figure 9:
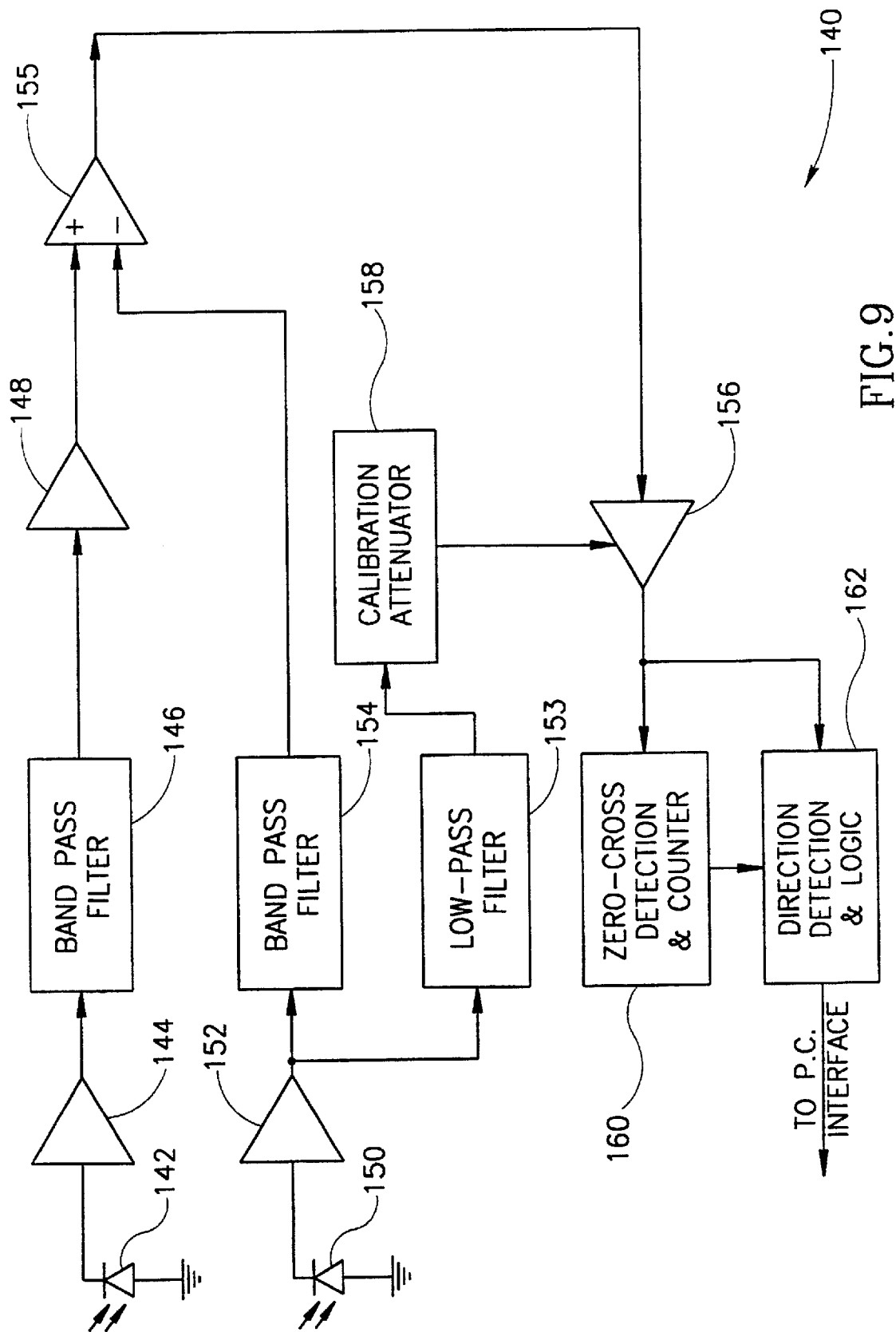
FIG. 9 is a simplified and generalized block diagram of electronic circuitry, suitable for use in preferred embodiments of the invention.

FIG. 9 is a simplified block diagram of typical electronic circuitry 140 useful in carrying out the invention. A "primary" photodetector 142 (corresponding, for example to detector 50 of FIGS. 3A and 3B) receives light signals as described above. The detector detects the light and the resulting signal is preferably amplified by an amplifier 144, band pass filtered by a filter 146 and further amplified by an amplifier 148 to produce a "primary" signal. A compensating signal is detected, for example, by photodetector 150 (corresponding to detector 52 in FIGS. 3A–3C) and is subtracted (after amplification, by amplifier 152 and band-pass filtering by filter 154) from the "primary" signal in a difference amplifier 155 to remove residual low frequency components in the primary signal. Preferably, band pass filters 154 and 146 are identical. The resulting difference signal is amplified by a voltage controlled amplifier 156 whose gain is controlled by the output of a low pass filter 153 (which is attenuated by an attenuator 158 optionally adjusted during calibration of the system). The output of amplifier 156 is fed to a zero crossing detector and counter 160 and direction control logic 162, which determine the direction of translation of the surface. Where a piezoelectric element 64 (FIG. 3B) is used, a control signal corresponding to the frequency of displacement of the of the element is fed to the direction control logic 162 where it is subtracted from the zero-crossing detector count.

For preferred embodiments of the invention, the wavelength of the laser source is preferably in the infra-red, for example 1550 nanometers. A spectral width of 2 nanometers is typical and achievable with diode lasers. A source power of 5 mW is also typical. A grating opening of 1.5 mm by 1.5 mm and a grating period of 150 lines/mm are also typical. The laser source output is typically collimated to form a beam having a diameter of somewhat less than 1.5 mm and is typically incident on the grating at an angle of 30 degrees from the normal. The optical substrate may have any convenient thickness. However a thickness of several mm is typical and the focal length of the lenses used is designed to provide focusing as described above. Typically, the focal length of the lenses are a few mm. Typically, pinhole 46 (FIGS. 3A–3C) has a diameter of several micrometers, typically 10 micrometers. It should be understood that the above typical dimensions and other characteristics are provided for reference only and that a relatively wide variation in each of these dimensions and characteristics is possible, depending on the wavelength used and on other parameters of the application of the optical chip.

In some preferred embodiments of the invention the pinhole is omitted and is replaced by an "effective pinhole." This effective pinhole is achieved by focusing a local oscillator field, as for example light reflected or diffracted from a grating, on the detector. In this way, amplification of the field reflected from the surface is achieved only at the focus of the local oscillator field. Thus for example, pinhole 46 in FIGS. 3A, B and C may be removed and the local oscillator field focused on the detector surface.

The intensity profile of the focused local oscillator field determines the amplification of signal fields at the same location on the detector. Thus, where the intensity is high the amplification is significant, whereas low local oscillator intensity results in low amplification. The focused spot on the detector surface thus functions in the same manner as a real pinhole in a 'standard' spatial filter. The quality of the local oscillator beam spatial profile—how close it is to being diffraction limited—determines the quality of the resulting spatial filtering. A diffraction limited local oscillator field focused on the detector utilizes the maximum amount of power for amplification of the signal, and is not sensitive to angular misalignments like a real pinhole. Elimination of the physical pinhole in this manner results in a more robust arrangement having lower sensitivity to mechanical vibrations, broad tolerances on angular alignment and higher overall amplification. The signal light that is not amplified is not rejected, as with a pinhole, but, with a local oscillator field much stronger than the signal field, its effect on the measurement is negligible. The same arrangement is also relatively insensitive to focusing errors.

Utilizing an effective pinhole arrangement in Doppler measurements with a grating, in which the direction of the local oscillator field is dependent on wavelength, has the advantage of not being sensitive to wavelength variations of the source. A change in wavelength causes a corresponding change in the reflection angle from the grating, so that the local oscillator image on the detector moves. If a real pin-hole is used, this affects the measured amplitude of the signal and may even result in a total loss of signal. With an effective pinhole the measured signal is not affected as long as the focal point is on the detector. Moreover, the detector signal is wavelength independent in a grating-reflector configuration and is a function of the translation, grating period and order of local oscillator reflection, as described above with respect to the grating based systems.

Figure 10:
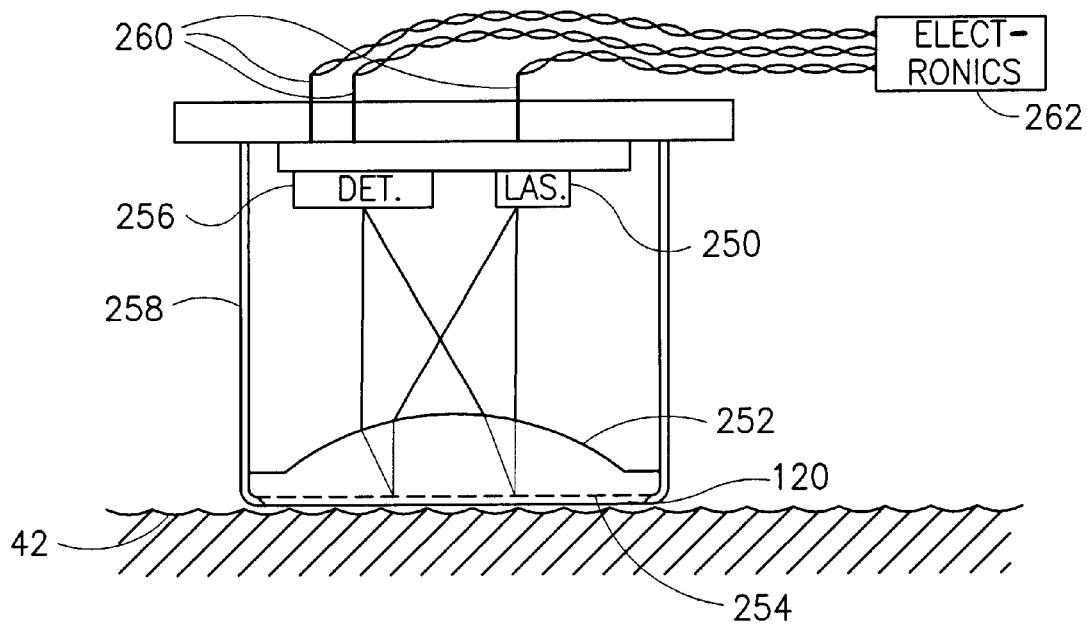
FIG. 10 is a simplified diagram of a translation measurement device according to an alternative preferred embodiment of the invention.

A preferred embodiment of an arrangement where the focusing is directly onto the detector is shown in FIG. 10. FIG. 10 shows (for simplicity of explanation) a one dimensional sensor without direction detection packaged in a standard electronics package (TO5 or the like). The sensor includes an at least partly coherent radiation source such as a laser diode 250, a lens 252, grating 254, a detector (for example, a PIN diode) 256, a housing 258, exit leads 260 and electronics 262. Laser diode 250 and detector 256 are preferably optically on the same plane, which is also preferably the focal plane of lens 252. The zero order reflection of the laser from grating 254 is focused onto the surface of detector 256 and serves as a local oscillator. If the distance of laser diode 250 and detector 256 from the lens are different, the arrangement is such that the laser image is focused by the lens onto the detector surface, as described above in detail with respect to the embodiment which utilizes a non-collimated source and a matching spatial filter. While no direction detection is shown in FIG. 10 and in some of the succeeding embodiments, direction detection as described above (or below) may be adapted to these embodiments.

Figure 11A:
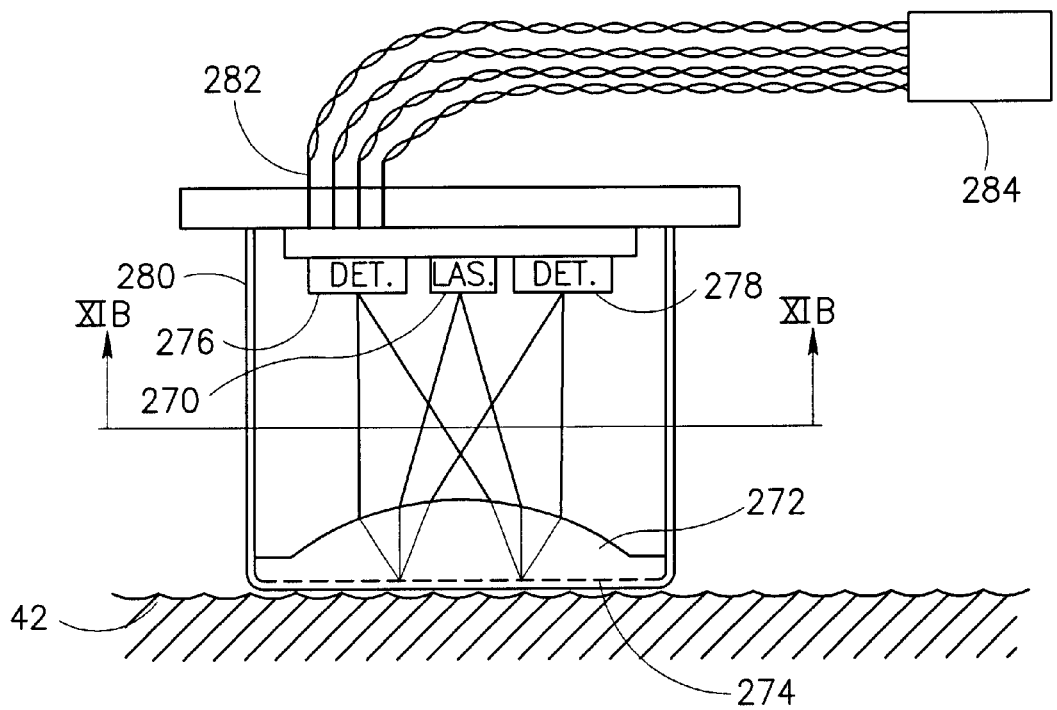
FIGS. 11A and 11B illustrate yet another preferred embodiment of the invention.
Figure 11B:
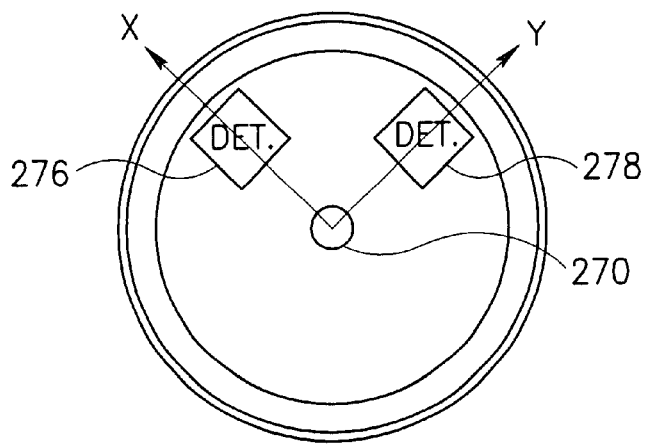

The operation is similar for sensors using first (or higher) order diffraction as the local oscillator field. The arrangement is slightly different. One such arrangement, in accordance with a preferred embodiment of the invention, is shown in FIGS. 11A and 11B. The sensor shown is a two dimensional sensor without direction detection, and includes a source of radiation such as a laser diode 270, a lens 272, a two dimensional grating 274, a pair of detectors 276 and 278, a housing 280, exit leads 282 and electronics 284. As in the embodiment of FIG. 10 laser diode 270 and detectors 276 and 278 are preferably in the same optical plane. FIG. 11B shows a planar view of the plane of detectors 276 and 278 and source 270 as seen at section XIB—XIB. Detector 276 functions as an X axis detector and detector 278 as a Y axis detector. The first order diffraction from grating 274 in the X direction is focused onto X detector 276 while the first order diffraction in the Y direction is focused onto Y detector 278.

Preferred embodiments of the invention that utilize an effective pinhole are easier to align and, when manufactured as an integrated optical block, have looser tolerance requirements. This is especially true when the local oscillator is derived from light diffracted from a grating at non-zero order since for this case the placement of the pinhole depends on wavelength. Thus, the wavelength stability of the source of illumination is much relaxed when a effective, rather than a physical pinhole is utilized.

In some preferred embodiments of the invention alternative methods of determining the direction of motion are utilized. In preferred embodiments of the invention, which provide these alternative methods, mechanical motion of an optical part is utilized to determine the direction of motion. In some preferred embodiments of the invention two detectors are provided and motion in one direction causes illumination of one of the detectors by light reflected or refracted from the grating. Two preferred embodiments of the invention, which provide direction detection utilizing this principle, are shown in FIGS. 12A–12B and 13A–13B.

Figure 12A:
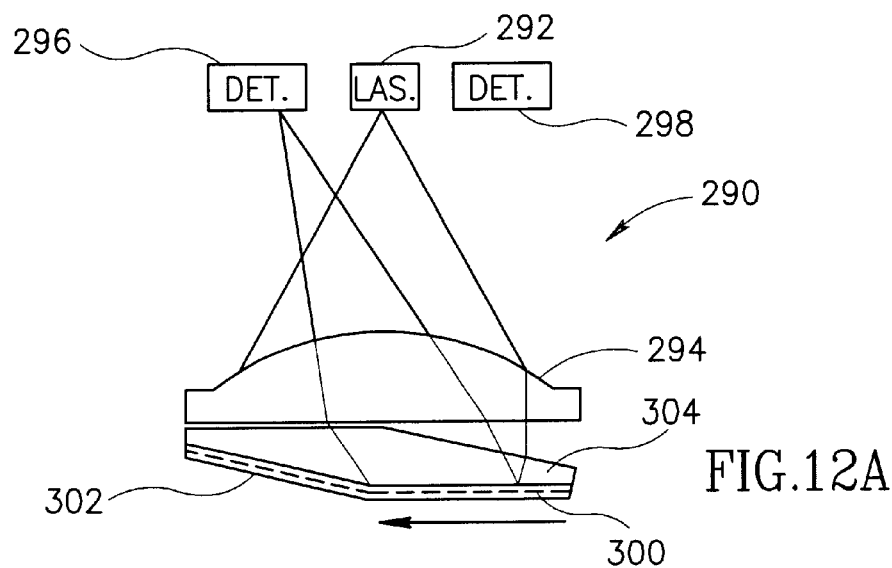
FIGS. 12A and 12B illustrate the principle of a first preferred embodiment of the invention utilizing a mechanical switching system to determine the direction of motion of a translation measurement device, in accordance with a preferred embodiment of the invention.
Figure 12B:
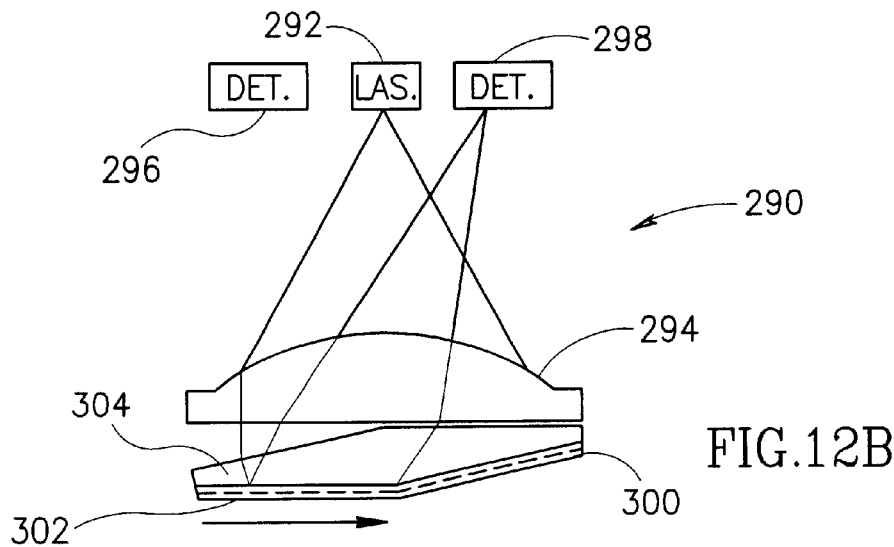

FIGS. 12A and 12B illustrate the principle of one of the embodiments. These Figs. show a sensor 290 that includes a source of at least partly coherent radiation such as a laser diode 292, a lens 294, a detector 296, a second detector 298 and a pair of gratings 300 and 302. Gratings 300 and 302 are mounted on the surface of a bi-stable wedged element 304. Motion of the sensor in one direction causes element 304 to take the position shown in FIG. 12A, such that radiation is reflected or refracted from grating 300 to detector 296. Friction of element 304 with the surface whose motion is being measured, when the sensor is moved in the other direction, turns element 304 to the position shown in FIG. 12B. In this configuration, radiation is reflected or refracted from grating 302 to detector 298. The direction of motion is thus determined from which of the detectors produces a signal.

An extension of this embodiment to two dimensional operation is provided by replacing element 304 by a 4-faced pyramid operating in a similar manner, with corresponding 4 detectors, where the gratings are two dimensional.

Figure 13A:
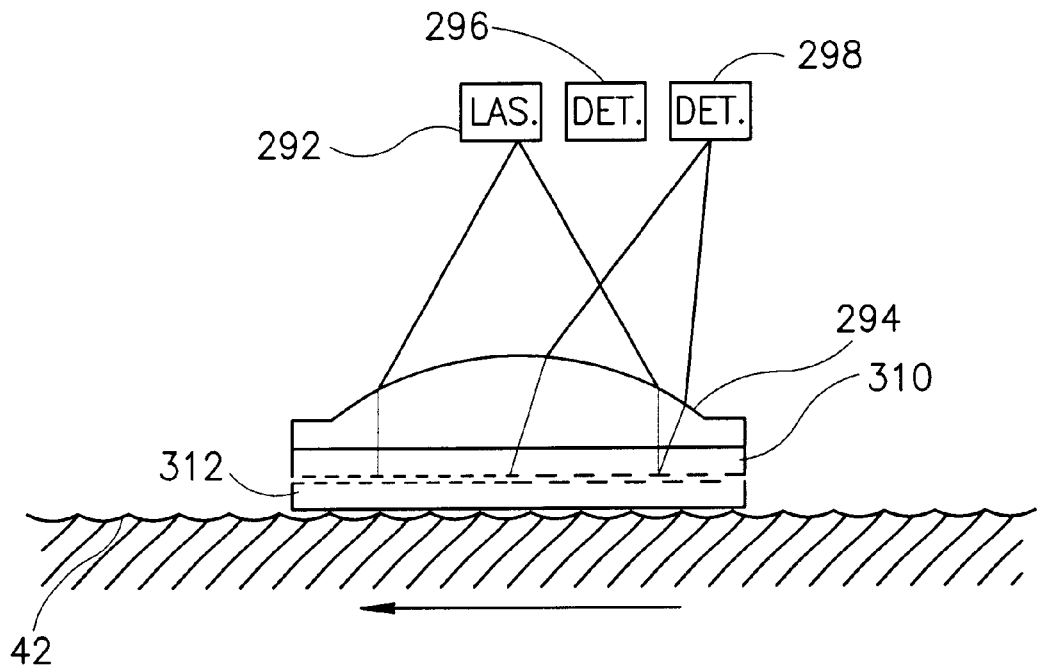
FIGS. 13A–13D illustrate the principles of two additional preferred embodiments of the invention utilizing a mechanical switching system to determine the direction of motion of a translation measurement device.
Figure 13B:
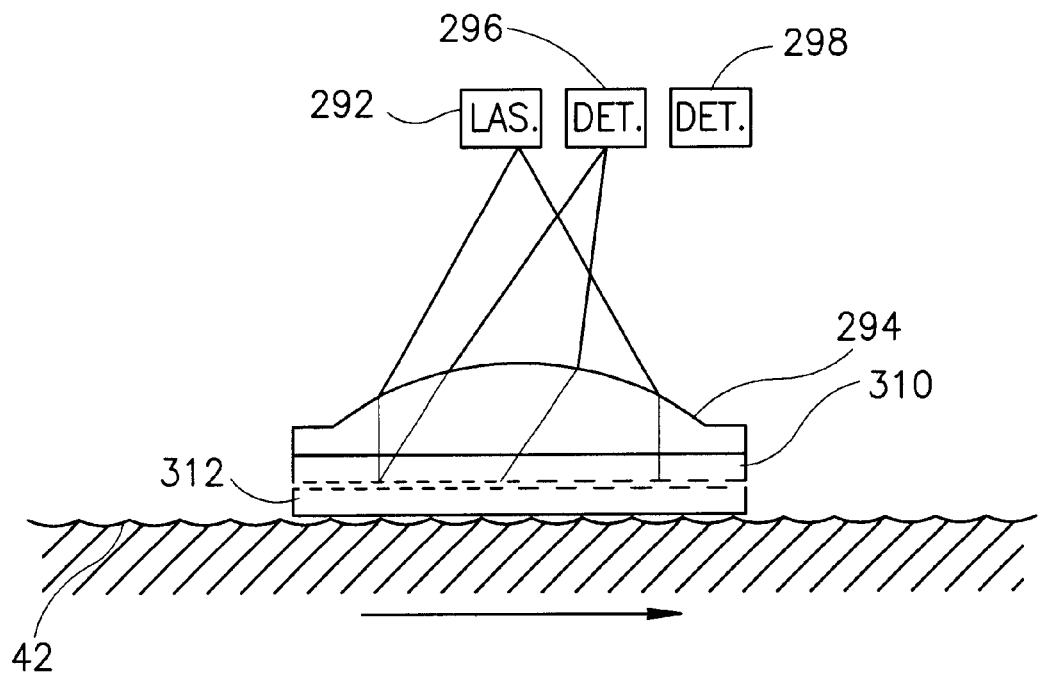

FIGS. 13A and 13B show a second embodiment of a mechanical direction detection method, using two adjacent gratings. As in FIGS. 12A and 12B the embodiment comprises a source of at least partly coherent radiation such as laser diode 292, lens 294, detectors 296 and 298. The embodiment also includes two gratings 310 and 312. Each of gratings 310 and 312 has two parts with different periodicity, for example 150 lp/mm on their left halves and 170 lp/mm on their right halves. The bottom grating is shifted by the friction with surface 42, and moves to a pre-defined stop in the direction of motion. The two halves of the gratings are arranged such that the motion will cause one grating half to be blocked (i.e., the reflecting portion of one of the gratings covers the openings in the other), while the grating on the other half will become visible (i.e., the metal portions coincide), although not generally with a 50% duty cycle. Motion in the opposite direction exchanges the role of the two grating halves, thus enabling a difference in reflection angles between the two directions and illumination of different detectors. The two configurations are depicted in FIGS. 13A and 13B, respectively. The direction of motion is determined from which of the detectors produces a signal.

Figure 13C:
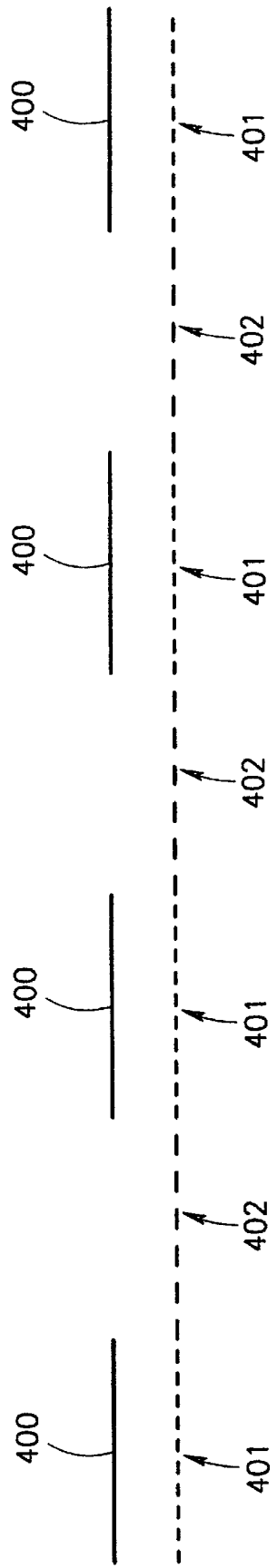
Figure 13D:
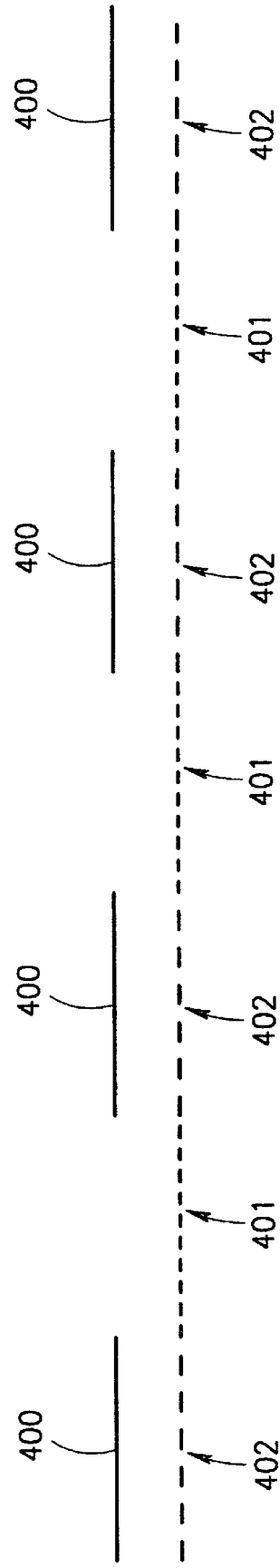

FIGS. 13C and 13D show another system for switching from one grating to another. In these figures only the gratings themselves are shown. An upper portion comprised of reflecting elements 400 does not move with respect to the detector. A lower portion comprises alternating sections 401 and 402 that are gratings having different periods. In the position shown in FIG. 13C elements 400 block grating sections 401 such that light incident on the gratings is directed at one angle, determined by the period of grating sections 402, which is visible to the incident radiation and which partially transmits it. In a second position, to which the lower portion is moved by friction with the surface whose velocity is being measured, elements 400 block grating sections 402 and expose sections 401 such that incident light is directed at an angle dependent on the period of grating 401. This allows for switching of the detectors, which receive the light, as in FIGS. 13A and 13B.

The principle of this embodiment of the invention can be extended to two dimensions by replacing the gratings with two dimensional gratings divided into quarters based on the same principle shown in FIGS. 13A and 13B.

Figure 14:
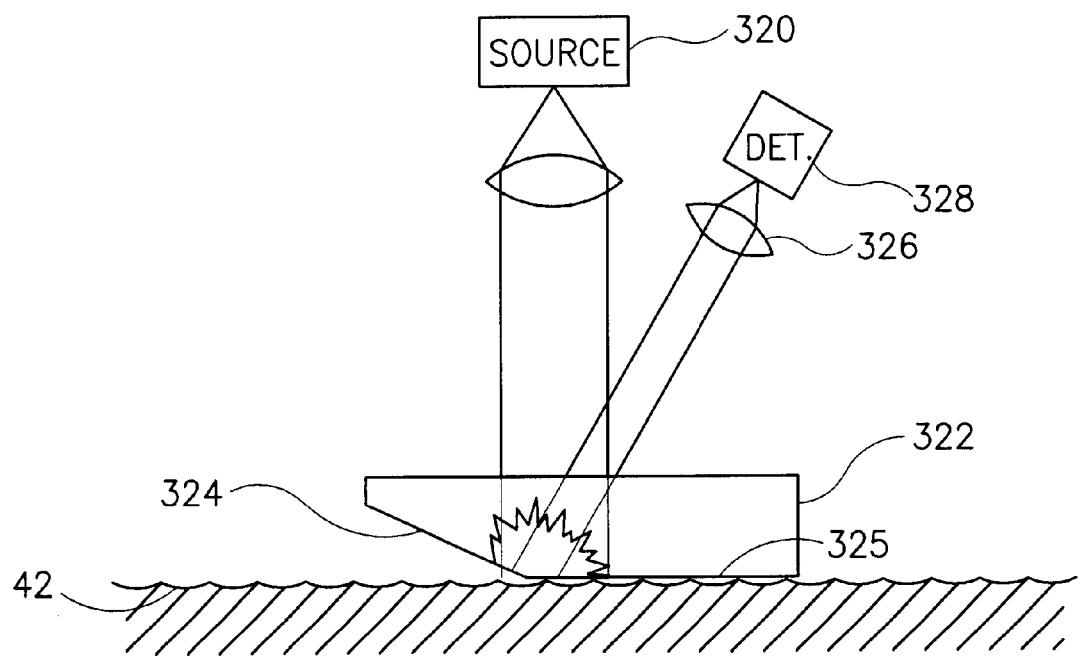
FIGS. 14–16 illustrates the principles of three translation measurement devices, in accordance with a preferred embodiment of the invention which do not utilize a grating.

FIG. 14 illustrates the principle of another embodiment of a Doppler based sensor system for measuring the velocity of a surface. Unlike the sensors described above, this sensor does not require the use of a grating. A collimated, at least partially coherent light source 320 illuminates an optical element 322 having a first plane 324 adjacent to and oriented at an angle to surface 42 and a second plane 325 parallel to surface 42. Light reflected from plane 324 (which is preferably reflection coated), is focused by a lens 326 on a detector 328 and serves as a local oscillator. Part of the light reflected by surface 42 is also focused on detector 328 and coherently interferes with the local oscillator field. The light reflected from surface 42 toward detector 328 is Doppler shifted by the translation of the surface. Thus, the detector signal includes an oscillating component indicative of the translation of surface 42. It should be noted that surface 325 plays no part in the detection process. Furthermore, it should be noted that all of the components may be mounted on optical element 322 to form an integrated sensor. Extension to 2-D measurement is achieved using two slanted planes and two detectors.

In accordance with some preferred embodiments of the invention the reflector from which the local oscillator field is reflected is not adjacent to the surface whose velocity is being measured. Two preferred embodiments of the invention, which embody similar principles, are shown in FIGS. 15 and 16.

Figure 15:
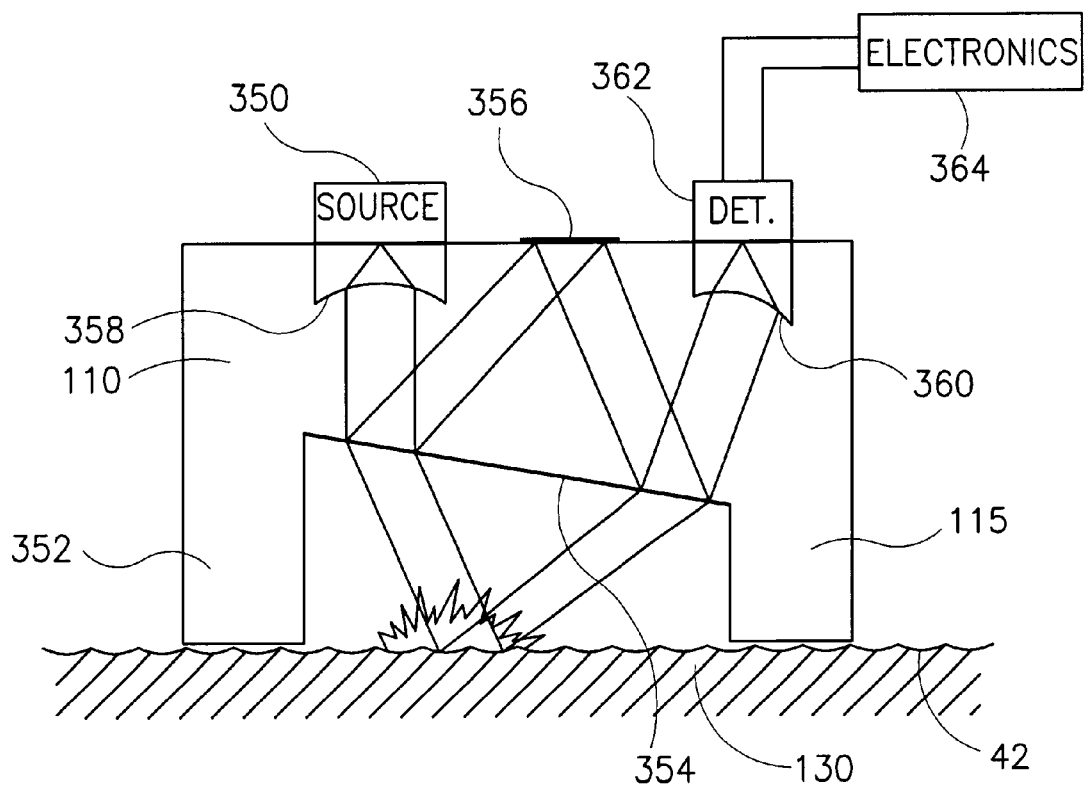
Figure 16:
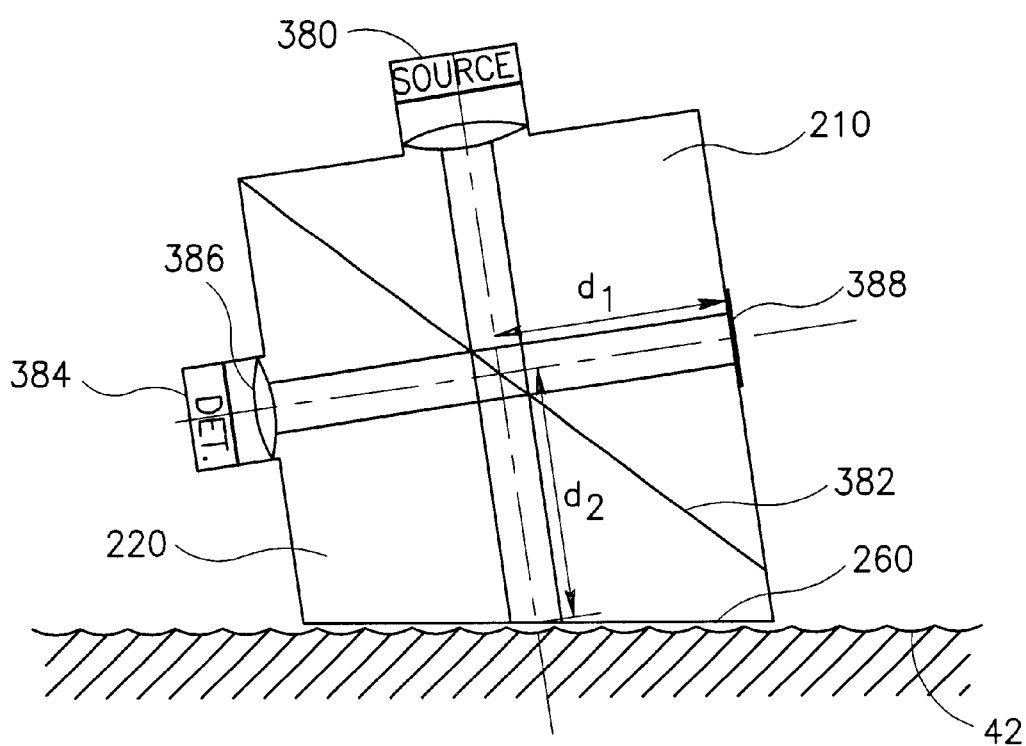

FIG. 15 shows a sensor including an at least partially coherent light source, such as a laser 350, an optical medium 352 having a partially reflecting and partially transmitting surface 354 and a totally reflecting surface 356. The sensor also preferably includes a lens 358 which collimates source 350 and a spatial filter embodied in this embodiment by a lens 360 which focuses the light on a detector 362 and signal processing electronics 364. The focused light acts as an effective pinhole, as described above. The light source provides at least partially coherent radiation, which is directed toward surface 42.

The light from the source is split by surface 354 into one beam reflected from surface 352 toward surface 356 and one beam transmitted toward the surface 42. The light that is reflected from surface 42 is transmitted through surface 354, toward the detector 362. The light that is reflected from surface 354 is totally reflected from surface 356, such that a third reflection of it from surface 354 is also directed toward detector 362. The optical path length difference for light propagating in the medium by multiple reflections (local oscillator) and light reflected from surface 42 towards the detector should be within the coherence length of the source. Translation of the surface results in an oscillating detector signal indicative of the amount of translation as in the previously described embodiments. In alternative preferred embodiments of the invention, Surface 354 may be a grating wherein the local oscillator is derived from light diffracted from it at one of its diffraction orders. For this situation, surface 354 need not be at an angle to surface 42.

Although surface 356 is preferably totally reflecting, it may be partially transmitting or partially absorbing. This reduces the local oscillator signal. If surface 356 is partially transmitting, the light passing through it may be used to measure the intensity of the light source using another detector, and subsequently compensate for amplitude modulation of the source intensity in order to improve the performance at the low end of the velocity range as described above in conjunction with FIGS. 3A and 3B.

According to a preferred embodiment of the invention, the region between surface 354 and surface 42 is filled with a second optical medium to improve the flatness of surface 42 (if it is non-rigid, e.g.—a paper) and to prevent dirt accumulation.

According to another preferred embodiment of the invention shown in FIG. 16, a sensor is fabricated utilizing a modified cubic-shaped beam-splitter. A preferably collimated, at least partially coherent light source, such as a laser 380 is directed toward a partially reflecting, partially transmitting surface 382. Light transmitted through surface 382 is directed toward surface 42 and from surface 42 is (partially) reflected from surface 382 to a detector 384 (via focusing optics 386 ). Light reflected by surface 382 is directed toward a reflector 388 and from there (through surface 382 ) to detector 384. Thus, the beam splitter acts as an interferometer such that a translation of the surface 42 relative to the device and parallel to the surface introduces a Doppler shift between the reflection from reflector 388 (serving as a local oscillator) and reflection from surface 42.

Thus, light that is reflected from surface 42 and light that is reflected from reflector 388 interfere on detector 384. The optical medium is scaled such that the optical path length difference of these two light waves is within the coherence length of source 380.

The arrangement is such that the partially reflecting interface, the totally reflecting interface and the surface are not all parallel to each other. Thus, the detector signal includes an oscillating component due to a Doppler phase shift of the light reflected from the surface, that is representative of the surface translation relative to the optical device and parallel to the surface.

Preferably, the light from source 380 is collimated. Preferably, the light reaching detector 384 is focused onto the detector surface such that a point-image of source 380 is formed thereon.

Two dimensional translation measurement may be achieved by using orthogonally tilted, partially-reflecting, interfaces or orthogonally tilted, totally-reflecting, surfaces.

The Doppler shift of the light that is reflected from surface 42 is proportional to the component of relative velocity between the sensor and surface 42 along the bisector between the light beam incident on the surface and the portion of light reflected from it that is collected by the detector. The Doppler shift is inversely proportional to the light wavelength. Preferably, the optical medium is selected such that the refractive index dispersion induces a change in the bisector angle with respect to the surface plane that compensates for the effect of the change in wavelength on the Doppler shift. Thus, the measurement error due to the finite spectral width of the source and its wavelength drifts is substantially reduced.

The method shown in FIGS. 15 and 16 and its embodiments provides for relatively cheap, robust, alignment-free and accurate apparatus for translation measurement of rough surfaces moving parallel to the surface. The method is applicable to a wide range of applications utilizing translation measurement, as described with respect to the other embodiments of the invention.

Figure 17:
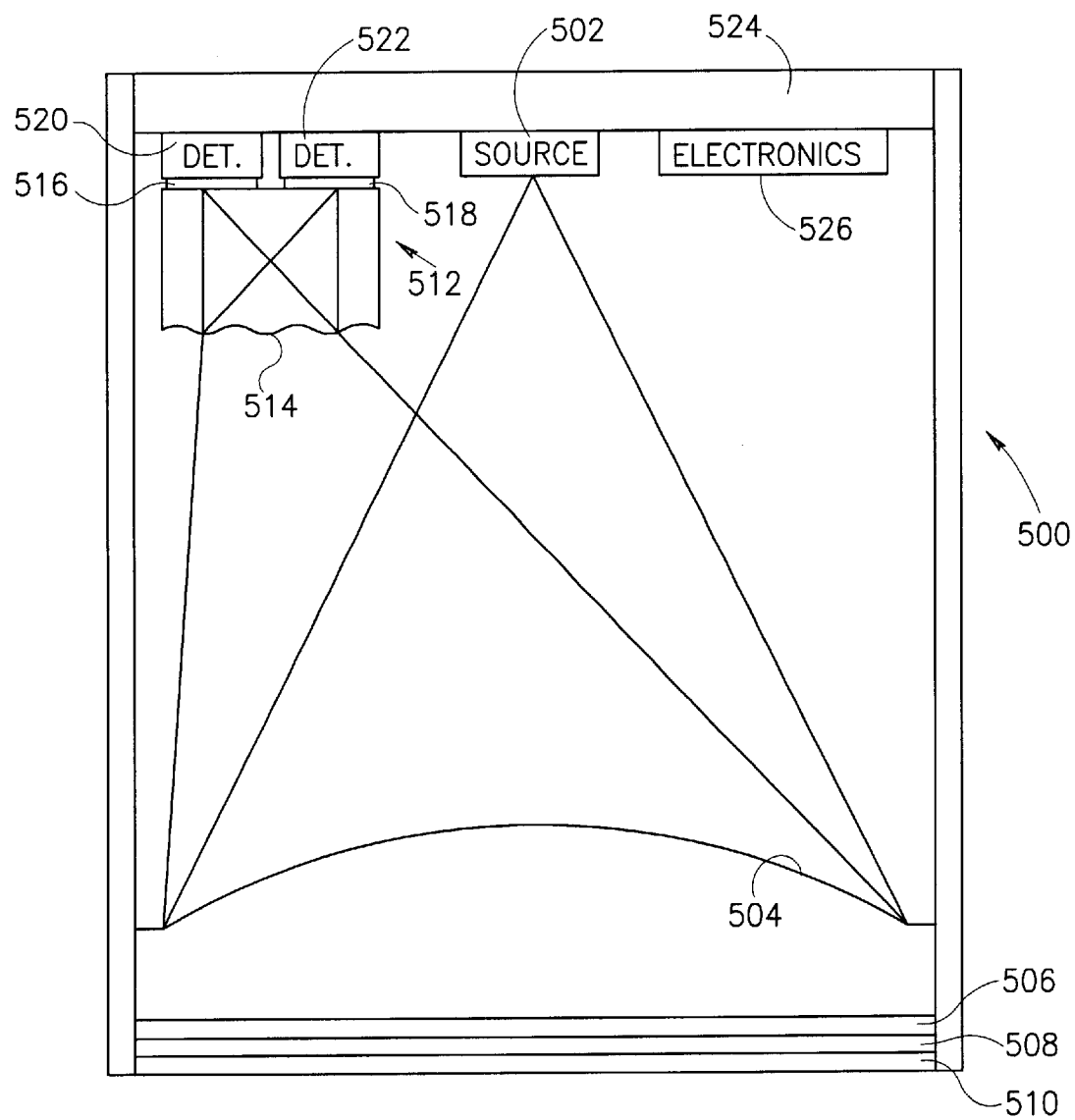
FIGS. 17 and 18 illustrate the principles of two additional motion detectors, according to preferred embodiments of the invention, that measure surface motion based on a Doppler shift.

FIG. 17 shows another preferred embodiment of the invention. The embodiment of FIG. 17 provides for enforcement of a specific polarization on the reflection from the surface. FIG. 3C illustrates a method for determining the direction by providing a different polarization for the light reflected from surface 42 and the local oscillator. A phase shift is provided by placing a birefringent plate in the path of the radiation to and from the surface. However, this method is based on the assumption that when the light is reflected from the surface, its polarization is preserved. Often this is not the case, and the quadrature signal that is supposed to be generated by the detectors deteriorates and can even switch sign for the same motion direction.

An additional linear polarizer between the birefringent material ("quarter waveplate") and the surface enables the measurement to be insensitive to the surface characteristics. The polarizer enforces its linear polarization direction on the reflection from the surface, irrespective of the surface characteristics. By placing the polarizer axis at 45 degrees to the birefringent material axes, the reflection is subsequently circularly polarized by the birefringent layer when passing through it towards the detectors. Thus, precise quadrature signal is ensured for the 2 cross-polarized detectors even when the surface itself is not polarization preserving.

Another property of this arrangement is the ability to place the birefringent layer "on-top" of the grating (instead of between the grating and the surface). The local oscillator light experiences double phase shift (for quarter waveplate, it sees a half wave retardation) while the surface reflection is shifted only once and thus enables quadrature measurement.

FIG. 17 shows a first preferred embodiment of a motion detector 500 that inter alia, includes this feature. Motion detector 500 comprises a source of partially coherent light 502 that illuminates a preferably collimating lens 504. Light that exits below lens 504 is preferably collimated (i.e., the light rays are all parallel). A quarter wave birefringent plate 506 and a grating 508 underlay the plate. The light reflected/diffracted from the grating experiences a 180-degree phase shift between its orthogonal components due to its passing twice through the birefringent plate. While plate 506 and grating 508 are shown as separate elements, they may be combined into a single element, for example by depositing or embossing the grating on the surface of the birefringent plate.

A linear polarizer 510 preferably underlies the grating. Light that is reflected from a surface (not shown) underlying the polarizer that passes through the birefringent plate a second time will be circularly polarized. However, since the light passes through polarizer 510 a second time before reaching plate 506, the polarization is enforced and "contamination" of the measurement is avoided.

Light diffracted from the grating at an angle determined by the grating line spacing and order of diffraction and light diffusely reflected from the surface are incident on a detection module 512. Detection module 512 includes a phase grating 514 that splits the incident radiation into two preferably equal parts and sends them via a pair of polarizers 516 and 518 to a pair of detectors 520 and 522, respectively. Polarizers 516 and 518 are aligned at 90 degrees with respect to each other and are aligned to provide preferably equal strengths of grating diffracted radiation at each of the detectors. Detection module 512 performs the same function as elements of FIG. 3C. That is, detection module 512 splits the circularly polarized wave (based on the surface reflection) into linear components and each of them separately interferes with a portion of the wave diffracted by grating 508. The diffracted wave, having a linear polarization at 45 degrees to the direction of polarization of each of the polarizers, is also split by the grating and detected, preferably equally, by the detectors. The magnitude of the motion is conveniently determined from the number of zero crossings of the signals detected by the detectors (based on a Doppler shift), and the direction of the motion is determined based on the relative phases of these signals.

Detection module 512 utilizes a phase grating and two polarizers to split and direct the incoming waves to the detectors, rather than the polarizing beam splitter of FIG. 3C. In practice, the embodiment of module 512 is believed to be less expensive to produce. If a binary phase grating (or a blazed grating) is used, then the system is not only inexpensive but also light efficient.

In a preferred embodiment of the invention, module 512 is mounted on a backplate or heatsunk substrate 524, together with source 502 and an electronics module 526. Electronics module 526 may contain a controller to control source 502 and electronics that receives signals from detectors 520 and 522. Preferably, electronics module 526 partially or fully processes the signals, as described above, to provide information to a computer or other device (not shown) regarding the magnitude and direction of the motion of the surface.

Figure 18:
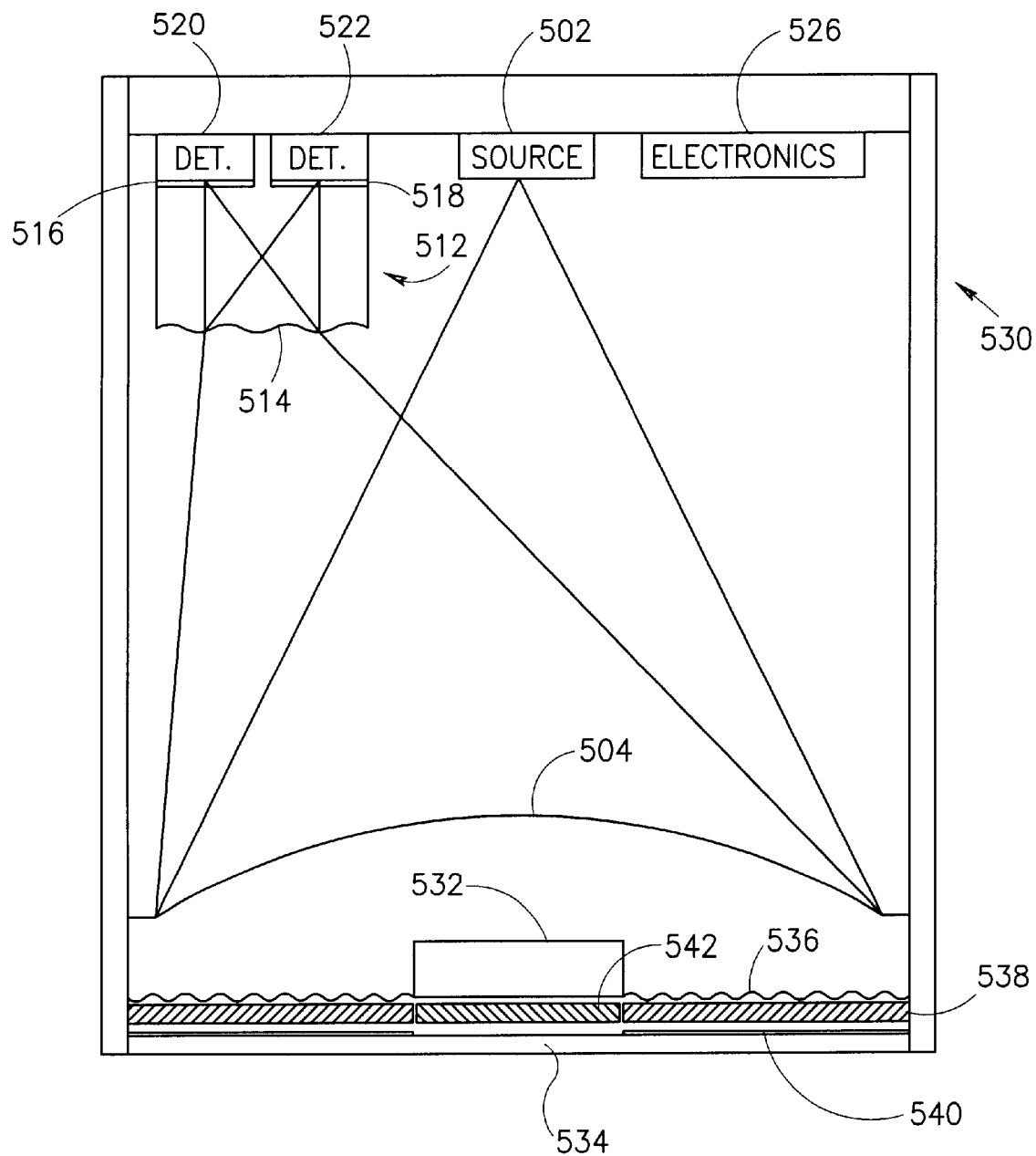

FIG. 18 shows another motion detector 530 generally similar in structure to that of FIG. 17. However, the detector includes a number of features that should be noted. For ease of description, those parts of detector 530 that are similar to those of detector 500 of FIG. 17 are marked with the same reference numbers and are not further described.

In FIG. 18, the local oscillator is spatially separated from the surface illumination and diffraction path. Furthermore, in FIG. 18, a cut-out 532 is preferably provided to equalize the lengths of wave paths for the waves diffracted from the grating and reflected from the surface whose relative motion is to be measured. As will be recalled, coherence between these waves is preferred if not required at the detectors. Since the path of the wave reflected from the surface is longer than that from the grating, this places a strong coherence requirement on source 502. In a preferred embodiment of the invention, cutout 532 provides for a reduction in optical path length for the wave reflected from the surface, so as to match the path lengths.

The optical arrangement of separated local oscillator such as that presented in FIG. 18 is also intrinsically suitable for having only one transmitted beam and no diffraction of the reflected surface illumination, desirable in the Doppler mode of operation. However, the separation of the beam into one part serving as the local oscillator and another part serving to illuminate the surface is more sensitive to the beam quality and is less robust then schemes that uses most or all the illumination for both the local oscillator and the surface illumination.

While this cut-out may be useful for other preferred embodiments of the invention, for example for the embodiment shown in FIG. 17, it is especially useful when a protective, preferably scratch resistant layer or substrate 534 is provided adjacent to the surface. This substrate increases the optical path length of the wave reflected from the surface, without changing the optical path length of the wave diffracted from the grating. The provision of a protective layer is also applicable to many of the above-described embodiments. Furthermore, substrate 534 or other parts of the optical path may be colored (i.e., spectrally filtering) to reduce the effects of stray light while passing the laser light.

In the embodiment shown in FIG. 18, the structure for generating the reflected and diffracted waves is different from that shown in FIG. 17. In FIG. 18, a phase grating 536 overlays a ⅛ wave birefringent plate 538, which is in turn is underlain by a reflector 540. Preferably, the reflector is applied directly on plate 538. Since waves that are reflected from reflector 540 pass through the ⅛ wave plate twice, the reflected wave is circularly polarized. The reflection from the surface preferably passes through a linear polarizer 542 in both directions as it is reflected from the surface. Thus, this wave has an enforced linear polarization. The operation of the rest of the system is the same as that described for FIG. 17.

In alternative preferred embodiments of the invention, a quarter wave birefringent layer can be placed in the path of the beam emitted by source 502, converting it to circular polarization. Thus, this layer may be much smaller (and less expensive) than the comparable layer shown in FIGS. 17 and 18, which layers are then omitted. Furthermore, for those embodiments of the invention in which a birefringent plate is used, a plate resulting in elliptical polarization (rather than the circular polarization described above) may be used.

In some preferred embodiments of the invention, a quarter wave layer (from birefringent material such as quartz) may be deposited on the emitting surface of an otherwise linearly polarized laser diode to produce a circularly polarized beam. Preferably, the deposition is part of the process by which the diode is manufactured, e.g., the birefringent layer is deposited on top of an outer Distributed Bragg Reflector of a Vertical Cavity Surface Emitting Laser. This scheme uses a much smaller amount of birefringent material, since the coated area is just the area of the emitter. Moreover, a small birefringent layer can be more accurately manufactured than a large one. An additional linear polarizer, deposited under the birefringent layer forms an optical isolator combination, attenuating stray light reflection back into the laser cavity.

Similarly, in some preferred embodiments of the invention, linear polarizers are incorporated into the surface of the detectors, rather than providing separate polarizers, when these are indicated as being required in some of the above referenced embodiments of the invention. Use of such polarized detectors reduces the complexity of the assembly of the motion detectors. Applying a polymer-based polarizer on top of the detector can be used to produce such detectors. Alternatively, the polarizer may be manufactured by fine line grooving (with line widths on the order of a wavelength) of a dielectric layer deposited on the detector face.

FIGS. 19A and 19B show two integrated versions of motion detectors based on direction detection principles similar to those of FIGS. 3C, 17 and 18.

FIG. 19A shows a motion detector 550 built on a block 552 comprising a beam splitter 554 and two lenses 556 and 558. A laser diode source 560 is mounted adjacent to lens 556, which collimates the light emitted by the source. A collimated beam 561 impinges on beam splitter 554, which splits the beam into a first part 562, which continues to surface 12 and a second part 564, which is reflected to a ⅛ wave plate 566 and a mirror 568. Beam 564, after passing twice through the plate is circularly polarized, as it travels back toward beam splitter 554.

Beam 562 passes through a linear polarizer 570 and preferably through a protective layer 572 before being reflected back toward beam splitter 554. The portion of reflected beam 564 passing through the beam splitter and the portion of reflected beam 562 reflected from the beam splitter are directed together toward lens 558, which focuses them. A second beam splitter 574, splits both beams and directs them to polarized detectors 576 and 578 (each having a polarizer 580 and a detector 582 ). The detectors are used to detect the frequency and relative phase of the linear components of the beam reflected from surface 12, in essentially the same manner as described above with respect to FIGS. 3C, 17 and 18.

It should be noted that the top of motion detector 550 is not square with the bottom so that the reflected beam is Doppler shifted from the beam incident on surface 12. This Doppler shift (and its sign) is used to detect the motion. Furthermore, in preferred embodiments of the invention, the lenses are anti-reflection coated to avoid the effects of multiple reflections.

A second integrated motion detector 590, shown in FIG. 19B, also embodies similar principles. All of the optical components of the system are mounted on a block 592 in which a grating 594 is sandwiched. Preferably, the grating and top and bottom surfaces are parallel. Two lenses 596 and 598 having functions similar to those of lenses 556 and 558 of FIG. 19A are preferably incorporated into block 592. In FIG. 19B, elements having similar functions to those of corresponding elements of FIG. 19A are similarly numbered. A reference beam is reflected from grating 594 toward a back-mirrored ⅛ wave plate ( 566, 568 ) and thence, via a second reflection, toward lens 598. The beam passing through the grating preferably passes through a linear polarizer and optional protective layer and is reflected toward lens 598. The detection system operates in a manner similar to that described above.

FIGS. 19C and 19D shows details of a detector module 610 for a system in which a birefringent plate is used to affect one or both of the grating or surface reflected beams. Examples of such systems are the motion detectors described in FIGS. 17, 18 and 19A. In these motion detectors, when the source is linearly polarized, the birefringent plate may be moved close to the detectors. In this case, the birefringent plate would be smaller than when it is placed elsewhere and can, in some preferred embodiments of the invention, be integrated with the detectors as described above for polarizers.

For these embodiments, a polarizer is placed (for example, near the surface to be measured) such that only light passing to and from the surface passes through it. The polarization axis of the polarizer is placed at a 45 degree angle to the polarization of the light from the source such that the light from the surface has a polarization that is at a 45 degree angle from that of the local oscillator light.

In this situation, a detector module 610 as shown in FIGS. 19C and 19D may be advantageously employed in place of module 512 of FIGS. 17 and 18 and, in modified form, utilizing the same detection principle, for module 576 of FIG. 19A. Elements, in FIGS. 19C and 19D, having the same function as corresponding elements in FIGS. 17 and 18 are given the same reference numbers as the elements in FIGS. 17 and 18.

Module 610 is similar to module 512, except that a quarter wave plate 612 is placed in front of polarizers 516 and 518. The orientation of the polarization of the quarter wave plates, the polarizer and the incident light is shown in FIG. 19D which is a sectional view from below along lines D—D in FIG. 19C. The axes of the polarizers are indicated by reference numerals 614, 616 and the polarization axes of the quarter wave plate is indicated by reference number 618. Linearly polarized light that is incident on quarter wave plate 612 along one of its axes passes through the plate with its polarization unchanged. Linearly polarized light having its polarization at 45 degrees to axes 618 is transformed into circularly polarized light.

Reference numbers 620, 626 indicate the polarizations of the incident grating and surface reflected waves, where, it is immaterial which of the two waves is polarized in the direction 620 and which is polarized in the direction 626. Furthermore, one of the waves may be polarized in a direction 626', instead of 626.

In operation, the incident wave having the polarization 620 is transformed into a circularly polarized wave. This circularly polarized wave is split into two equal components by polarizers 516 and 518 such that two linearly polarized waves of equal amplitude are incident on detectors 520 and 522. However, these two waves are 90 degrees out of time phase (as well as having orthogonal polarizations). The wave having polarization 626 or 626' passes through the quarter wave plate with unchanged polarization. It too is split into two waves that have perpendicular polarization. However, these waves are in time phase. Each detector will thus detect the interference between the light waves, which gives rise to two signals that are 90 degrees out of temporal phase. This difference in phase can then be used to determine the direction as in standard quadrature detection.

If birefringent plate 612 is omitted, then either the surface reflection or the local oscillator field is selectively blocked by one of the detector polarizers, depending on the polarization directions of the local oscillator and the reflected surface illumination. If, for example, the polarization direction of the source is 620, then it will be blocked by the polarizer referred to by 616. Thus, only the reflected surface illumination will be detected by the detector, corresponding to the $E_r^2$ component. Alternatively, if the polarization of the reflected surface illumination is 620, then the detector associated with polarization direction 616 will detect only the local oscillator field, thereby enabling compensation of the $E_0^2$ component.

The output of a detector used for $E_0^2$ component compensation can be utilized as a reference voltage and subtracted from the output voltage of other detectors used for the translation measurement. This forms a kind of 'differential' detection mode. For example, such subtraction can be performed at the output of the transimpedance amplifier stage, thus eliminating most of the DC voltage from the detected signal. Alternatively, a scheme utilizing high-pass filtering to remove the DC voltage, such as described in FIG. 9 may be used. Preferably, the bandwidth of the compensation signal is limited according to the bandwidth of the source noise. Otherwise other, non-correlated noise (e.g., thermal noise), is actually unnecessarily added through the subtraction of the compensation signal.

$E_0^2$ component compensation is especially useful if the source is turned off and on repeatedly (e.g., when operating in 'sleep mode' to save energy or for eye-safety). A modulated source complicates the DC voltage elimination with a high-pass such as described in FIG. 9, but this is reduced or eliminated without a high-pass if $E_0^2$ component compensation is utilized. Alternatively, switching the source may be performed even without $E_0^2$ compensation if capacitors in the high-pass are isolated when the source is turned off (thereby maintaining their charge until the source is turned on again).

Still another use for the $E_0^2$ component measurement is as feedback in a source current control loop. This is especially important in order to control the optical power of the source if significant power variability is expected (e.g., due to large operating temperature range).

The arrangement of FIG. 19C and FIG. 19D without birefringent plate 612 can be useful when a Vertical Cavity Surface Emitting Laser (VCSEL) is used as the light source. When operated properly, certain VCSEL diodes can have one of two possible orthogonal polarization directions, where at any given time the illumination polarization is aligned with one of the polarizations. Thus, an ambiguity exists as to the polarization direction. This poses a problem in the usage of the VCSEL where direction detection is important, since the two polarization directions result in opposite phase difference of cross-polarized detector pairs for a given direction of motion.

According to the configuration presented in FIG. 19D, and assuming the source polarization direction is along 620 or orthogonal to 620 (not shown). Then, if the birefringent plate 612 is removed, polarizer 614, for example, will either block or transmit the local oscillator illumination. Thus, detector 522 output will be either high or low, depending on the polarization direction of the source, and the detector output may be used to control the conversion between the relative phase of the signal and the direction of motion (e.g., as a flag designating the sign of the zero-crossing counting).

It is sufficient to use one such polarized detector (with high or low output, depending on the polarization direction) in addition to the detectors used to detect the motion. However, if two detectors are used (522 and 520) then in each polarization direction one of the detectors will have high output, while the other will measure the reflected surface illumination and may be used for $E_r^2$ component compensation.

In the above scheme, additional detectors are utilized to solve the polarization ambiguity of a VCSEL. Alternatively, the VCSEL can be slightly rotated with respect to its 'optimal' polarization direction. Assuming an 'optimal' direction a of the VCSEL polarization such that the preferred polarizations are α or α+π/2, then the ratio $R_p$ between the DC voltages of detector pairs is:

$$Rp = \begin{cases} \tan(\alpha): & \text{one polarization} \\ \cot(\alpha): & \text{other polarization} \end{cases}$$

Thus, for optimal VCSEL alignment of α=π/4 (along 626, for example), the DC component detected by the detectors in a cross-polarized pair such as described in FIG. 19D will be equal irrespective of the polarization direction of the VCSEL.

However, if α=π/4+β radians, then $R_p \approx 1+2\beta$ in one polarization and $R_p \approx 1-2\beta$ if the VCSEL output is in the other polarization. Thus, $R_p > 1$ when the VCSEL emits in one polarization and $R_p$ is less than one for the other polarization. Therefore, if the VCSEL is rotated with respect to the 'optimal' orientation, the outcome of a comparison between the DC voltage of detectors in a detector pair used for translation measurement indicates the polarization direction without a need for additional, dedicated detectors for that purpose.

Still another way to overcome a possible polarization ambiguity of the local oscillator is to use a linear polarizer in the optical path between the source and the grating, with the polarizer axis at 45 degrees from either of the orthogonal polarization directions. Thus, for example, the polarizer is positioned along 620 when the VCSEL polarization is either 626 or 626'. Alternatively, the polarizer is positioned along 626 if the VCSEL polarization is either along 614 or along 616. This forces the source polarization to be the same as that of the polarizer, at the expense of loss of about half of the optical power.

Low-frequency parasitic noise (such as $E_r^2$ and $E_O^2$ components and power line interference) superimposed on a higher frequency signal may affect the quadrature detection of the high-frequency signal for the following reasons:

Zero-crossing events of the high-frequency signal are missed.

The order in which the zero crossing events happen is switched, therefore the direction detection of the quadrature detector is switched.

Zero crossing events of the low frequency noise are counted and added to the measurement.

One of several approaches (or a combination of approaches) may be used to overcome possible low-frequency modulations by signal processing means (in addition or instead of the optical schemes described above), in accordance with various preferred embodiments of the invention:

Assume P and Q are the output signals of a detector pair such as detectors 520 and 522 in FIG. 19C. P and Q are ideally identical other than a temporal phase difference of +90 degrees or −90 degrees, depending on the direction of motion, and the addition of noise. Assume also that signals D=P−Q and S=P+Q are derived from signals P and Q. Then, signal D has the property of elimination of all noise sources that are common to both P and Q. Moreover, D and S have 90 degrees temporal phase difference. Therefore, D and S are equivalent to P and Q when there is no noise, but if common noise sources are significant, D zero crossings accurately measure the translation while zero crossings of S can be utilized to aid in determining the direction of motion. Furthermore, the elimination of common noise is not restricted to low frequencies.

The amplified signal may be divided to two (or more) frequency ranges. Selection of the appropriate channel may be based on the measured frequency.

Use an adaptive band-pass, controlled by the signal frequency and capable of adapting to the frequency changes resulting from possible acceleration of the surface relative to the OTM component. Adaptive band-pass also reduces other sources of noise, such as thermal noise and 1/F noise. It may be implemented, for example, by using voltage-controlled capacitors in the high-pass and low-pass elements.

Use higher amplification of the high-frequency signals, such that the resulting amplitude of the high frequency signal is higher than that of the low-frequency, and so the high-frequency zero crossings count is only mildly affected.

Figure 27:
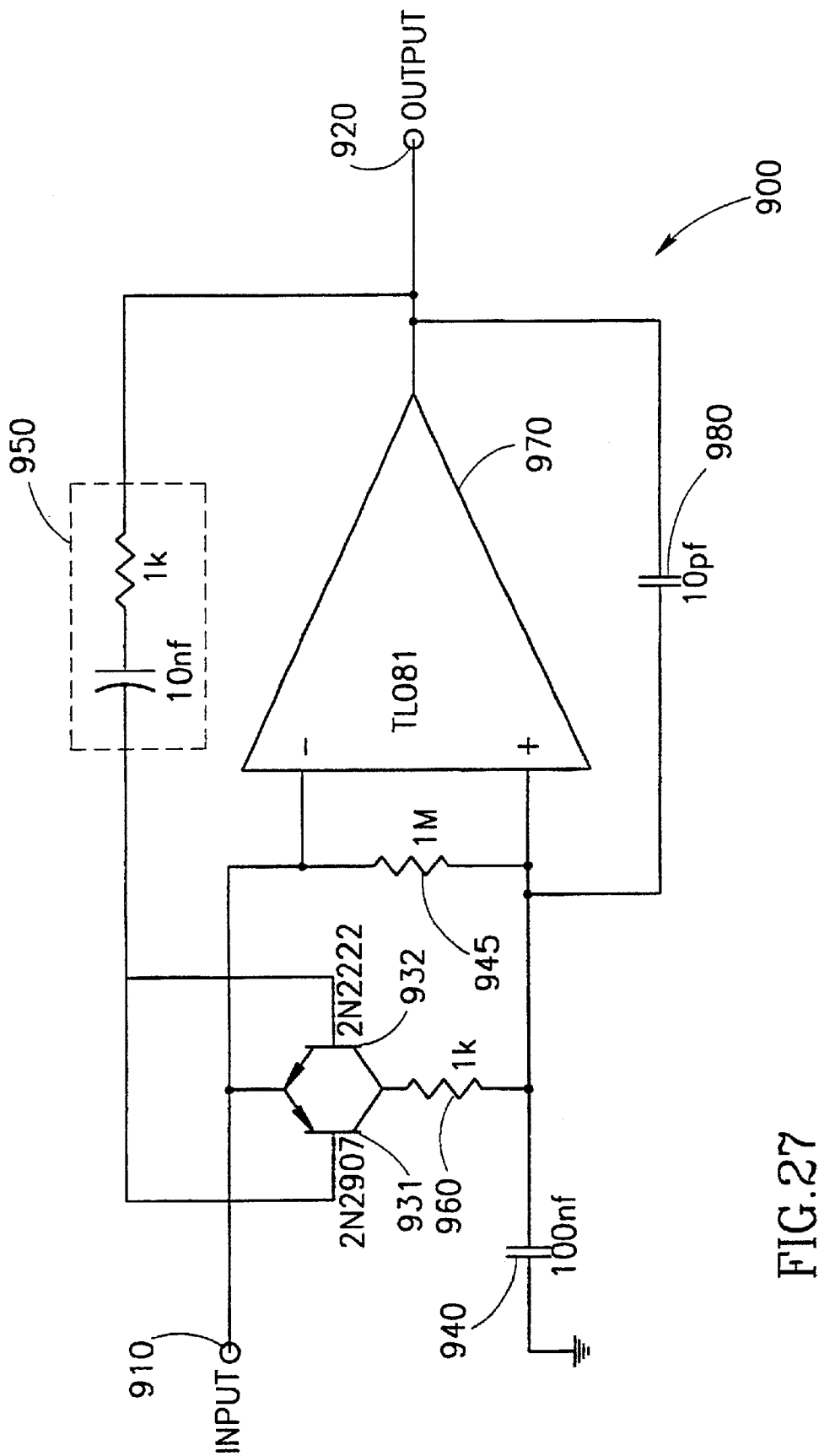
FIG. 27 is a schematic circuit drawing of a preferred embodiment of an adaptive band pass circuit useful for some aspects of the invention.

A preferred embodiment of an adaptive band pass circuit 899 for the rejection of low frequency noise in the presence of a high frequency signal is presented in FIG. 27. A zero-crossing detector 900 converts an analog signal at an input 910 to a logic signal at an output 920. When the signal is at low frequency (e.g., 50 Hz), transistors 931 and 932 are not conducting most of the time, and a capacitor 940 is charged through a resistor 945 with a long time constant (0.1 sec), appropriate for the detection of the low frequency signal. On the other hand, when the zero crossing rate is high (above a few hundred Hertz), a high pass circuit 950 drives current through the bases of transistors 931 and 932, so that capacitor 940 is charged through a resistor 960, with a time constant as low as 0.1 msec. Thus, the threshold at the positive input of an operational amplifier 970 follows the low-frequency noise and thereby rejects its detection, and the operational amplifier output is determined by the high frequency signal. A capacitor 980 is used to suppress spontaneous oscillations of operational amplifier 970. It should be noted that FIG. 27 presents one typical implementation of this aspect of the invention, and the adaptive zero crossing detector can be implemented in numerous ways and using other components (e.g., FET transistors, different resistance and capacitor values and a different operational amplifier).

Quadrature motion measurement relies on measuring two identical signals, having a constant phase shift between them. Motion magnitude is detected by the number of zero crossings in a given interval. Motion direction is determined by comparing the sign of the zero crossing on one channel (i.e., 'low to high' or 'high to low') to the sign of the signal in the other channel ('high' or 'low').

Noise on the quadrature signal can result in additional zero crossing counts. If two zero crossings of one signal occur while the other signal did not change sign, their directions are opposite and they add to zero. However, if a zero crossing on one signal is shifted in; time, the order in which the zero crossings in the two channels occur may be reversed and result in direction detection errors in both channels, that adds up to a net count error.

Errors due to reversed zero crossing events can be corrected, according to some preferred embodiments of the invention, using 'majority voting' over some interval. It is assumed that the motion direction is unchanged within each interval (or 'cell'). This means that the resolution is compromised for enhanced accuracy. Conveniently, the zero-crossing counting process is performed in contingent cells. Each cell starts at the end of the previous cell and ends when a predefined number of zero-crossing events or more has happened in both quadrature channels. Then, the direction for all the cell is determined according to the majority of direction determinations (in both channels or in one of them only) in that cell. Preferably, each cell represents a fixed number of counts, irrespective of the actual number of counts in both channels (thus, the resolution is degraded by twice the number of minimum counts in the cell). Conveniently, a cell of size 3 or 4 may be used. The requirement that both channel counts equal or exceed the minimum number of a cell is intended to prevent high-frequency noise in one channel from 'taking-over' the majority voting.

In an optical translation measurement of many of the types described above, according to some preferred embodiments of the invention, the detector DC voltage resulting from the local oscillator energy is conveniently removed using a high-pass at the output of a first amplification stage before further amplification of the AC signal. Therefore, the high-pass cut-off frequency determines the minimum measurable velocity.

When optical translation measurement is used for an input device (such as a mouse or other pointer device), the low-velocity limitation may be an important factor for the user, e.g.—when the user slows the motion and approaches a specific position on the screen.

In order to enable the user to slowly move the cursor so that it can be positioned with high accuracy on the screen, a moderate (rather than a sharp) high-pass filter may be used. Using a gradually decreasing amplification slope with frequency will result in missed zero-crossings close to the filter cut-off. This will effectively reduce the measured velocity as the velocity approaches the lower limit set by the filter. Thus, the cursor velocity is gradually reduced to zero while the OTM is still within the measurement bandwidth (and still moving). This 'deceleration' mechanism may also be applied in software or as part of the signal analysis following the zero crossing detection, by measuring the count rate (i.e.—velocity) and reducing the cursor velocity when the count rate approaches the filter lower limit. In a preferred embodiment of the invention the cut off frequency is equivalent to a motion of less than about 0.5 mm/sec. In a preferred embodiment of the invention, the high pass filter has a slope, below the cut off frequency of less than about 20 db/octave.

Figure 23:
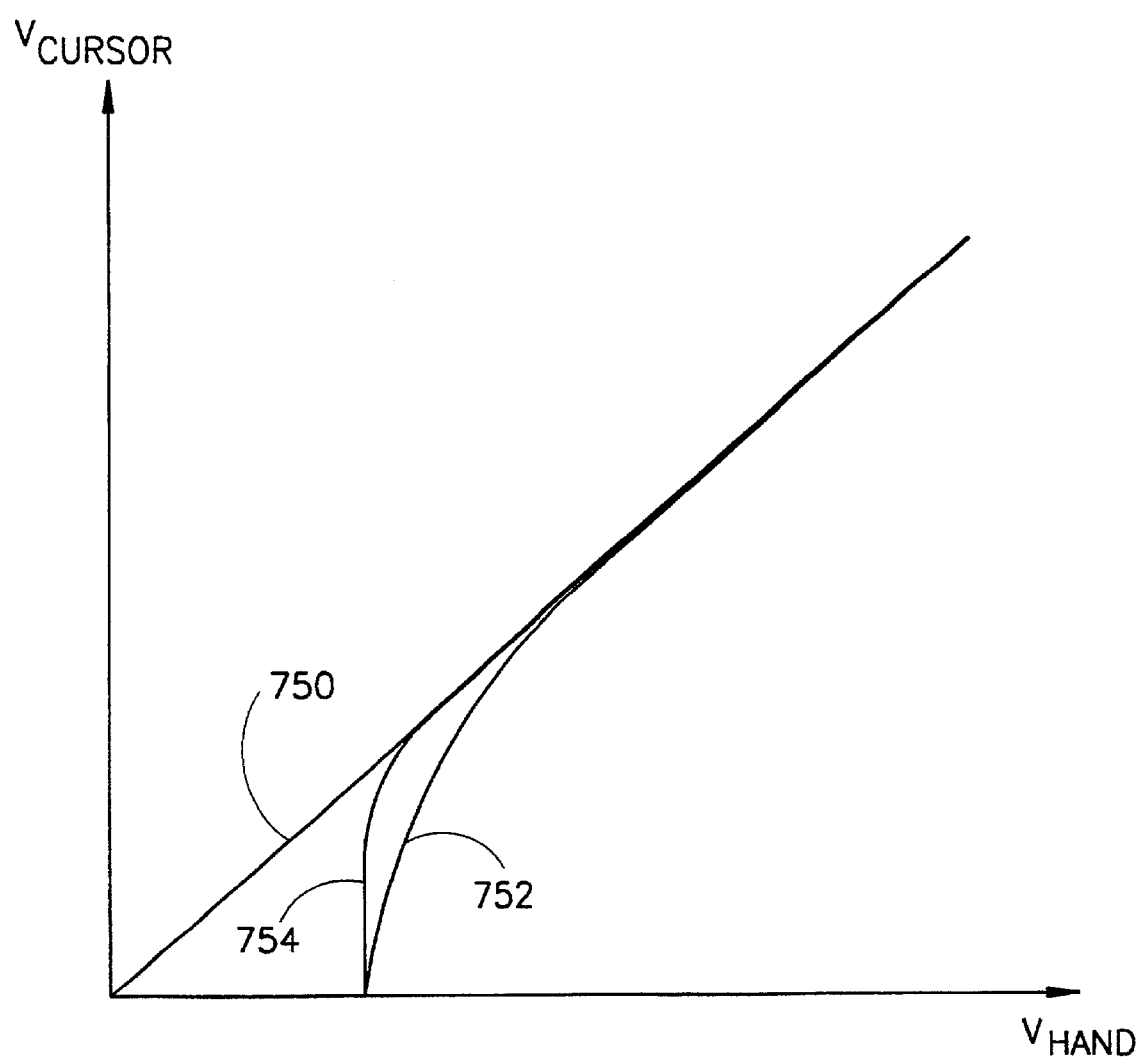
FIG. 23 illustrates curves of cursor velocity as a function of surface velocity for various filtration techniques.

FIG. 23 shows an ideal curve 750 of cursor velocity as a function of device velocity. FIG. 23 also shows a curve 752 of cursor velocity as a function of device velocity, in accordance with a preferred embodiment of the invention. Also shown, is a curve 754 which would result if a relatively sharp high pass filter were used. As can be understood, curve 754 results in a virtual inability of the system to move a cursor at a slow speed. On the other hand, the ideal curve is not achievable, since zero and low frequencies must be excluded. However, the gradual transition of curve 752 allows for an accurate placement of the cursor, using a non-linear transfer function. In an exemplary device, curve 752 could be linear down to some value, such as for example, 1 mm/sec and cause no movement of the cursor for hand (device) velocities lower than one-third to one half of the minimum linear velocity. Of course a different curve could be used, having an even smoother transition.

Figure 20A:
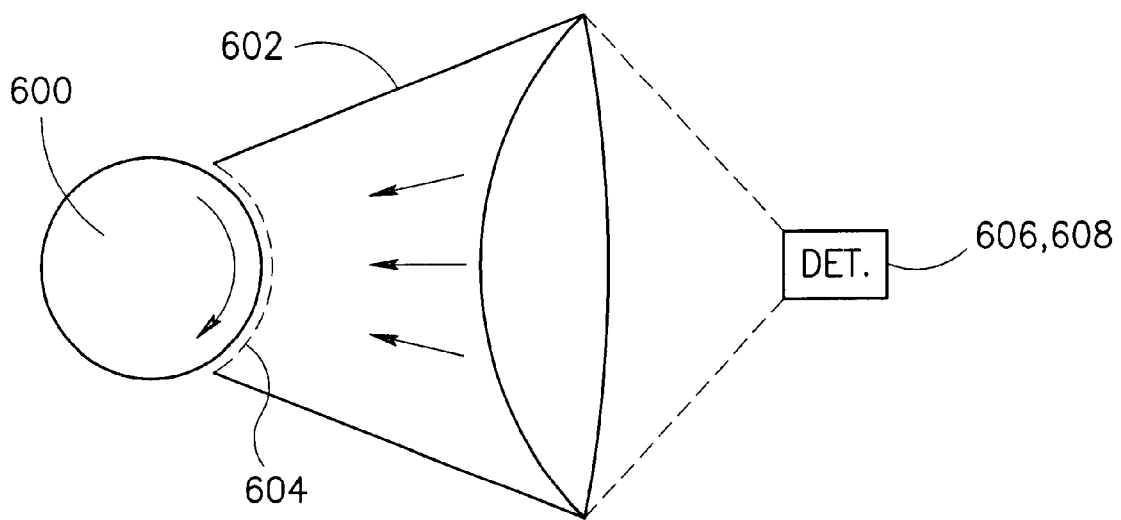
FIGS. 20A and 20B shows two views of a general structure for a device for the measurement of rotation of a relatively small shaft, in accordance with preferred embodiments of the invention.
Figure 20B:
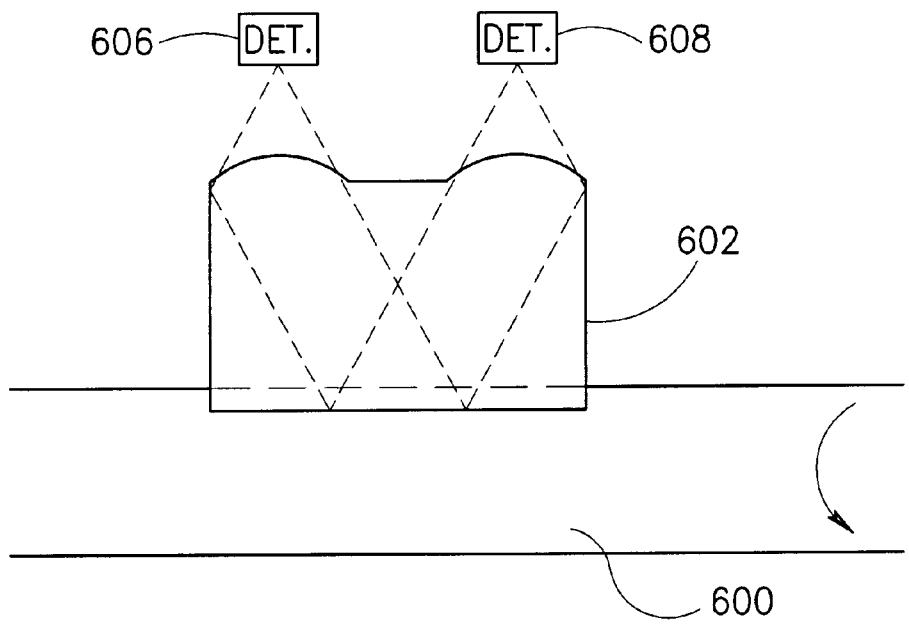

The accuracy of optical translation measurements, as described above, depends on the number of grating lines in the illuminating beam. Thus, for high-curvature surfaces, a planar optical configuration may not be accurate enough. An example of such an application is the measurement of the rotation of a shaft 600, as illustrated in FIGS. 20A and 20B, where the shaft radius may be small. For the measurement of shaft rotation, a device can be placed along the shaft (on the side of it). To accommodate the shaft curvature and enable measurement of small diameter shafts, a special optic 602 can be used as the front-end of the device component. The shape of the optic is shown schematically in FIGS. 20A and B. The diameter of the optic is matched to the shaft diameter, and the surface of the optic is patterned with a one-dimensional grating 604 whose lines are parallel to the shaft axis. A source light 606 is directed to focus at the center of the shaft, so its phase is constant across the grating. Preferably, the measurement is a $0^{th}$ order type. A detector 608 detects the light reflected from the surface of the shaft and the light reflected from the grating. Note that, preferably, the source and detector are at the circumferential position with respect to the shaft but are axially offset from each other as shown most clearly in FIG. 20B.

The front-end optic can be changed for different shaft diameters, and allows high-resolution measurement by looking at a substantial portion of the shaft circumference. Direction detection can be obtained by using an asymmetric grating, or by means of another portion of the light that will be focused onto the shaft surface and detect direction by the orthogonal polarization method described above, or by other means (e.g.—observing the motor driving current polarity). An advantage of using the arrangement of FIG. 19A or 19B is in equalizing the path length of the local oscillator and scattered radiation, while using the same portions of the beam for both.

Motion parallel to a rough surface may induce inadvertent Z-axis (up and down) motion as well. The Z axis motion induces a Doppler shift of the radiation reflected from the surface, and, in general, the phase of the radiation will change in response to a combination of Z and X or Y velocities. A way to decouple the relative contributions is to use measurements in both the +1 and −1 diffraction orders (or other symmetric orders, such as ±2, ±3, etc.) for each of the X and Y axes. Looking at the geometry of an incident wave perpendicular to the measured surface, velocities $v_x$ and $v_z$, source light wavelength $\lambda$, and grating line spacing $\Lambda$, the Doppler frequency shift for combined X and Z motion, as measured at the +1 order, is:

$$\omega_+ = (2\pi/\lambda)v_x \sin(\phi) - v_z(1+\cos(\phi))), \text{ where } \sin(\phi) = \lambda/\Lambda.$$

A measurement at the −1 order will result in a Doppler shift of:

$$\omega_- = (2\pi/\lambda) - (v_x \sin(\phi) - v_z(1+\cos(\phi))).$$

We can see that a signal oscillating at the difference of the two frequencies will have:

$$\omega_+ - \omega_- = (4\pi/\Lambda)v_x, \text{ while the sum frequency results in } \omega_+ + \omega_- = (4\pi/\lambda)v_z(1+\cos(\phi)).$$

Taking two quadrature signals for the two orders we have the following signals:

$$A^+ = \cos(\omega_+ t + \Phi_+), B^+ = \sin(\omega_+ t + \Phi_+), A^- = \cos(\omega_- t + \Phi_-), B^- = \sin(\omega_- t + \Phi_-).$$

Using sin and cos summation rules we can form combinations that will both oscillate at the sum or difference frequencies, and maintain quadrature relations:

$$C_- = B^+ A^- - A^+ B^- = \sin(\omega_+ t - \omega_- t + \Phi_+ - \Phi_-),$$

$$D^- = A^+ A^- + B^+ B^- = \cos(\omega_+ t - \omega_- t + \Phi_+ - \Phi_-),$$

$$C^+ = B^+ A^- + A^+ B^- = \sin(\omega_+ t + \omega_- t + \Phi_+ + \Phi_-),$$

$$D^+ = A^+ A^- - B^+ B^- = \cos(\omega_+ t + \omega_- t + \Phi_+ + \Phi_-).$$

The resulting signals $C^-$, $D^-$, have thus decoupled the relative contributions and eliminated the spurious Z axis contribution to the X axis measurement. Additionally, the + component can be used specifically for Z axis measurement only, for example for touch or 'click' detection in a touch point, without measurement of the zeroth order diffraction When the Z-axis velocity is relatively high, each of the X-Y measurements can usually be used also as a crude estimate for the Z-axis translation. Thus, the 'down-and-up' characteristic of the 'Click' operation of a finger can be detected. Also, it is possible to detect the 'Click' operation using the abrupt deceleration and acceleration by the finger on touching and detaching from the touch-point, respectively. For the latter, only the absolute Z-axis velocity (or it's derivative) is used.

Figure 21:
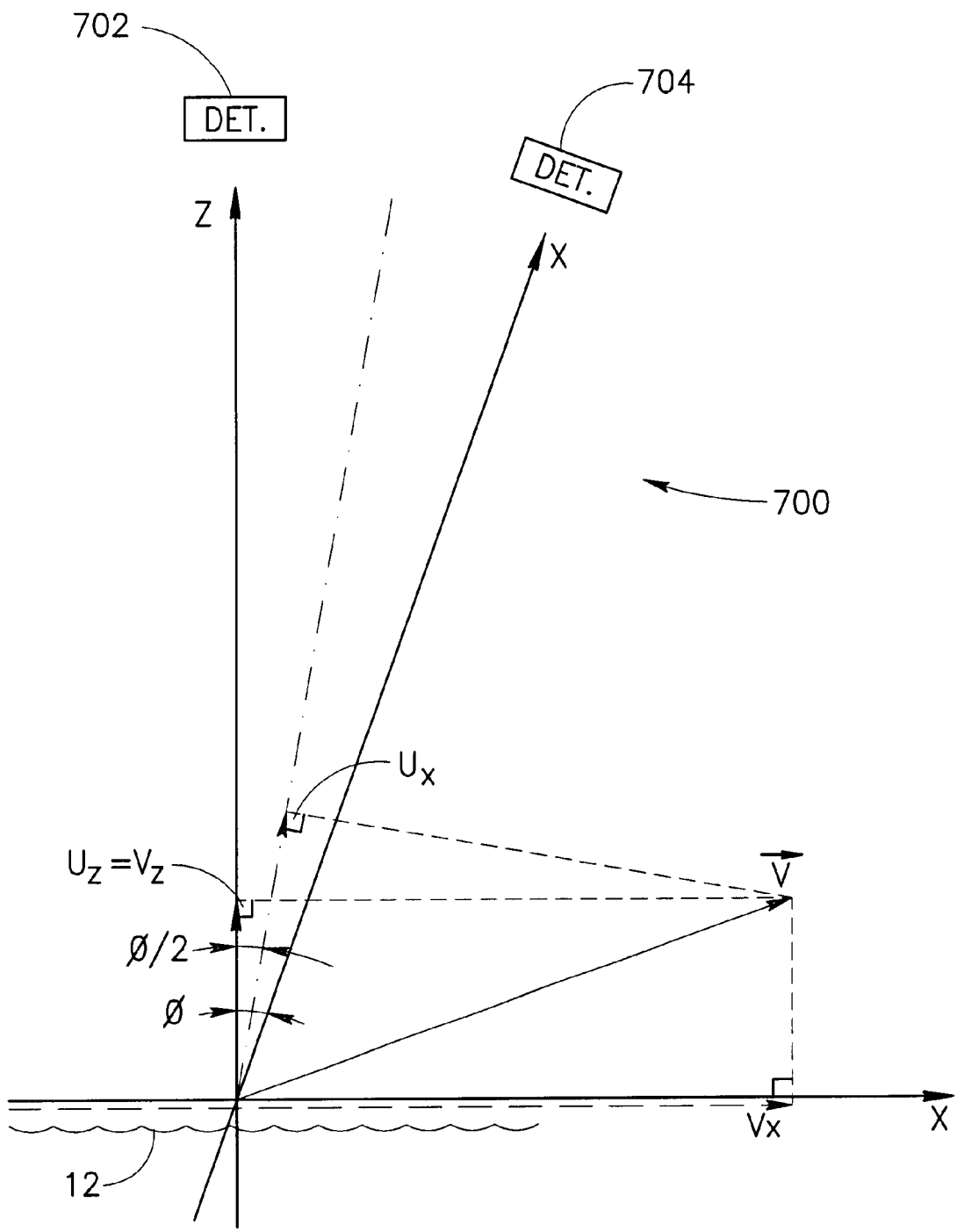
FIG. 21 schematically shows a configuration of detectors useful for reducing the effects of motion, normal to the surface, on measurements of motion parallel to the surface, in accordance with a preferred embodiment of the invention.

Another methodology for the determination of Z-axis translation and the accurate determination of transverse motion is illustrated with the aid of FIG. 21. FIG. 21 shows part of a system 700 in which two detector pairs, a Z-detector 702 and an X-detector 704 are used to determine both Z and X directed motion. In preferred embodiments of the invention, the Z-detector and the X detector each consist of a pair of cross-polarized detectors, such as those shown in FIGS. 19C and 19D and as element 512 in FIG. 18 and element 576 on FIGS. 19A and 19B. The surface has both x and z directed velocity (with respect to the detection system). The overall velocity is shown as the vector V ($V_z$ in the normal direction and $V_x$ in the parallel direction) on FIG. 21.

Z-detector 702 is preferably situated so that it receives Doppler shifted energy from surface 12 including only frequency shifts based on Z-motion (the light source, which is not shown, is assumed to be normally incident on the grating), X-detector 704 is so situated that it receives (for example) first order diffraction from the grating and Doppler shifted reflections from surface 12 at an angle φ with respect to the normal. The Doppler shifted reflections of the X-detector is based on a combination of the Doppler shifts of the X and Z directed motion of the surface with respect to the detectors.

Let $U_x$ be the component of the velocity along the bisector between the zero order and the first order. Then:

$$U_x = V_x \sin(\phi/2) + U_z \cos(\phi/2).$$

The Doppler effect creates a frequency shift measured in the X and Z detectors, respectively:

$$F_x = 2U_x \cos(\phi/2)/\lambda,$$

and $$F_z = 2U_z/\lambda.$$

The velocity along X axis, $V_x$, can be determined from the measurable quantities $F_x$ and $F_z$ by combining the above relations to:

$$V_x = \lambda F_x/\sin(\phi) - \lambda F_z ctg(\phi/2)/2.$$

If the first grating order is used, then $\sin(\phi) = \lambda/\Lambda$, where $\Lambda$ is the grating line spacing. Thus:

$$V_x = \Lambda(F_x - F_z \cos^2(\phi/2)).$$

When φ is small, $\cos^2(\phi/2) \sim 1$, simplifying the Z decoupling:

$$V_x = \Lambda(F_x - F_z).$$

Figure 22A:
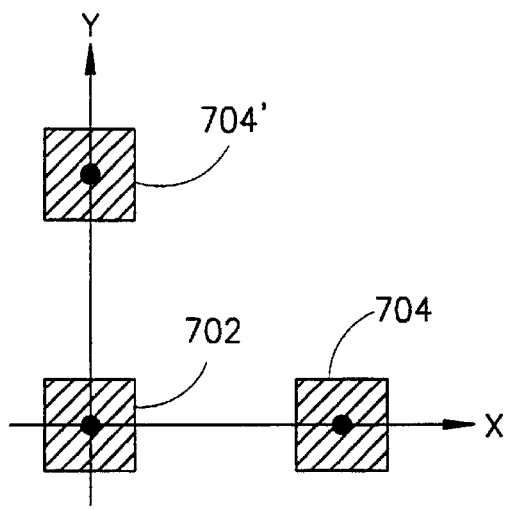
FIGS. 22A–22D schematically illustrate various configurations of detectors, in accordance with preferred embodiments of the invention, for determining two dimensional motion along the plane of a surface.

For determination of X and Y motion, three detectors are used as shown in FIG. 22A which shows the detectors at the focal plane of system 700.

If more accurate decoupling is required, a separate zero order detector may be used. By deflection of a small portion of the illuminating beam in an angle of φ/2, the new zero order from the deflected beam measures only Z-axis motion, but the Doppler frequency is now multiplied by $1+\cos(\phi) = 2\cos^2(\phi/2)$, i.e.—it will exactly match the Z-axis motion coupling to the X and Y axis measurements, enabling precise decoupling of it.

In an alternate preferred embodiment of the invention, it is also possible to decouple the effects of X and Z directed motion using only non-zero order reflections. This may be desirable since it avoids detection at near zero frequencies.

Assuming, for simplicity of exposition only, normal illumination, three detectors i=1 . . . 3 are used, each representing a grating spacing of $\Lambda_i$, and are positioned at angles $\gamma_i$ with respect to the X axis in the X-Y plane.

Therefore, the detectors measure the number of cycles, $N_i$ of a pseudo-sinusoidal signal according to:

$$N_i = 1/\Lambda_i(X\cos(\gamma_i) + Y\sin(\gamma_i)) + 1/\lambda \cdot Z(1+\cos(\phi_i)),$$

where X and Y are the translations along the X and Y axes, respectively, Z is the translation component along the normal to the plane, λ is the source wavelength and $\phi_i$ is the i-th detector angle with respect to the illumination direction in the reflection plane, and is related to $\Lambda_i$ as: $\sin(\phi_i) = \lambda/\Lambda_i$.

If, for example, one detector is on the X axis ($\gamma_1 = 0$), another is on the Y axis ($\gamma_2 = \pi/2$) and the third is at 45° to the others ($\gamma_3 = \pi/4$), then:

$$N_1 = \frac{X}{\Lambda_1} + \frac{Z}{\lambda}(1+\cos\phi_1)$$

$$N_2 = \frac{Y}{\Lambda_2} + \frac{Z}{\lambda}(1+\cos\phi_2)$$

$$N_3 = \frac{\sqrt{2}}{2} \cdot \frac{X+Y}{\Lambda_3} + \frac{Z}{\lambda}(1+\cos\phi_3)$$

The following approximation can be taken:

$$1+\cos\phi_1 = 1+\cos\phi_2 = 1+\cos\phi_3 = k_z.$$

Figure 22B:
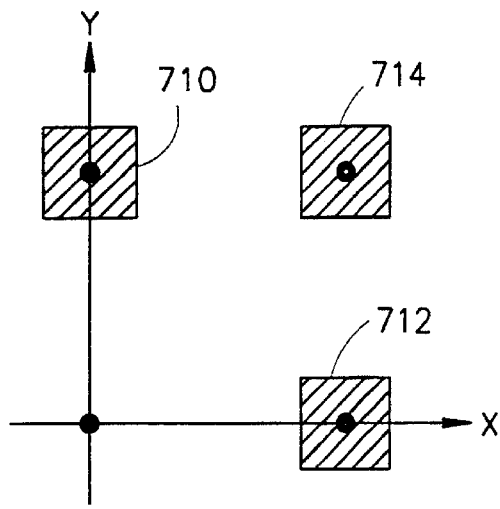

Also, if a simple 2-D grating with a square unit cell is used (see FIG. 22B), then (assuming also small φ angles):

$$\Lambda_1 = \Lambda_2 \equiv \Lambda$$

$$\Lambda_3 \cong \Lambda/\sqrt{2}$$

where $\Lambda_3$ stands for the first order at 45° from the X axis. In FIG. 22B, element 710 is the Y first order detector; 712 is the X first order detector and 714 is the X+Y first order detector.

Substitution and rearrangement lead to the expressions for X, Y and Z:

$$X = \Lambda(N_3 - N_2)$$

$$Y = \Lambda(N_3 - N_1)$$

$$Z = \lambda/k_z(N_1 + N_2 - N_3)$$

It is evident that the translation in X and Y is measured at the two detectors not lying on the measured axis. This eliminates the Z axis coupling and at the same time enables much better resolution in cases where the motion direction is close to the perpendicular to one of the primary axes.

Another example is similar to the latter, but when $\Lambda_3$ is doubled:

$$\Lambda_1 = \Lambda_2 = \Lambda$$

$$\Lambda_3 \cong 2\Lambda/\sqrt{2}$$

Figure 22C:
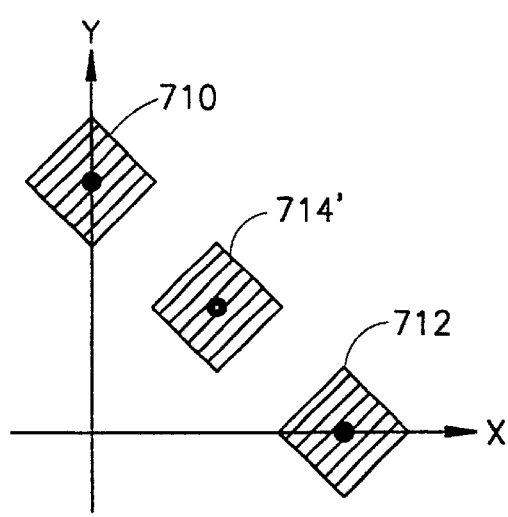

This configuration is equivalent to one detector on the X axis, a second on the Y axis and the third half-way between them (see FIG. 22C), so that the three detectors form a straight line. In FIG. 22C, 714' indicates the (X+Y)/2 combined order detector. This configuration is preferable for manufacturing purposes (especially considering the beam-splitting used for direction detection using the static phase shift). It is also easily obtainable with a dedicated 2-D phase-grating.

To convert to translation along the axes in this case:

$$X = \Lambda(2N_3 - N_2)$$

$$Y = \Lambda(2N_3 - N_1)$$

$$Z = \lambda/k_z(N_1 + N_2 - N_3)$$

Figure 22D:
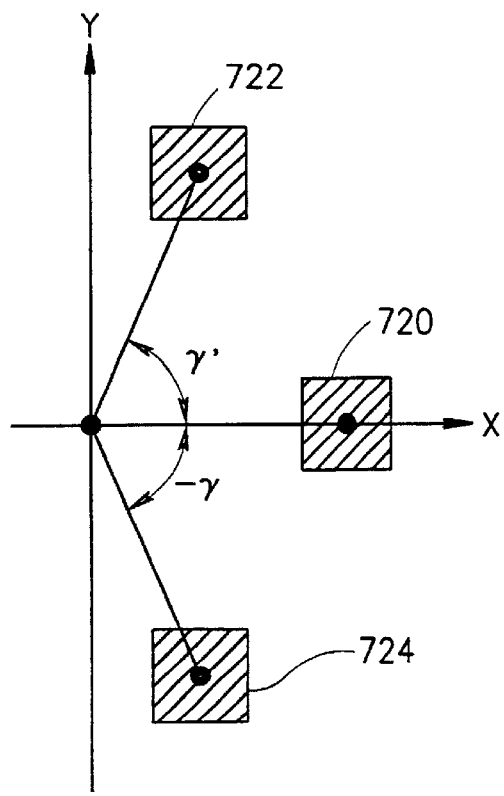

Still another possible configuration is when one detector (720) is on the X axis and two others (722 and 724) are symmetrically positioned relative to it, i.e.—$\gamma_1=0; \gamma_2=\gamma; \gamma_3=-\gamma$ and $\Lambda_1 \equiv \Lambda_x$; $\Lambda_2 = \Lambda_3 \equiv \Lambda_y$ (see FIG. 22D).

$$N_1 = \frac{X}{\Lambda_x} + \frac{k_z Z}{\lambda}$$

$$N_2 = \frac{1}{\Lambda_y}(X\cos\gamma + Y\sin\gamma) + \frac{k_z Z}{\lambda}$$

$$N_3 = \frac{1}{\Lambda_y}(X\cos\gamma - Y\sin\gamma) + \frac{k_z Z}{\lambda}$$

The following selection is conveniently (but not necessarily) made so that the X and Y resolutions will be identical:

$$\Lambda_x = \frac{\Lambda_y}{\sin\gamma + \cos\gamma}$$

Therefore, defining:

$$k \equiv \frac{1}{\Lambda_x} - \frac{\cos\gamma}{\Lambda_y} = \frac{\sin\gamma}{\Lambda_y}$$

and rearranging:

$$X = 1/2k(2N_1-(N_2+N_3))$$

$$Y = 1/2k(N_3-N_2)$$

Here again, the Z axis is decoupled, and also the resolution is high even in near-perpendicular motion to any of the primary axes.

Furthermore, for a convenient extraction of the Z axis translation, $\gamma$ is set to $\tan(\gamma)=2$, so:

$$Z = \frac{\lambda}{k_z}\left(2N_1 - \frac{N_2+N_3}{2}\right).$$

Any of the detector arrangements can be the product of a single 2-D grating (though in general it will not be composed of an array of rectangular unit cells), or by using two or three separate gratings, preferably illuminated by different portions of the initial beam, each contributing a local oscillator to only one or two detectors.

It should be noted that while FIGS. 22A, 22B and 22C show a single detector for each of the orders of diffraction, in fact, each consist of a pair of cross-polarized detectors, such as those shown in FIGS. 19C and 19D and as element 512 in FIG. 18 and element 576 on FIGS. 19A and 19B.

The total power of a source used in devices of the invention is generally not high. However, it may be desirable, in some preferred embodiments of the invention, to provide for an eye safely mechanism to reduce the chances of the laser inadvertently hitting the eye of a user. In a preferred embodiment of the invention, an additional detector is provided which is positioned to receive light reflected from the surface, without at the same time receiving light reflected or refracted from the grating. This is easily achieved by placing the additional detector between the zeroth order diffraction and the first order diffraction beams or any other orders. Conveniently, this detector may also be used simultaneously for $E_r^2$ component compensation, as described above. For example, the additional detector may be placed between elements 34 and 40 in FIG. 3A, 3B or 3C; and in analogous positions in other embodiments described above.

Light will be incident on the additional detector and the detector will produce a signal only when an object (other than the grating) is positioned to reflect light to it. Thus, if neither a surface or a finger or other object blocks the beam (and thus reflects light back to the additional detector), it will not produce a signal.

In accordance with a preferred embodiment of the invention, the source is turned off whenever the light detected by the additional sensor falls below some threshold value. Periodically, for example, every 100 msec, the source is turned on again for a very short time to check if light is incident on the additional detector. If it is, the source is kept on and the device measures motion, if any exists. If no or low incident light is detected, the source is extinguished for an additional period. This process is repeated until the a light signal above the threshold value is detected at the additional detector. Preferably, hysteresis is introduced on the threshold to prevent parasitic oscillations.

Alternatively or additionally, when no motion is detected for a predetermined period, for example, for one or a number of minutes, the motion detector goes into a "sleep mode." In the sleep mode the source is extinguished except for short periods (for example 50 or 100 milliseconds in every second or every half second). If during the "on" period, motion is detected, the motion detector switches to normal operation.

The present invention has been described in conjunction with a number of preferred embodiments thereof which combine various features and various aspects of the invention. It should be understood that these features and aspects may be combined in different ways and various embodiments of the invention may include one or more aspects of the invention. The scope of the invention is defined by the following claims and not by the specific preferred embodiments described above. As used in the following claims, the words "comprises", "comprising", "includes", "including" or their conjugates shall mean "including but not necessarily limited to".

What is claimed is:

1. A method for determining the relative motion of a surface with respect to a measurement device comprising:

illuminating the surface with incident illumination;

detecting a first portion of said incident illumination reflected from the surface in a first direction to form a first detected signal, the time variation of said first signal being responsive to the relative motion in a first direction, said first direction having at least a component in the direction perpendicular to the surface;

detecting a second portion of said incident illumination reflected from the surface in a second direction, different from the first direction, to form a second detected signal the time variation of said second signal being responsive to the relative motion in a second direction, different from the first direction, said second direction having a component in a direction parallel to the surface and in a direction perpendicular to the surface; and determining the amount of relative motion parallel to the surface free of effects of motion perpendicular to the surface from said first and second detected signals.

2. A method according to claim 1 wherein determining comprises:

generating a third signal from the first and second signals, said third signal being free of the effects of the motion perpendicular to the surface; and determining the motion parallel to the surface from the third signal.

3. A method according to claim 1 wherein determining comprises:
   determining first motion in first direction from the first signal;
   determining second motion in the second direction from the second signal; and
   determining motion parallel to the surface by correcting the determined second motion by the determined first motion.

4. A method according to claim 1 wherein the first direction does not have a component parallel to the surface.

5. A method according to claim 1, wherein the first direction has a component parallel to the surface.

6. A method according to claim 1 wherein relative motion perpendicular to the surface is determined based on a Doppler shift of the reflected illumination.

7. A method according to claim 1 wherein determining comprises determining the amount of relative motion parallel to the surface directly from the two signals without determining the amount of relative motion perpendicular to the surface.

8. A method according to claim 7 wherein said first detected signal is substantially determined by relative motion perpendicular to the surface.

9. A method according to claim 7 wherein said first detected signal is responsive to relative motion parallel to the surface.

10. A method according to claim 1 and including determining the amount of relative motion perpendicular to the surface.

11. A method according to claim 1 wherein determining the amount of relative motion parallel to the surface includes determining the amount of relative motion along; two non-colinear directions.

12. A method according to claim 1 wherein the illumination is perpendicularly incident on the surface.

13. A method according to claim 1 wherein detecting comprises coherently detecting.

14. A method according to claim 13 and including:
    reflecting or diffracting a portion of the illumination from an object, which is part of the measurement device, to act as a local oscillator.

15. A method according to claim 14 wherein the object is a partially reflecting object through which either the incident or reflected illumination passes.

16. A method according to claim 15 wherein both the incident and reflected illumination pass through the object.

17. A method according to claim 14 wherein the object is adjacent to the surface.

18. A method according to claim 14 wherein the object is a grating.

19. A method according to claim 18 wherein the surface is in the near field of the object.

20. A method according to claim 18 wherein the surface is outside the near field of the grating.

21. A method according to claim 18 wherein the grating produces essentially only a single order of transmitted illumination that illuminates the surface.

22. A method according to claim 14 wherein the illumination is at least partially coherent and wherein the object is placed within the coherence length of the illumination from the surface.

23. A method according to claim 14 wherein the local oscillator illumination and the reflected illumination are incident on at least one detector to produce said signals and wherein the local oscillator illumination and the reflected illumination are at least partly coherent at the detector.

24. A method according to claim 1 wherein the surface is a diffusely reflecting surface and wherein the detected illumination reflected form the surface is diffusely reflected therefrom.

25. Apparatus for measuring relative motion between the apparatus and a surface comprising:
    an illumination source, which transmits illumination to illuminate the surface;
    a first detector which receives illumination from the source after its reflection from the surface;
    an object which reflects a portion of the illumination from the illumination source to said first detector, such that the first detector generates a first signal based on coherent detection of the illumination reflected from the surface with the illumination, that is reflected by the object, functioning as a local oscillator;
    a second detector which receives illumination from one of the object and the surface without receiving illumination from the other of the surface and the object and generates a second signal responsive thereto;
    a signal corrector that adjusts the first signal for changes in the intensity of the illumination, based on the second signal; and
    a motion calculator that calculates the relative motion responsive to the signal from the signal corrector.

26. Apparatus according to claim 25 wherein the illumination of the second detector is illumination from the source reflected from or diffracted by the object.

27. Apparatus according to claim 26 wherein the apparatus includes:
    a third detector that receives illumination reflected from the surface without receiving substantial illumination from the object or from the source and produces a third signal in response thereto, and wherein
    the signal corrector corrects the adjusted signal based on the third signal.

28. Apparatus according to claim 25 wherein the illumination of the second detector is illumination reflected from the surface.

29. Apparatus according to claim 25 wherein the signal corrector corrects the first signal for a constant term based on the second signal.

30. Apparatus according to claim 29 wherein the signal corrector includes a difference amplifier that receives the first signal and subtracts the second signal from it to produce an adjusted first signal.

31. Apparatus according to claim 30 wherein the signal corrector includes a normalizer that receives the adjusted first signal and normalizes it with respect to the second signal.

32. Apparatus according to claim 25 wherein the object is partially transmitting and wherein the object is placed between the illumination source and the surface such that illumination of the surface passes through the object.

33. Apparatus according to claim 32 wherein the illumination has coherence length and wherein the object and the surface as situated within said coherence length.

34. Apparatus according to claim 25 wherein the object is a grating.

35. Apparatus according to claim 34 wherein the grating produces essentially only a single order of transmitted illumination that illuminates the surface.

36. Apparatus according to claim 34 wherein the surface is within the near field of the grating.

37. Apparatus according to claim 34 wherein the surface is outside the near field of the grating.

38. Apparatus according to claim 25 wherein the illumination reflected from the surface and the illumination reflected by the object are at least partly coherent at the first detector.

39. Apparatus according to claim 25 wherein at least one of the first and second detectors are situated to receive illumination diffusely reflected from the surface.

40. A method for determining the relative motion of an optically diffuse surface with respect to a measurement device comprising:

illuminating the surface with incident illumination from a laser source, such that illumination is reflected from portions of the surface;

diffracting part of the illumination utilizing a grating, which is part of the measurement device, to form reference illumination;

coherently detecting the illumination reflected from the surface utilizing the reference illumination as a local oscillator to form a signal; and determining the quantity of relative motion of the surface parallel to the grating from the signal.

41. A method according to claim 40 wherein the detected illumination has a coherence length and wherein the grating is placed adjacent to the surface such that the spacing between the grating and the surface is smaller than coherence length.

42. A method according to claim 40 including determining the quantity of relative motion of the surface perpendicular to the grating.

43. A method according to claim 40 wherein determining the quantity of relative motion of the surface parallel to the grating comprises determining the quantity of the motion free from effect of motion perpendicular to the grating.

44. A method according to claim 40 including determining the quantity of motion of the surface in two dimensions.

45. A method according to claim 40 including determining the quantity of motion of the surface in three dimensions.

46. A method according to claim 40 including determining the sense of the direction of motion of the surface.

47. A method according to claim 40 wherein the detection comprises quadrature detection.

48. A method according to claim 40 wherein determining the quantity of relative motion is based on a Doppler shift of the reflected illumination.

49. A method according to claim 40 and including polarizing the illumination reflected from the surface.

50. A method according to claim 40 and wherein the grating produces essentially only a single order of transmitted illumination that illuminates the surface.

51. A method according to claim 40 wherein the incident illumination is linearly polarized.

52. A method for determining the relative motion of a surface with respect to a measurement device comprising:

illuminating the surface with linearly polarized incident illumination from a laser source, such that illumination is reflected from portions of the surface;

polarizing the reflected illumination;

coherently detecting the reflected illumination from the surface utilizing reference illumination derived from the laser source as a local oscillator to form at least two signals;

determining the quantity of relative motion of the surface utilizing the at least two signals.

53. A method according to claim 52 including determining the relative motion parallel to the surface.

54. A method according to claim 52 including determining the quantity of relative motion of the surface in two non-collinear directions.

55. A method according to claim 52 including determining the quantity of relative motion of the surface in three orthogonal directions.

56. A method according to claim 52 including determining the sense of the direction of motion of the surface.

57. A method to claim 52 wherein the detection comprises quadrature detection.

58. A method according to claim 52 wherein determining the quantity of relative motion comprises determining the quantity of relative motion based on a Doppler shift of the reflected illumination.

59. A method according to claim 52 wherein the surface is a diffusely reflecting surface and wherein the detected illumination reflected from the surface is diffusely reflected therefrom.

60. Apparatus for measuring motion relative to a surface, comprising:

at least one laser that illuminates the surface;

at least one object that reflects or diffracts a portion of the illumination to at least three directions in space to act as local oscillator illuminations;

at least three detectors each of which coherently detects illumination reflected from the surface utilizing the local oscillator beams to form at least three signals responsive to the motion of the apparatus relative to the surface; and circuitry that determines the motion of the apparatus with respect to the surface from the signals, wherein the at least three detectors comprise at least three detector pairs and wherein the at least three signals comprise at least quadrature-pair signals.

61. Apparatus according to claim 60 including introducing a phase shift between polarization components of the illumination reflected from the surface and polarization components of the local oscillator beams to form the at least three quadrature-pair signals.

62. Apparatus according to claim 60 wherein the motion is determined in two non-colinear directions free from effects of motion in a direction orthogonal to the two directions.

63. Apparatus according to claim 60 at least of the first and second detectors are situated to receive illumination diffusely reflected from the surface.

64. Apparatus according to claim 60 wherein the detected illumination has a coherence length and wherein the object is placed adjacent to the surface such that the spacing between the object and the surface is smaller than the coherence length.

65. Apparatus according to claim 60 wherein the object is a grating.

66. Apparatus for measuring motion relative to a surface, comprising:

at least one laser than illuminates the surface;

at least one object that reflects or diffracts a portion of the illumination to at least three directions in space to act as local oscillator illuminations;

at least three detectors each of which coherently detects illumination reflected from the surface utilizing the local oscillator beams to form at least three responsive to the motion of the apparatus relative to the surface;

circuitry that determines the motion of the apparatus with respect to the surface from the signals; and a polarizer that polarizes the illumination reflected from the surface.

* * * * *